(12) United States Patent
Ueda

(10) Patent No.: US 8,862,844 B2
(45) Date of Patent: Oct. 14, 2014

(54) BACKUP APPARATUS, BACKUP METHOD AND COMPUTER-READABLE RECORDING MEDIUM IN OR ON WHICH BACKUP PROGRAM IS RECORDED

(75) Inventor: Akihiro Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 815 days.

(21) Appl. No.: 13/025,759

(22) Filed: Feb. 11, 2011

(65) Prior Publication Data

US 2011/0246736 A1 Oct. 6, 2011

(30) Foreign Application Priority Data

Mar. 31, 2010 (JP) ................................. 2010-081686

(51) Int. Cl.
G06F 12/00 (2006.01)
G06F 11/14 (2006.01)
(52) U.S. Cl.
CPC ........ G06F 11/1451 (2013.01); *G06F 2201/84* (2013.01); G06F 11/1456 (2013.01)
USPC ................... 711/162; 711/E12.103
(58) Field of Classification Search
USPC ........................................................ 711/162
See application file for complete search history.

(56) References Cited

U.S. PATENT DOCUMENTS

| 7,062,621 | B2 | 6/2006 | Mizuno et al. |
| 7,085,904 | B2 | 8/2006 | Mizuno et al. |
| 7,356,658 | B2 | 4/2008 | Satoyama et al. |
| 2005/0086443 | A1 | 4/2005 | Mizuno et al. |
| 2005/0086445 | A1 | 4/2005 | Mizuno et al. |
| 2006/0031637 | A1 | 2/2006 | Komikado et al. |
| 2006/0075200 | A1 | 4/2006 | Satoyama et al. |
| 2007/0294495 | A1 | 12/2007 | Uchida et al. |
| 2009/0125692 | A1* | 5/2009 | Yamamoto et al. ........... 711/162 |
| 2009/0157990 | A1 | 6/2009 | Yamada et al. |
| 2009/0158080 | A1 | 6/2009 | Furuya et al. |

FOREIGN PATENT DOCUMENTS

| JP | 2005-122611 | 5/2005 |
| JP | 2006-48300 | 2/2006 |
| JP | 2006-107162 | 4/2006 |
| JP | 2007-334709 | 12/2007 |
| JP | 2009-146169 | 7/2009 |
| JP | 2009-146228 | 7/2009 |

OTHER PUBLICATIONS

Japanese Office Action mailed Dec. 3, 2013 in corresponding Japanese Application No. 2010-081686.

* cited by examiner

*Primary Examiner* — Aracelis Ruiz
(74) *Attorney, Agent, or Firm* — Staas & Halsey LLP

(57) ABSTRACT

Upon production of a backup of a first generation, all of an operation volume is stored. However, upon production of a backup of a second or later generation, an update situation of the operation volume is confirmed, and a physical region of a capacity corresponding to a capacity of an update region of the operation volume is secured. Then, only data of the update region is stored into the secured physical region.

17 Claims, 38 Drawing Sheets

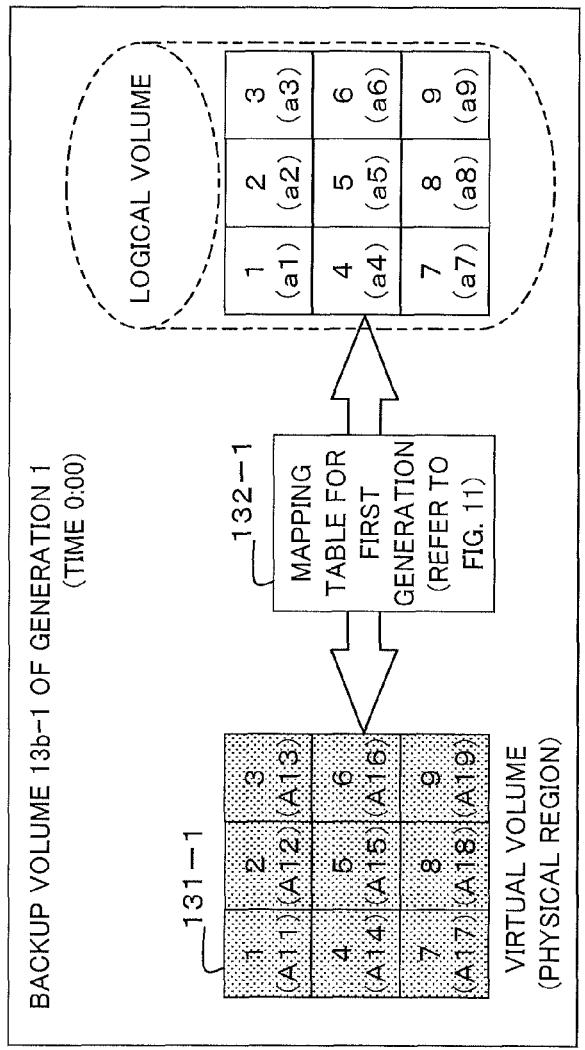
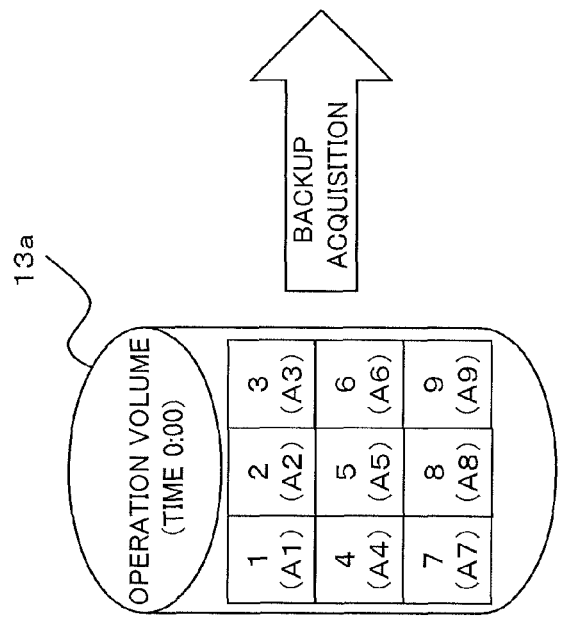

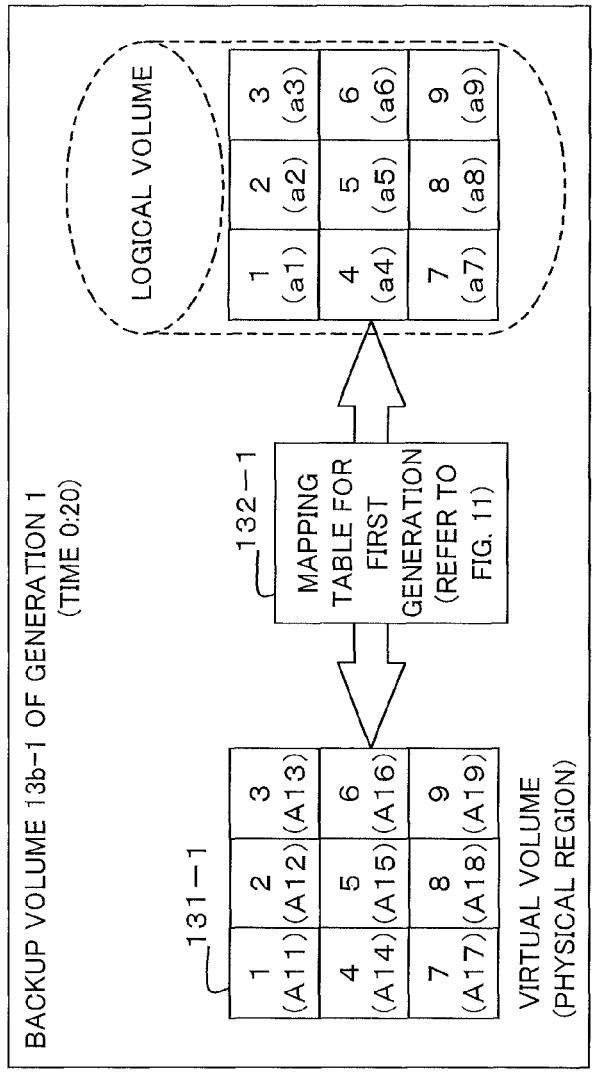
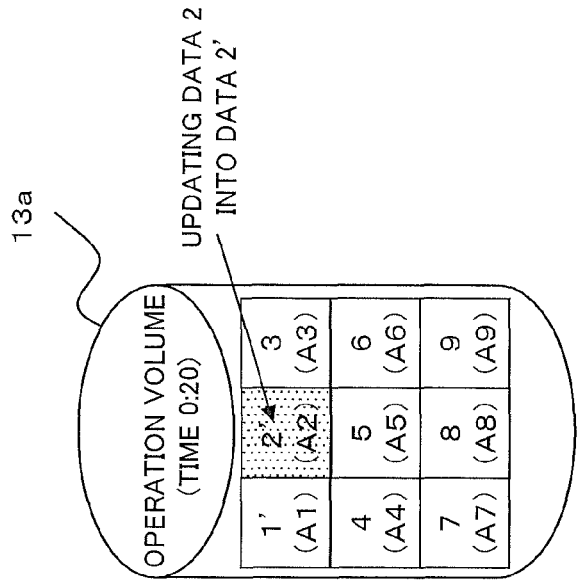
FIG. 14A
FIG. 14B

BACKUP ACQUISITION

FIG. 22A
FIG. 22B
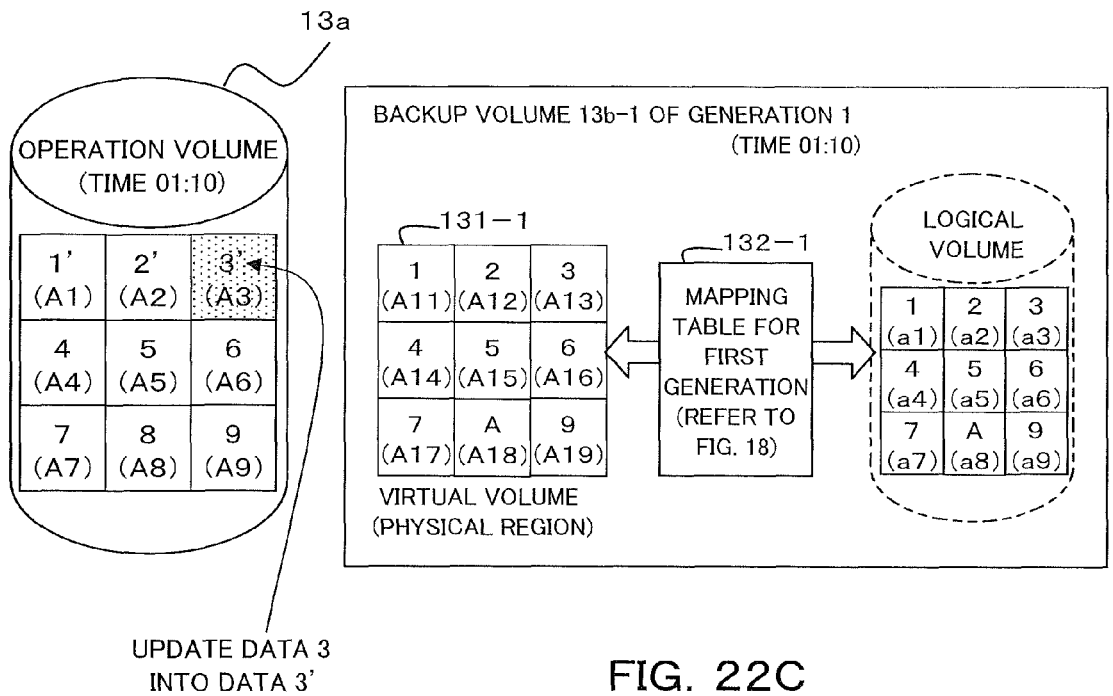
UPDATE DATA 3
INTO DATA 3'
FIG. 22C
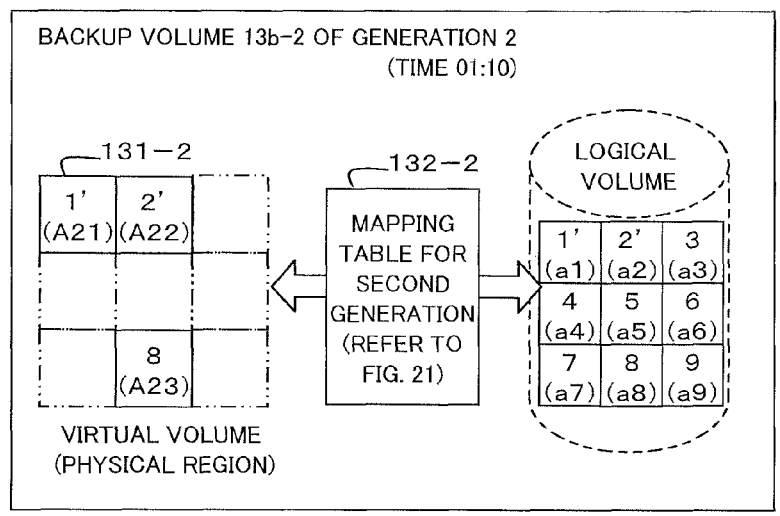

READ OUT AND
REFER TO DATA 7

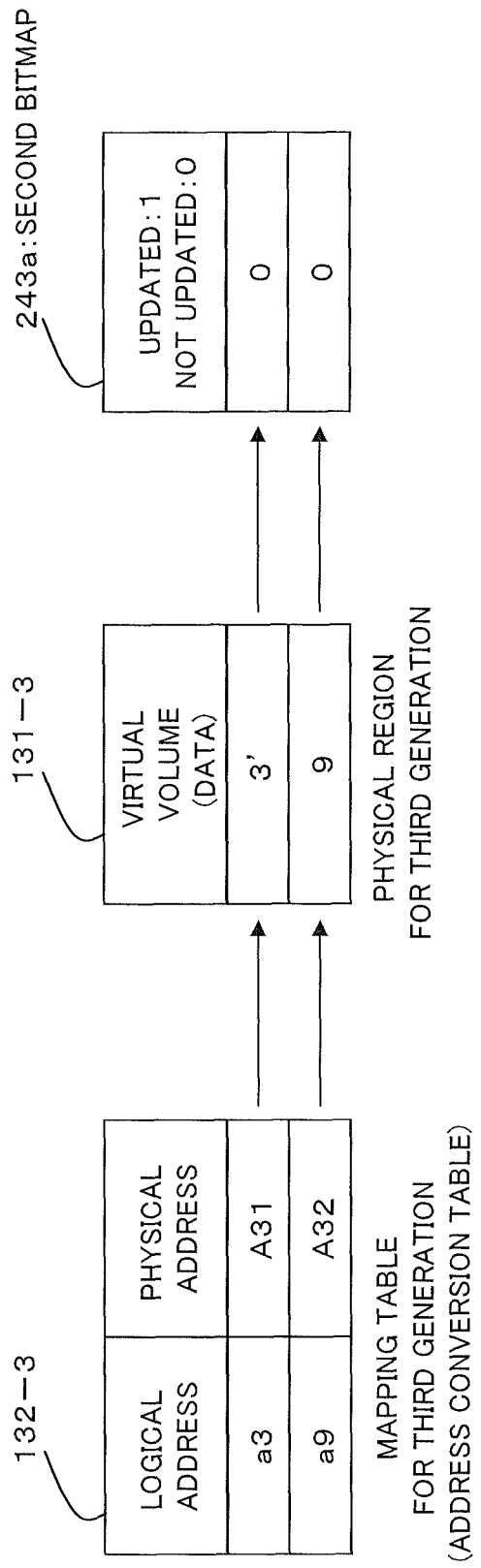

BACKUP APPARATUS, BACKUP METHOD AND COMPUTER-READABLE RECORDING MEDIUM IN OR ON WHICH BACKUP PROGRAM IS RECORDED

CROSS-REFERENCE TO RELATED APPLICATIONS

This application is based upon and claims the benefit of priority of the prior Japanese Patent Application No. 2010-081686 filed on Mar. 31, 2010, the entire contents of which are incorporated herein by reference.

FIELD

The embodiments discussed herein are related to a backup apparatus, a backup method and a computer-readable recording medium in or on which a backup program is recorded.

BACKGROUND

Generally, OPC (One Point Copy) is known as one of methods for backing up a copy source volume, for example, an operation volume, in a storage product or a computer. The OPC is a function for producing a snapshot which is data at a predetermined point of time regarding data which is a backup target. If an OPC instruction is received from a user, then a backup apparatus which executes the OPC copies all data of operation volumes at a point of time at which the OPC instruction is received to store the data as a snapshot (backup data) to carry out backup of the operation volumes.

As an expansion function of the OPC described above, QOPC (Quick One Point Copy) in which a background copy method is used as a function for implementing difference copy, SnapOPC+ (Snapshot One Point Copy+) in which a copy on-write method is used as a function for implementing copy of a plurality of generations and so forth are available.

The QOPC and the SnapOPC+ are described below.

The QOPC is a function for producing a backup volume of an operation volume at a certain point of time similarly to the OPC. With the QOPC, an operation volume and a backup volume can be referred to and updated instantaneously as if production of the backup volume were completed at the same time with a response to a QOPC starting instruction.

In the QOPC, a copying process operates in the background after the QOPC starting instruction is completed. However, if a request for reference to and updating of a region of a backup volume in which background copy is not completed is issued, then the reference and updating are carried out after the copying process for the relevant region is carried out. Further, in the QOPC, different from the OPC, an updated portion from that at a point of time at which a backup is acquired in the immediately preceding cycle is stored after the background copy is completed. Therefore, in the QOPC, production of backup volumes for the second time and so forth can be carried out merely if only difference data is copied in the background.

The SnapOPC+ is a function for implementing copy of an operation volume without carrying out allocation of a capacity same as that of the operation volume as a region of a backup volume. By such a function as just described, reduction of a disk capacity necessary for backup can be implemented in a user environment wherein it is expected that the entire volume is not updated and the cost required for the copying can be decreased. In the SnapOPC+, it is assumed that it is used mainly for volume production for tape backup. For the backup volume, a virtual volume having a disk capacity smaller than the capacity of the operation volume is prepared. The virtual volume can be logically accessed from a server similarly to a normal volume.

The SnapOPC+ does not carry out copy of the entire operation volume but is implemented by copying, in the case where an operation volume is updated, data (old data) before updating at an updating target portion into a backup volume which is a copying destination. Where a backup volume which is a copying destination is accessed from a server, if an access target region is not copied as yet, then the server refers to data in a region of the operation volume corresponding to the access target region in place of the access target region. Further, by preparing a plurality of backup volumes, backup volumes of a plurality of generations can be produced.

[Patent Document 1] Japanese Patent Laid-Open NO. 2006-107162

[Patent Document 2] Japanese Patent Laid-Open NO. 2006-048300

[Patent Document 3] Japanese Patent Laid-Open NO. 2007-334709

[Patent Document 4] Japanese Patent Laid-Open NO. 2009-146228

If it is intended to implement backup for a plurality of generations using the advanced copy functions in the present situation described above, that is, the QOPC and the SnapOPC+, then there is such a subject described as below.

If it is intended to apply the QOPC to implement backup for a plurality of generations, then a number of volumes having a capacity same as that of operation volumes equal to the number of generations are required. Therefore, a great amount of disk capacity and a very high cost are required.

Further, in the SnapOPC+, while data before updating in a region in which updating has been carried out in the operation volume is copied into the backup volume, data in a region in which updating has not been carried out is not copied into the backup volume and backup of the data is not carried out. In other words, data in all regions of the operation volume are not copied or backed up into the backup volume which is a copying destination. Therefore, if the operation volume is damaged, then unless updating of data in all regions of the operation volume is carried out and data before updating are copied into the backup volume before the damage, then reference and updating regarding backup volumes of all generations cannot be carried out. Therefore, the data, copied in the backup volume become useless as the backup.

SUMMARY

According to an aspect of the embodiment, a backup apparatus produces backup volumes of a plurality of generations regarding a backup target volume and comprises a storage section, a first production section, a first monitoring section and a second production section. The storage section stores the backup volumes of the plural generations. The first production section copies data in the backup target volume at a point of time at which a production instruction of a backup volume of a first generation is received into a region for the first generation of the storage section to produce the backup volume of the first generation. The first monitoring section monitors, as a first update region, a region to which the data updated in the backup target volume after a production instruction of a backup volume of an i−1th generation is issued belongs, i being a natural number equal to or greater than two. The second production section refers, if a production instruction of a backup volume of an ith generation is received, to the first update region monitored by the first monitoring section to secure, in the storage section, a region for the ith generation having a capacity corresponding to a capacity of the first update region and then copies the data in the first update region in the backup target volume at a point of time at which the production instruction of the backup volume of the ith generation is received into the region for the ith generation to produce the backup volume of the ith generation.

Meanwhile, according to an aspect of the embodiment, a backup method produces backup volumes of a plurality of generations regarding a backup target volume in a storage section and comprises a first production step, a first monitoring step and a second production step. At the first production step, data in the backup target volume at a point of time at which a production instruction of a backup volume of a first generation is received is copied into a region for the first generation of the storage section to produce the backup volume of the first generation. At the first monitoring step, a region to which the data updated in the backup target volume after a production instruction of a backup volume in an i−1th generation is issued belongs is monitored as a first update region, i being a natural number equal to or greater than two. At the second production step, if a production instruction of a backup volume in an ith generation is received, the first update region monitored at the first monitoring step is referred to, to secure, in the storage section, a region for the ith generation having a capacity corresponding to a capacity of the first update region and then the data in the first update region in the backup target volume at a point of time at which the production instruction of the backup volume of the ith generation is received is copied into the region for the ith generation to produce the backup volume of the ith generation.

Further, according to an aspect of the embodiment, a backup program causes a computer to function as a backup apparatus for producing backup volumes of a plurality of generations regarding a backup target volume in a storage section and causes the computer to function as the first production section, first monitoring section and second production section described above.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 9A and 9B are views illustrating backup volume production operation for a first generation of the present embodiment, and wherein FIG. 9A is a view illustrating contents of an operation volume and FIG. 9B is a view illustrating contents of a backup volume of the first generation;

FIGS. 12A and 12B are views illustrating updating operation for an operation volume of the present embodiment, and wherein FIG. 12A is a view illustrating contents of an operation volume and FIG. 12B is a view illustrating contents of a backup volume of the first generation;

FIGS. 14A and 14B are views illustrating updating operation for an operation volume of the present embodiment, and wherein FIG. 14A is a view illustrating contents of an operation volume and FIG. 14B is a view illustrating contents of a backup volume of the first generation;

FIGS. 16A and 16B are views illustrating reference operation for a backup volume of the first generation of the present embodiment, and wherein FIG. 16A is a view illustrating contents of an operation volume and FIG. 16B is a view illustrating contents of a backup volume of the first generation;

FIGS. 17A and 17B are views illustrating updating operation for a backup volume of the first generation of the present embodiment, and wherein FIG. 17A is a view illustrating contents of an operation volume and FIG. 17B is a view illustrating contents of a backup volume of the first generation;

FIG. 19A to 19C are views illustrating backup volume production operation for a second generation of the present embodiment, and wherein FIG. 19A is a view illustrating contents of an operation volume, and FIGS. 19B and 19C are views illustrating contents of backup volumes in the first and second generations, respectively;

FIGS. 22A to 22C are views illustrating updating operation for an operation volume of the present embodiment, and wherein FIG. 22A is a view illustrating contents of an operation volume, and FIGS. 22B and 22C are views illustrating contents of backup volumes of the first and second generations, respectively;

FIGS. 24A to 24C are views illustrating reference operation for a backup volume of the second generation of the present embodiment, and wherein FIG. 24A is a view illustrating contents of an operation volume, and FIGS. 24B and 24C are views illustrating contents of backup volumes of the first and second generations, respectively;

FIGS. 25A to 25C are views illustrating updating operation for a backup volume of the second generation of the present embodiment, and wherein FIG. 25A is a view illustrating contents of an operation volume, and FIGS. 25B and 25C are views illustrating contents of backup volumes of the first and second generations, respectively;

FIGS. 27A to 27C are views illustrating updating operation for a backup volume of the first generation of the present embodiment, and wherein FIG. 27A is a view illustrating contents of an operation volume, and FIGS. 27B and 27C are views illustrating contents of backup volumes of the first and second generations, respectively;

FIGS. 30A to 30D are views illustrating production operation for a backup volume of the third generation of the present embodiment, and wherein FIG. 30A is a view illustrating contents of an operation volume and FIGS. 30B to 30D are views illustrating contents of backup volumes of the first to third generations, respectively;

FIG. 32 is a view illustrating contents of a mapping table for the third generation, a virtual volume of the third generation and a second bitmap table corresponding to the backup volume of the third generation illustrated in FIG. 30D;

FIGS. 33A to 33D are views illustrating reference operation for a backup volume of the third generation of the present embodiment, and wherein FIG. 33A is a view illustrating contents of an operation volume and FIGS. 33B to 33D are views illustrating contents of backup volumes of the first to third generations, respectively;

FIGS. 34A to 34D are views illustrating updating operation for a backup volume of the second generation of the present embodiment, and wherein FIG. 34A is a view illustrating contents of an operation volume and FIGS. 34B to 34D are views illustrating contents of backup volumes of the first to third generations, respectively;

FIGS. 37A to 37D are views illustrating deletion operation for a backup volume of the first generation of the present embodiment, and wherein FIG. 37A is a view illustrating contents of an operation volume and FIGS. 37B to 37D are views illustrating contents of backup volumes of the first to third generations, respectively.

DESCRIPTION OF THE PREFERRED EMBODIMENTS

In the following, embodiments are described with reference to the drawings.

[1] Configuration of the Present Embodiment

[1-1] Configuration of the Storage System

Figure 1:
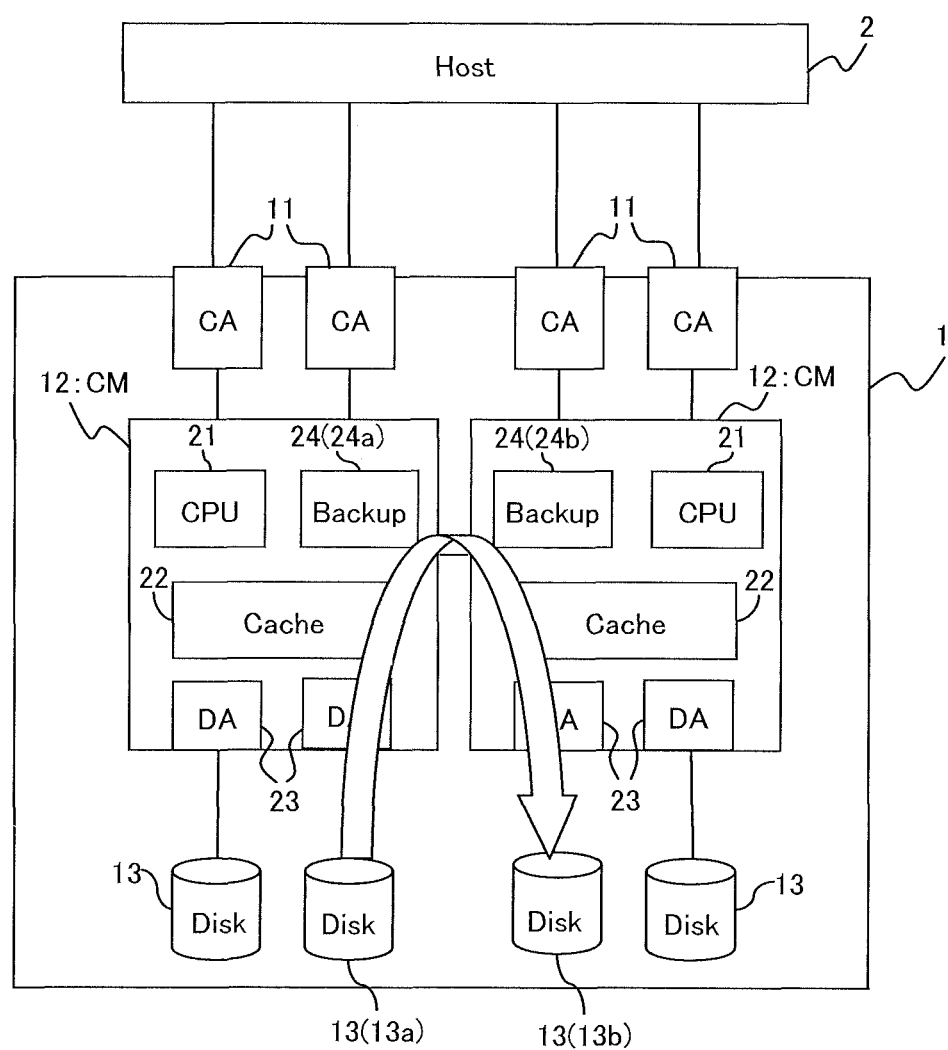
FIG. 1 is a block diagram illustrating a configuration of a storage system to which a backup apparatus of an embodiment is applied.

FIG. 1 is a block diagram showing a configuration of a storage system 1 to which a backup apparatus 100 (refer to FIG. 2) of the present embodiment is applied.

As shown in FIG. 1, the storage system 1 is connected to an operation server 2 as a host computer (Host), and receives various requests from the operation server 2 and carries out various processes in accordance with the requests. The storage system. 1 includes four CAs (Channel Adapters) 11, two CMs (Centralized Modules) 12 and four disks (HDDs; Disks) 13 all of which are provided in the same housing. It is to be noted that, while a disk (HDD) 13 is used as a storage device in the storage system 1 of the present embodiment, a different storage device such as an SSD (Solid State Device) may be used.

Each CA 11 carries out interface control with the operation server 2 and carries out data communication with the operation server 2.

Each CM 12 is connected to the two CAs 11, 11 and the two disks 13, 13, and carries out resource management in the present storage system 1. Further, each CM 12 carries out various processes (a data writing process, a data updating process, a data readout process, a data copying process and so forth) for the two disks 13, 13 in accordance with a request from the operation server 2 or from a different CM 12. Further, the two CMs 12 are connected to each other through a bus and are each configured for accessing to the disks 13 accommodated in the other CM 12.

Each disk 13 has user data, control information and so forth stored thereon. In the storage system 1 of the present embodiment, an operation volume 13a accessed by the operation server 2 is stored as a backup target volume on one disk 13 accommodated in one of the CMs 12. Further, backup volumes 13b-1 to 13b-i (i indicates a natural number equal to or higher than 2; refer to FIG. 3) of a plurality of generations regarding the operation volume 13a are stored into a backup volume region 13b of one disk 13 accommodated in the other one of the CMs 12.

It is to be noted that, as the operation volume 13a, all of data regions of the one disk 13 may be used or part of the data regions of the one disk 13 may be used. Similarly, as the backup volume 13b, all of the data regions of the one disk 13 may be used or part of the data regions of the one disk 13 may be used. Further, while, in the present embodiment, the operation volume 13a and the backup volumes 13b-1 to 13b-i are stored on the disks 13, 13 individually connected to the CMs 12, 12 different from each other, they may be stored on the disks 13, 13 different from each other and connected to the same CM 12 or may be stored on the same disk 13. Further, while, in the present embodiment, the operation volume 13a and the backup volumes 13b-1 to 13b-i are provided in the same housing, they may be provided individually in housings different from each other.

Each CM 12 includes a CPU (Central Processing Unit) 21, a cache memory 22, two DAs (Device Adapters) 23 and a backup controlling section 24. The two DAs 23, 23 individually carry out interface control with the two disks 13, 13 individually accommodated in the CM 12 and carry out data communication with the disks 13. The cache memory (Cache) 22 stores user data, control data and so forth and temporarily stores data to be written from the operation server 2 on the disks 13 and data read out from each disk 13 to the operation server 2 or the other CM 12. The CPU 21 manages the cache memory 22, DA 23 and backup controlling section 24 hereinafter described.

[1-2] Configuration/Operation of the Backup Apparatus 100

Figure 2:
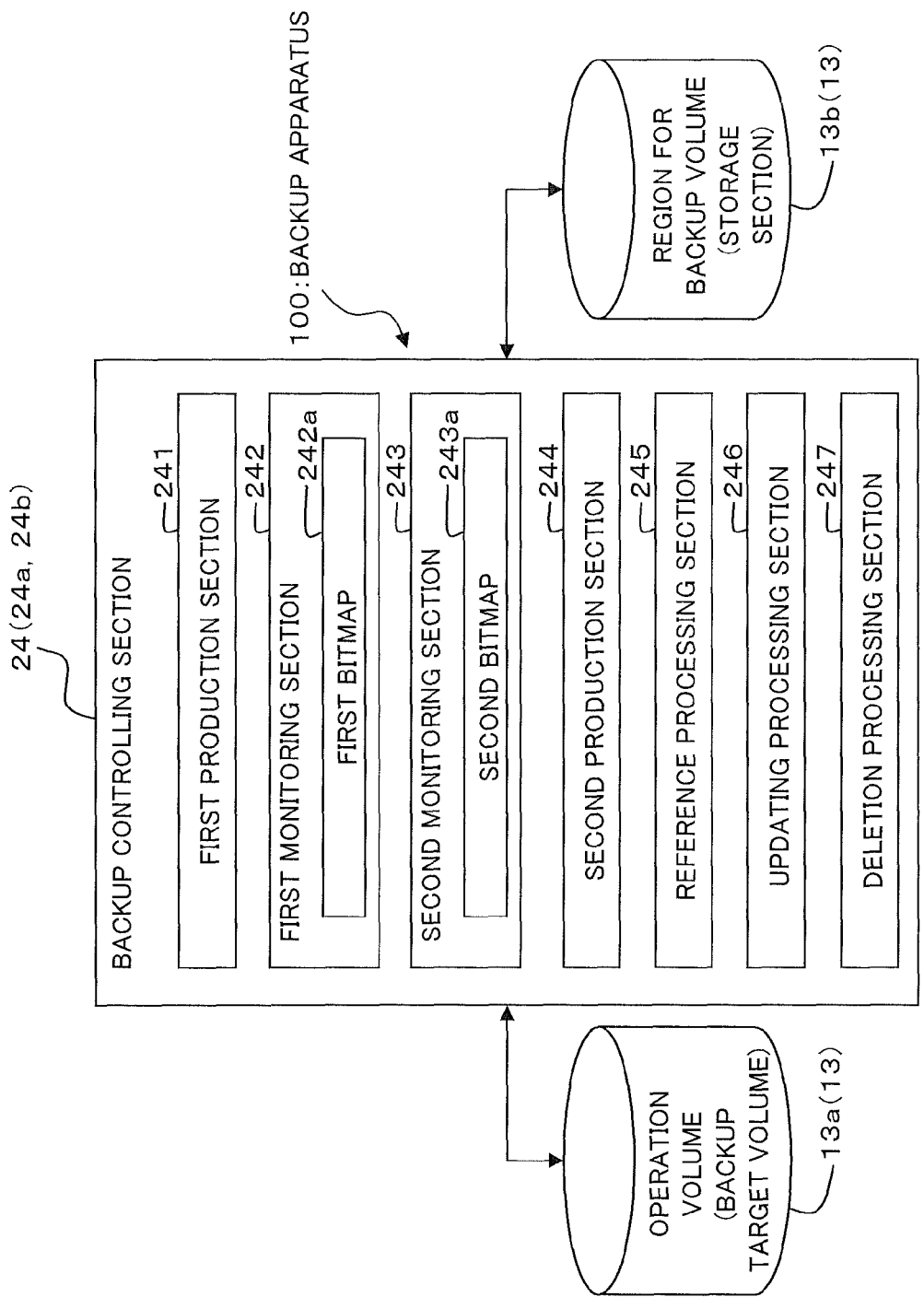
FIG. 2 is a block diagram illustrating a functional configuration of the backup apparatus of the present embodiment.
Figure 3:
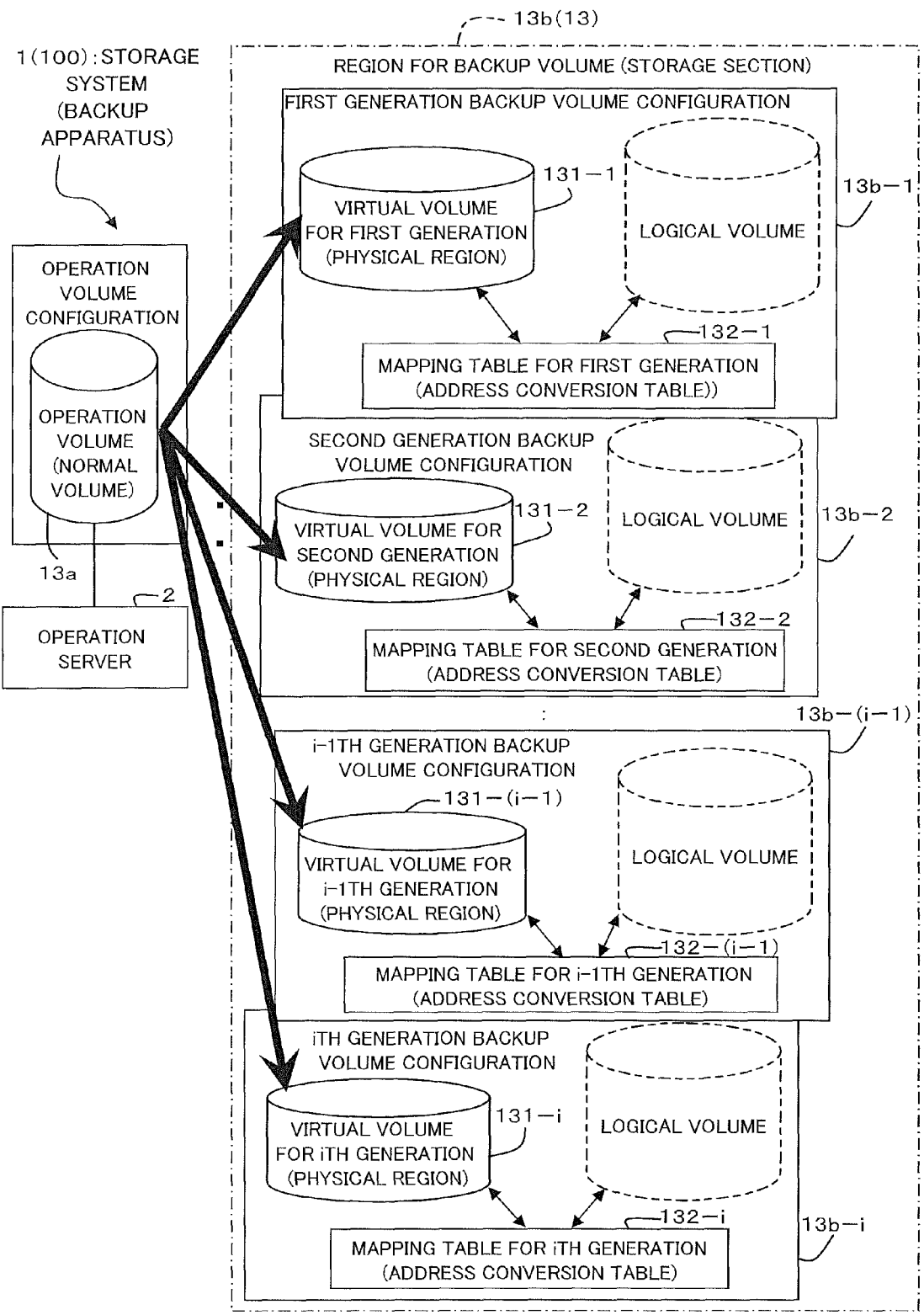
FIG. 3 is a block diagram illustrating an operation volume configuration and a backup volume configuration of the present embodiment.

FIG. 2 is a block diagram illustrating a functional configuration of the backup apparatus 100 according to the present embodiment, and FIG. 3 is a block diagram illustrating a configuration of an operation volume and a configuration of a backup volume in the present embodiment.

As shown in FIG. 2, the backup apparatus 100 according to the present embodiment produces backup volumes 13b-1 to 13b-i (refer to FIG. 3) of a plurality of generations regarding the operation volume 13a in the backup volume region 13b. The backup apparatus 100 includes the operation volume 13a, backup volume region (storage section) 13b and backup controlling section (Backup) 24.

[1-2-1] Configuration of the Operation Volume and the Backup Volume

Here, as shown in FIG. 3, a normal volume is used as the operation volume 13a which serves as a copy source and a virtual volume is used as the backup volumes 13b-1 to 13b-i which serve as copy destinations. The virtual volume is secured and allocated as physical regions 131-1 to 131-i for the individual generations. A first generation region 131-1 is secured as a region having a capacity equal to the capacity of the operation volume 13a in the backup volume region 13b by a first production section 241 hereinafter described. Meanwhile, second to ith generation regions 131-2 to 131-i are individually secured as regions having a capacity smaller than the capacity of the operation volume 13a in the backup volume region 13b by a second production section 244 hereinafter described. Particular capacities of the regions 131-2 to 131-i secured by the second production section 244 are hereinafter described. It is to be noted that, in the present embodiment, it is premised that the backup apparatus 100 is applied to a user environment wherein it is expected that the entire operation volume 13a is not updated.

Then, it looks that the operation server 2 accesses the backup volumes 13-1 to 13-i of the individual generations of the backup apparatus 100 using a logical address to physically access the physical regions 131-1 to 131-i for the generations. Actually, a logical address from the operation server 2 is converted into a physical address using mapping tables 132-1 to 132-i hereinafter described, and then physical accessing to the physical regions 131-1 to 131-i for the generations is executed using the physical address.

In particular, the mapping tables 132-1 to 132-i for the first to ith generations are provided for the backup volumes 13-1 to 13-i of the plural generations. The first to ith generation mapping tables 132-1 to 132-i associate logical addresses and physical addresses of the data regions in the physical regions 131-1 to 131-i with each other. The mapping tables 132-1 to 132-i are address conversion tables for converting a logical address included in a request from the operation server 2 into a physical address of a backup volume of a target generation. It is to be noted that the mapping table 132-1 for the first generation is produced by the first production section 241 hereinafter described, and the mapping tables 132-2 to 132-i for the second to ith generations are produced by the second production section 244 hereinafter described.

By mapping the logical regions individually to the physical regions of the virtual volumes 131-1 to 131-i using the mapping tables 132-1 to 132-i, a logical backup volume (logical volume) is implemented. In particular, while the logical volumes in the backup volumes 13-1 to 13-i of the generations do not really exist physically, it looks from the operation server 2 that the backup volumes actually exist. In the case where the logical volumes of the generations are viewed from the operation server 2, it looks that all data of an operation volume of a target generation are backed up in a logical volume of the target generation as hereinafter described in detail with reference to FIGS. 8 to 38. Accordingly, in the present embodiment, by preparing such plural virtual volumes 131-1 to 131-i as described above, the virtual backup volumes 13b-1 to 13b-i of the plural generations can be produced. It is to be noted that, while the logical volume shown in FIG. 3 is merely illustrated such that it virtually looks from the operation volume 2, the logical volume is not actually provided in the backup volumes 13b-1 to 13b-i.

[1-2-2] Configuration/Function/Operation of the Backup Controlling Section 24

The backup controlling section 24 receives various requests from the operation server 2 and executes various processes relating to the operation volume 13a and the backup volumes 13b-1 to 13b-i as hereinafter described with reference to FIGS. 4 to 38. As shown in FIG. 2, the backup controlling section 24 includes a first production section 241, a first monitoring section 242, a second monitoring section 243, a second production section 244, a reference processing section 245, an updating processing section 246 and a deletion processing section 247.

[A1] First Production Section 241

The first production section 241 copies all data of the operation volume 13a at a point of time at which a production instruction of a backup volume of the first generation is received from the operation server 2 into the first generation physical region 131-1 of the backup volume region 13b to produce a backup volume 13b-1 in the first generation. At this time, the first production section 241 produces the backup volume 13b-1 of the first generation using a method similar to that of the OPC described above. Further, the first production section 241 secures a physical region 131-1 having a capacity equal to that of the operation volume 13a in the backup volume region 13b and copies all data of the operation volume 13a into the secured physical region 131-1 in its downward direction in the order of the physical address (refer to FIG. 11). Further, the first production section 241 produces also a first generation table 132-1 for associating logical addresses and physical addresses of data in the physical region 131-1 with each other (refer to FIG. 11).

It is to be noted that the table 132-1 has a size corresponding to the capacity of the operation volume 13a. In particular, the first production section 241 secures a region having the size just described in the backup volume region 13b and produces the table 132-1 in the secured region.

Such a particular production process of a backup volume in the first generation by the first production section 241 as described above is hereinafter described, for example, with reference to a process at step S2 in FIG. 4 and to FIG. 9A to 11.

[A2] First Monitoring Section 242

The first monitoring section 242 monitors a region to which data updated in the operation volume 13a within a period after a production instruction of a backup volume in a certain generation (i−1th generation) is received until another production instruction of a backup volume of a next generation (ith generation) is received belongs as a first update region. At this time, the first monitoring section 242 monitors the first update region using a first bitmap table 242a having a size corresponding to the capacity of the operation volume 13a (refer to FIGS. 13, 15 and 23).

The first bitmap table 242a is provided in the operation volume 13a or the first monitoring section 242 in order to monitor an update situation of the operation volume 13a. Bits corresponding to individual regions of the operation volume 13a are set in the first bitmap table 242a. Then, if data belonging to any region is not updated, then "0" is placed into the corresponding bit, but if data belonging to any region is updated, then "1" is placed into the corresponding bit. It is to be noted that the first bitmap table 242a may be provided in a storage region other than that of the operation volume 13a or the first monitoring section 242.

Figure 10:
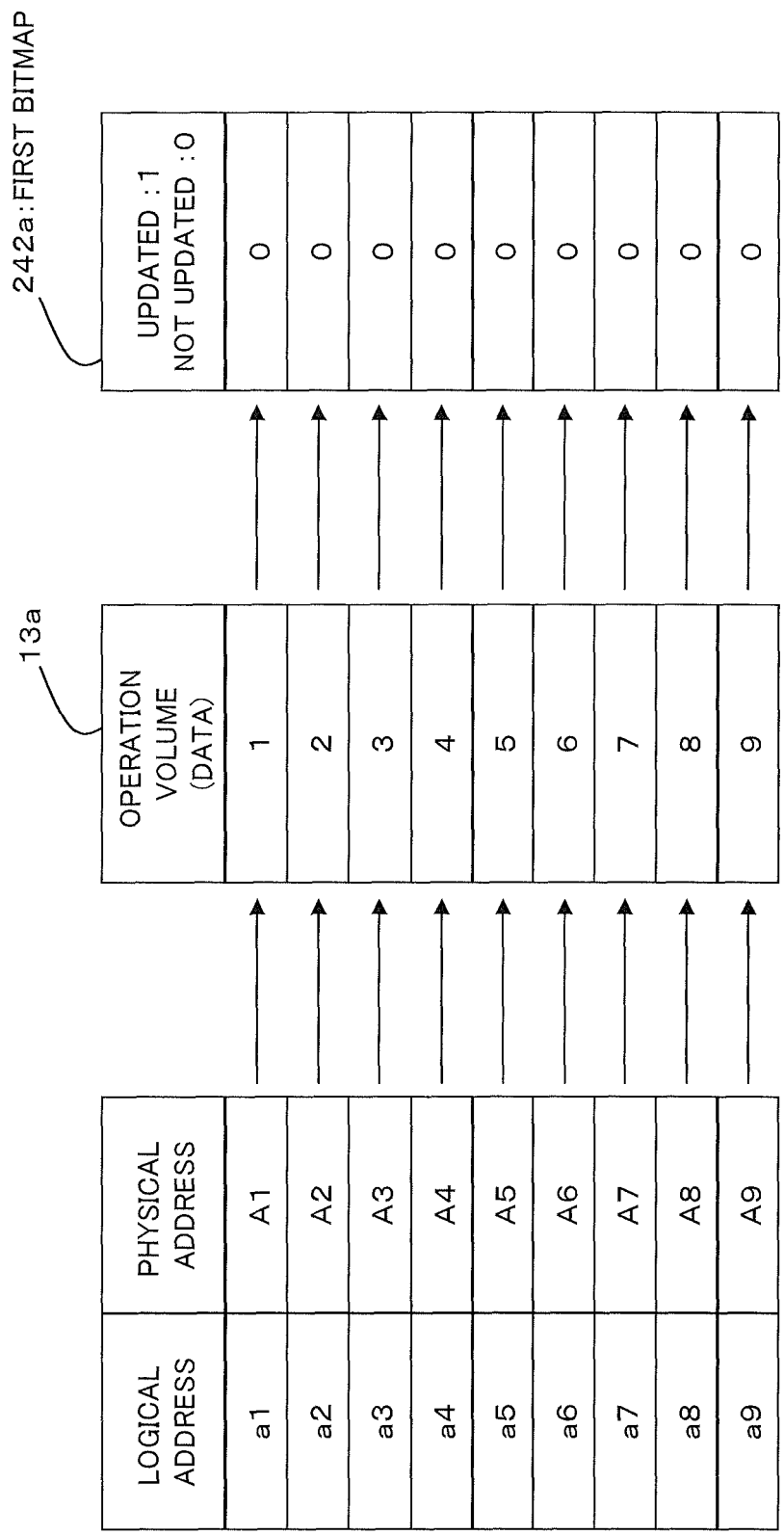
FIG. 10 is a view illustrating contents of a first bitmap table corresponding to the operation volume shown in FIG. 9A.
Figure 20:
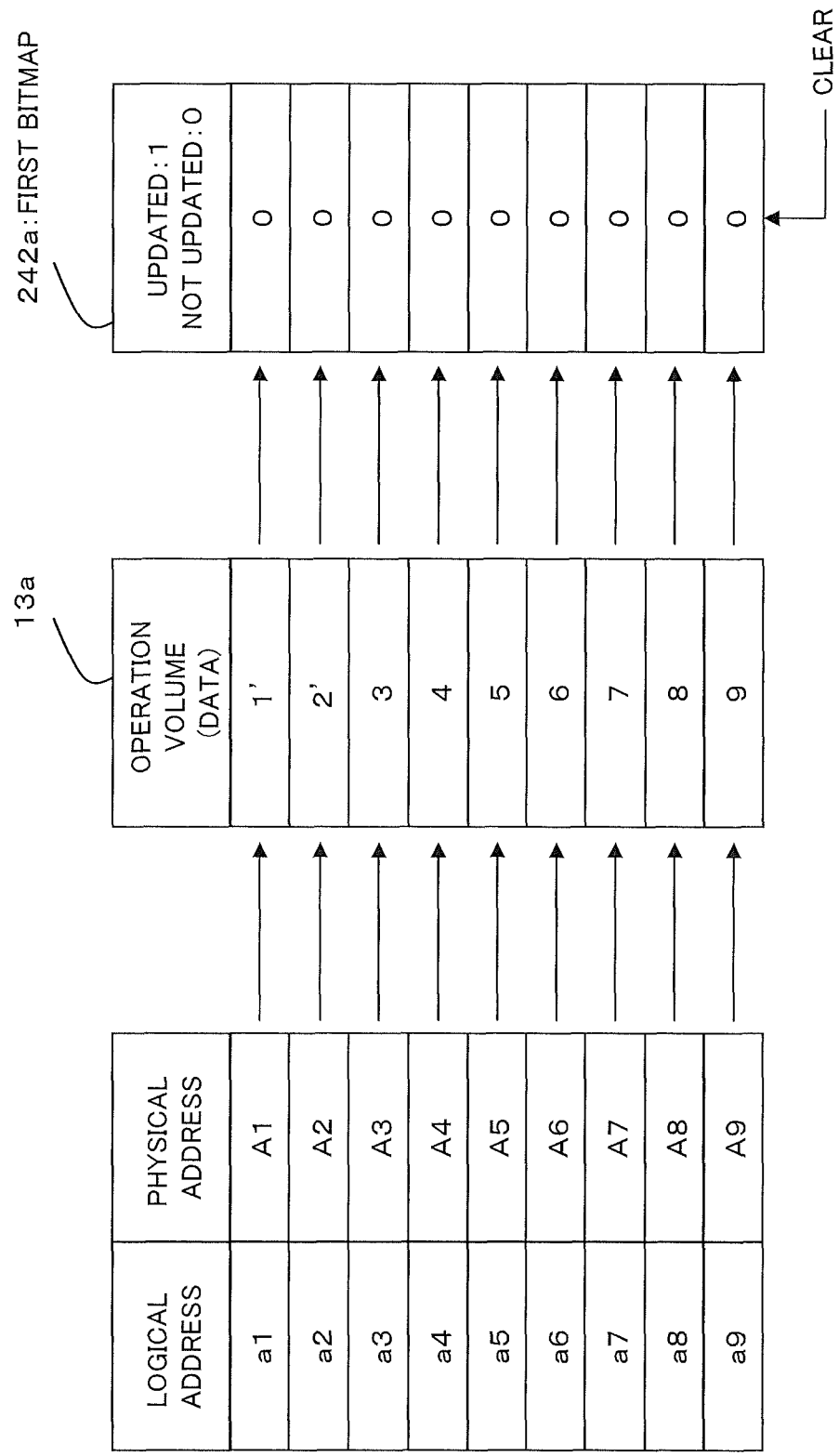
FIG. 20 is a view illustrating contents of the first bitmap table corresponding to the operation volume illustrated in FIG. 19A.
Figure 31:
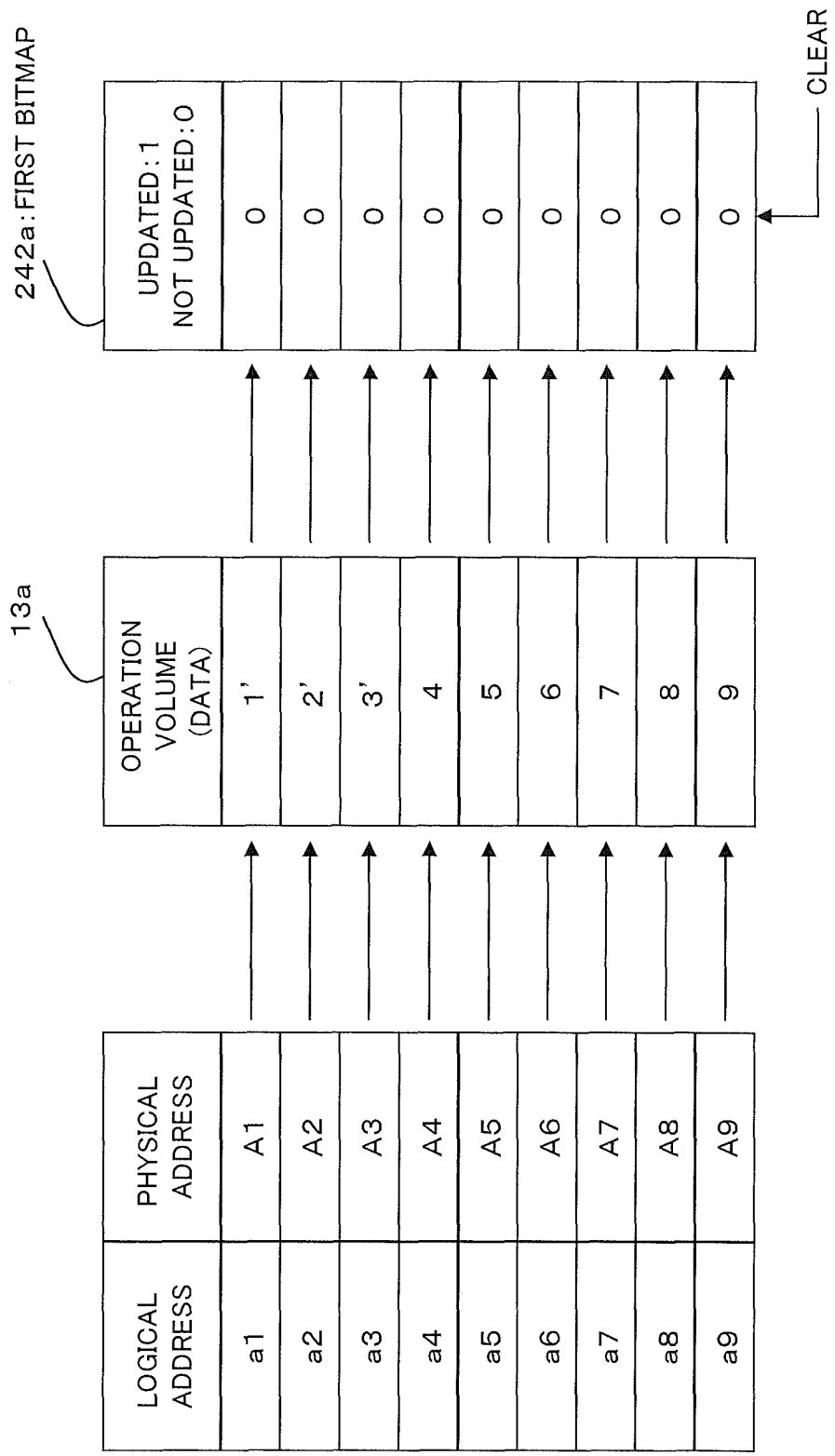
FIG. 31 is a view illustrating contents of a first bitmap table corresponding to the operation volume illustrated in FIG. 30A.

Further, the first monitoring section 242 clears all bits of the first bitmap table 242a to "0" after a production instruction of a backup volume of any generation is received (refer to FIGS. 10, 20 and 31).

Such a particular updating monitoring process of the operation volume 13a by the first monitoring section 242 as described above is hereinafter described, for example, with reference to FIGS. 12A to 15 and 22A to 23.

[A3] Second Monitoring Section 243

The second monitoring section 243 monitors a region to which data updated in a backup volume 13b-(i−1) of the i−1th generation within a period after a production instruction of a backup volume of a generation (i−1th generation) is received until another production instruction of a backup volume of a next generation (ith generation) is received belongs as a second update region. At this time, the second monitoring section 243 monitors the second update region using a second bitmap table 243a having a size corresponding to the capacity of the backup volume 13b-(i−1) of the i−1th generation (refer to FIGS. 18 and 26).

The second bitmap table 243a is provided in the backup volume region 13b or the second monitoring section 243 in order to monitor an update situation of a backup volume in the latest generation. Bits corresponding to individual regions of the backup volume in the latest generation are set in the second bitmap table 243a. If data belonging to any region is not updated, then "0" is placed into the corresponding bit, but if data belonging to any region is updated, the "1" is placed into the corresponding bit. It is to be noted that the second bitmap table 243a may be provided in a storage region other than that of the backup volume region 13b or the second monitoring section 243.

Figure 11:
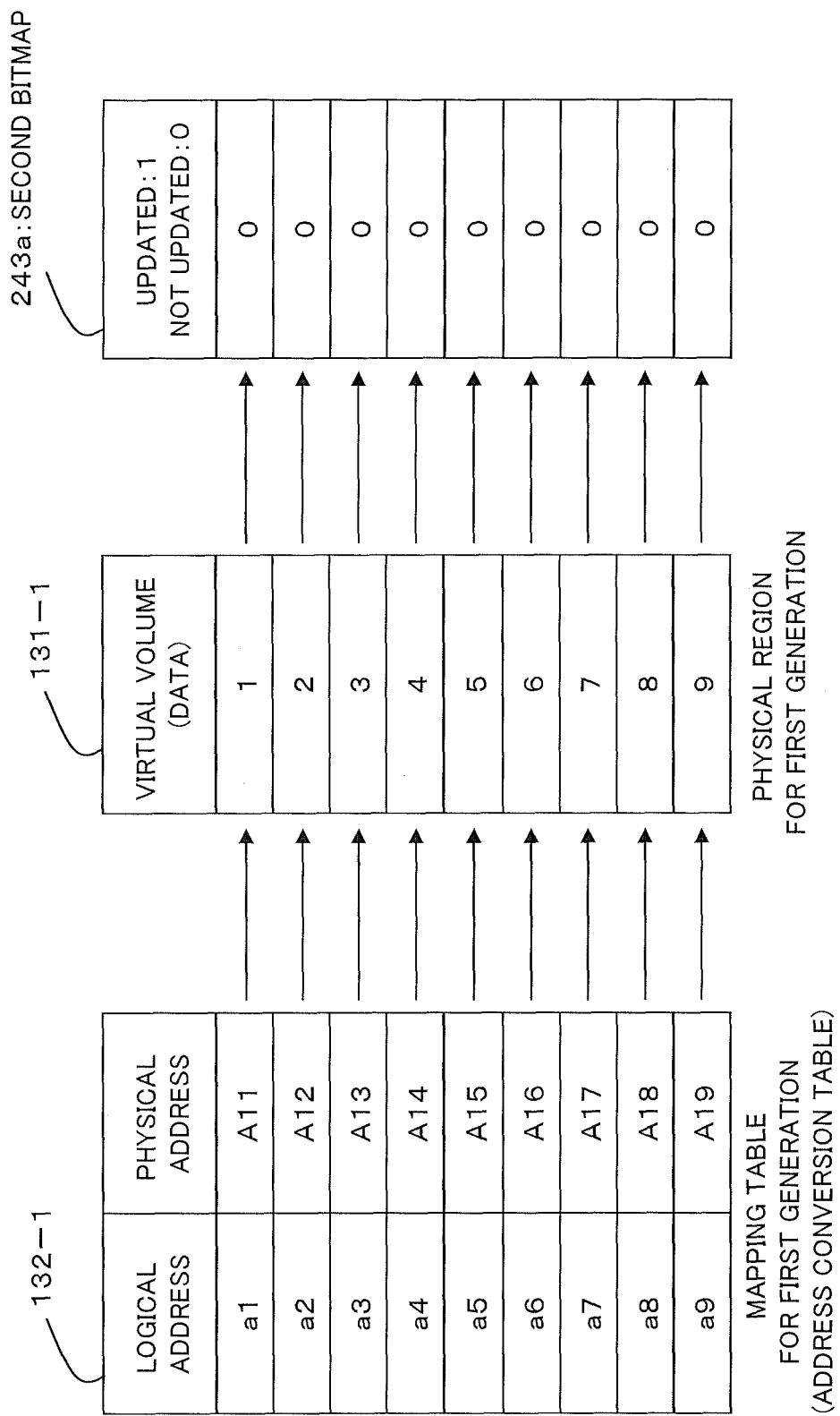
FIG. 11 is a view illustrating contents of a mapping table for the first generation, a virtual volume of the first generation and a second bitmap table corresponding to the backup volume of the first generation illustrated in FIG. 9B.
Figure 21:
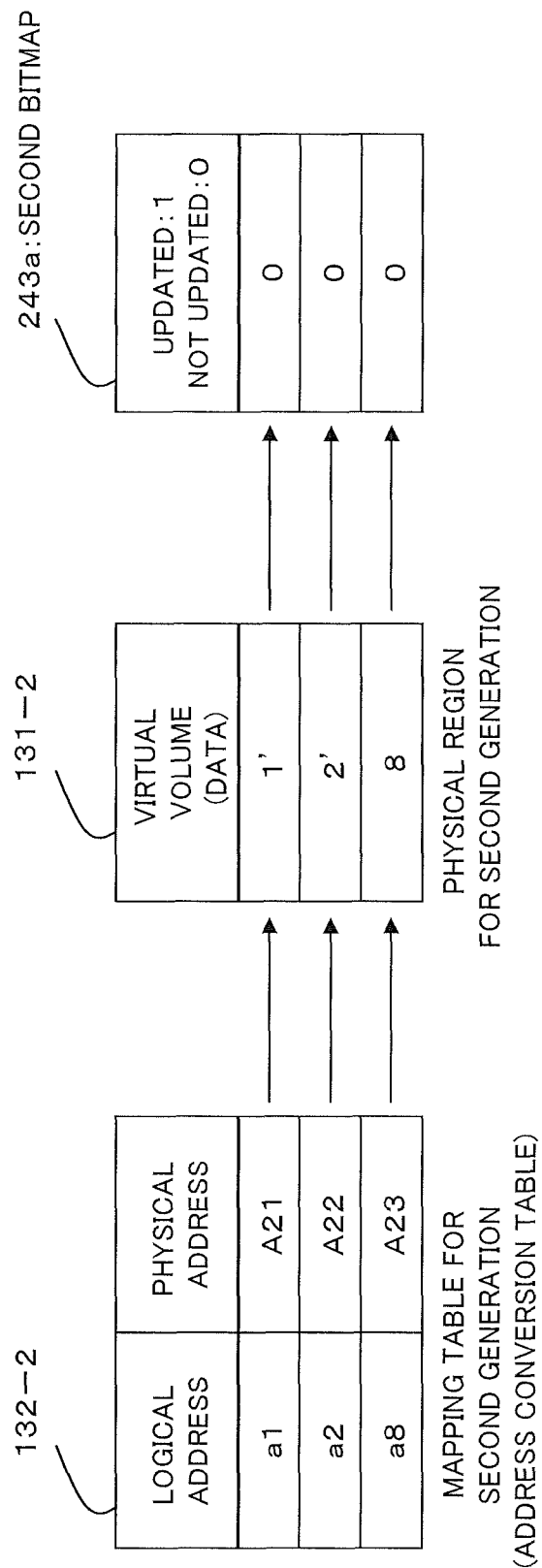
FIG. 21 is a view illustrating contents of a mapping table for the second generation, a virtual volume of the second generation and a second bitmap table corresponding to the backup volume in the second generation illustrated in FIG. 19B.

Further, after a production instruction of a backup volume of each generation is received, the second monitoring section 243 clears the second bitmap table 243a for the preceding generation and secures a region for the second bitmap table 243a having a size corresponding to the capacity of the backup volume of a production target generation (refer to FIGS. 11, 21 and 32).

Such a particular updating monitoring process of a backup volume of the latest generation by the second monitoring section 243 as described above is hereinafter described, for example, with reference to FIGS. 17A, 17B, 18, 25A to 25C and 26.

[A4] Second Production Section 244

If the second production section 244 receives a production instruction of a backup volume of the ith generation, then it produces a backup volume 13b-i of the ith generation based on a result of the monitoring by the first monitoring section 242 and the second monitoring section 243.

Thereupon, the second production section 244 refers to the first bitmap table 242a to recognize the first update region of the operation volume 13a and secures an ith generation physical region 131-i of a capacity corresponding to the capacity of the first update region in the backup volume region 13b. Then, the second production section 244 copies data in the first update region of the operation volume 13a at the point of time at which the production instruction of a backup volume of the ith generation is received into the physical region 131-i in its downward direction in the order of the physical address to produce a backup volume 13b-i of the ith generation.

Further, the second production section 244 refers to the second bitmap table 243a to recognize a second update region in the latest generation backup volume and secures an ith generation physical region 131-i of a capacity corresponding to the capacity of the second update region in the backup volume region 13b. It is to be noted that, if a first update region exists while a second update region does not exist, then an ith generation physical region 131-i of a capacity same as the capacity of the first update region is secured, but if a second update region exists while a first update region does not exist, then an ith generation physical region 131-i having a capacity same as the capacity of the second update region is secured. Further, if none of first and second update regions exist, then an ith generation physical region 131-i of a capacity same as the sum of the capacity of the first update region and the second update region is secured.

Then, the second production section 244 copies data in a region of the operation volume 13a corresponding to the second update region at a point of time at which a production instruction of a backup volume of the ith generation into the ith generation physical region 131-i in its downward direction in the order of the physical address to produce a physical region 13b-i of the ith generation. It is to be noted that, if a first update region exists while a second update region does not exist, then only data in the first update region is copied into the ith generation physical region 131-i, but if a second update region exists while a second update region does not exist, then only data in the region corresponding to the second update region is copied into the ith generation physical region 131-i. Further, if none of first and second update region exist, then data in the first update region and a region corresponding to the second update region are coped into the ith generation physical region 131-i in its downward direction in the order of the physical address.

Further, upon production of the physical region 13b-i of the ith generation, the second production section 244 produces also an ith generation table 132-i for associating logical addresses and physical address of data in the physical region 131-i with each other (refer to FIGS. 21 and 32). This table 132-i has a size corresponding to the capacity of the backup volume 13b-i of the production target generation. In particular, the second production section 244 secures a region of the size in the backup volume region 13b and produces a table 132-i in the secured region. It is to be noted that the table 132-i may be produced in a storage region other than the backup volume region 13b.

A particular production process of a backup volume 13b-i of the ith generation in accordance with a request from the operation server 2 by such a second production section 244 as described above is hereinafter described, for example, with reference to steps S4 and S6 of FIG. 4 and to FIGS. 19A to 21 and 30A to 32.

(A5) Backup Volume Production Process

Here, functions and operation of the first production section 241, first monitoring section 242, second monitoring section 243 and second production section 244, or in other words, a backup volume production process [a1] to [a7] of the present embodiment, is described with reference to a flowchart (steps S1 to S6) illustrated in FIG. 4.

[a1] If the backup controlling section 24 receives a backup volume production instruction from the operation server 2, then it decides whether or not the generation of a backup volume of a production target is the first generation (generation 1) (step S1). At this time, the decision of whether or not the generation of the backup volume of the production target is the generation 1 can be carried out based on whether or not a backup volume is already produced in the backup volume region 13b. In other words, if no backup volume is produced in the backup volume region 13b when the backup volume production instruction is received from the operation server 2, then the backup controlling section 24 decides that the generation of the backup volume of the production target is the generation 1. Alternatively, the decision described above can be carried out also by referring to information indicative of a production target generation, which is included in the backup volume production instruction from the operation server 2.

[a2] If it is decided that the generation of the backup volume of the production target is the first generation (YES route of step S1), then the first production section 241 secures, in the backup volume region 13b, a first generation virtual volume (physical region) 131-1 of a capacity same as that of the operation volume 13a. Then, the first production section 241 copies all data of the operation volume 13a at the point of time at which the current production instruction is received into the secured physical region 131-1 (step S2). At this time, the first production section 241 produces also a first generation table 132-1 for associating logical addresses and physical addresses of the physical region 131-1 with each other. Thereafter, the backup controlling section 24 (first production section 241) ends the processing.

[a3] If it is decided that the generation of the backup volume of the production target is not the first generation (NO route of step S1), or in other words, if the generation of the backup volume of the production target is a second or succeeding generation, then the backup controlling section 24 decides whether or not the backup volume of the immediately preceding generation is updated (step S3). At this time, if it is decided that the generation of the backup volume of the production target is an ith generation, then the backup controlling section 24 refers to the second bitmap table 243a to decide whether or not data of the backup volume of the immediately preceding generation, that is, of the i−1th generation, is updated. If at least one bit which is set to "1" exists in the second bitmap table 243a, then it is decided that data updating is carried out in the backup volume of the immediately preceding generation. On the other hand, if "0" is set to all bits in the second bitmap table 243a, then it is decided that data updating is not carried out in the backup volume of the immediately preceding generation.

[a4] If it is decided that updating is carried out in the backup volume of the immediately preceding generation (YES route of step S3), then the second production section 244 refers to the second bitmap table 243a to recognize the second update region of the latest generation backup volume. Then, the second production section 244 secures an ith generation virtual volume (physical region) 131-i of a capacity equal to that of the second update region in the backup volume region 13b. Then, the second production section 244 copies data in a region of the operation volume 13a corresponding to the second update region at the point of time at which the current production instruction is received into the ith generation physical region 131-i in its downward direction in the order of the physical address (step S4). At this time, the region of the operation volume 13a corresponding to the second update region of the backup volume 13b-(i−1) of the i−1th generation can be specified based on the second bitmap table 243a and the i−1th generation table 132-(i−1). Further, the second production section 244 secures a region of a size corresponding to the capacity of the backup volume 13b-i produced here in the backup volume region 13b and produces, in the secured region, an ith generation table 132-i for associating logical addresses and physical addresses of data in the physical region 131-i with each other.

[a5] After the process at step S4 or when it is decided that the backup volume of the immediately preceding generation is not updated (NO route of step S3), the backup controlling section 24 decides whether or not the operation volume 13a is updated (step S5). At this time, the backup controlling section 24 refers to the first bitmap table 242a to decide whether or not data updating is carried out in the operation volume 13a. If at least one bit which is set to "1" exists in the first bitmap table 242a, then it is decided that data updating is carried out in the operation volume 13a. On the other hand, if "0" is set to all bits in the first bitmap table 242a, then it is decided that data updating is not carried out in the operation volume 13a.

[a6] If it is decided that updating is carried out in the operation volume 13a (YES route of step S5), then the second production section 244 refers to the first bitmap table 242a to recognize the first update region in the operation volume 13a. Then, the second production section 244 secures an ith generation virtual volume (physical region) 131-i of a capacity same as that of the first update region in the backup volume region 13b. Then, the second production section 244 copies the data in the first update region of the operation volume 13a into the secured physical region 131-i in its downward direction in the order of the physical address based on the first bitmap table 242a (step S6). At this time, the second production section 244 secures a region of a size corresponding to the capacity of the backup volume 13b-i produced here in the backup volume region 13b and produces, in the secured region, an ith generation table 132-i for associating logical addresses and physical addresses of data in the physical region 131-i, similarly as at step S4.

[a7] After the processing at step S6 or when it is decided that the operation volume 13a is not updated (NO route of step S3), the backup controlling section 24 (first monitoring section 242) ends the processing.

The first production section 241 and the second production section 244 in the present embodiment produce the backup volume 13b-1 of the first generation and the backup volume 13b-i of the ith generation in such a manner as described above, respectively.

Consequently, in the backup volume region 13b, the volume 13b-1 of the first generation has a capacity same as that of the operation volume 13a and stores all data of the operation volume 13a. Meanwhile, a volume of the second or succeeding generation has a capacity corresponding to the capacity of the update region and stores only data of the update region. Consequently, the capacity of the physical region used by the volume of the second or succeeding generation is suppressed to a minimum necessary level, and also the size of the mapping table for each generation and the second bitmap table 243a can be suppressed to a minimum necessary level.

Figure 4:
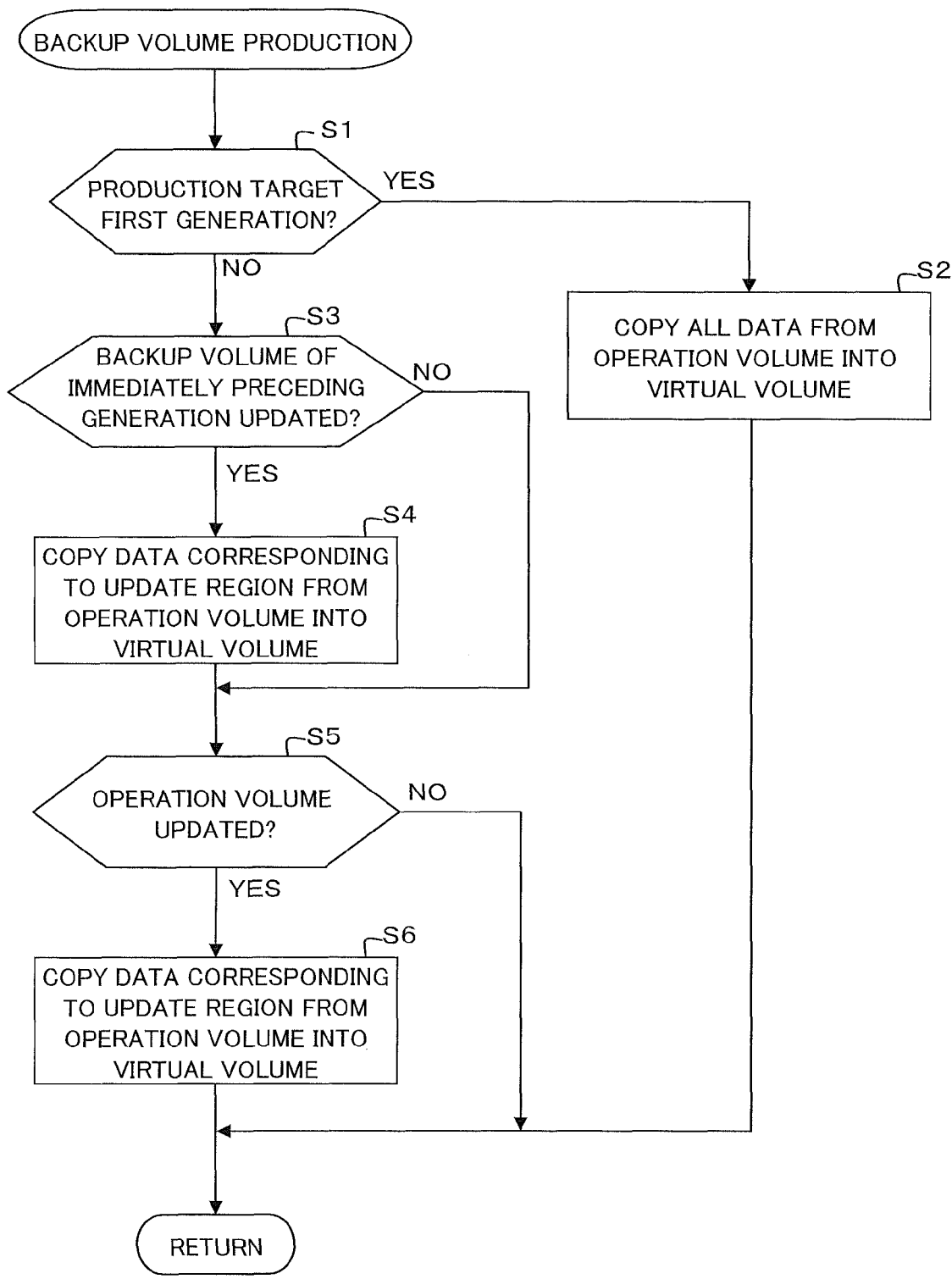
FIG. 4 is a flow chart illustrating a backup volume production process of the present embodiment.

It is to be noted that the execution order of steps S1 to S6 is not limited to that of the example illustrated in FIG. 4. For example, in the process after the NO route of step S1, steps S3 and S4 may be executed after steps S5 and S6 are executed. Or, after steps S3 and S5 are executed collectively as one step, steps S4 and S6 may be executed collectively as one step.

[A6] Reference Processing Section 245

If the reference processing section 245 receives, from the operation server 2, a reference request to data in a backup volume of a particular generation from among a plurality of generations, then it executes a reference process to the backup volume of the particular generation in the following manner. Here, functions and operation of the reference processing section 245, or in other words, a backup volume reference process [b1] to [b4] in the present embodiment, is described with reference to a flow chart (steps S11 to S15) shown in FIG. 5. It is assumed here that the particular generation is, for example, a kth generation (k is a natural number from 1 to i).

[b1] The reference processing section 245 decides whether or not data copy by the first production section 241 or the second production section 244 is carried out in a relevant region of the backup volume of the particular generation designated as a reference target region by the reference request, or in other words, whether or not the relevant region is copied already (step S11). At this time, the reference processing section 245 searches the particular generation table 132-k based on a logical address included in the reference request and designating the reference target region and decides, if a physical address corresponding to the logical address is registered in the particular generation table 132-k, that the relevant region is copied already.

[b2] If it is decided that the relevant region is copied already (YES route of step S11), then the reference processing section 245 reads out data in the relevant region as reference data from the particular generation virtual volume (physical region) 131-k and causes the operation server 2 to refer to the reference data (step S12), whereafter the reference process is ended. At this time, the reference processing section 245 reads out the data in the region designated by the address (refer to [b1]) registered in the particular generation table 132-k as the reference data from the particular generation virtual volume 131-k.

[b3] If it is decided that the relevant region is not copied as yet (NO route of step S11), then the reference processing section 245 refers to a relevant region designated as the reference target region by the reference request in regard to the backup volume of a generation older by one generation than the particular generation (step S13). Then, the reference processing section 245 decides whether or not data copy by the first production section 241 or the second production section 244 is carried out in the relevant region of the backup volume older by one generation then the particular generation, or in other words, whether or not the relevant region is copied already (step S14). Also at this time, the reference processing section 245 searches the k−1th generation table 132-(k−1) based on the logical address which designates the reference target region and decides, if a physical address corresponding to the logical address is registered in the k−1th generation table 132-(k−1), that the relevant region is copied already.

[b4] The reference processing section 245 repeats the processes at steps S13 and S14 tracing back the generation one by one until it is decided at step S14 that the relevant region is copied already. It is assumed here that, as a result of the processes at steps S13 and S14, the reference processing section 245 decides that the relevant region is copied already in the backup volume of the jth generation (j is a natural number which satisfies 1≤j<k) (YES route of step S14). In other words, it is assumed that a physical address corresponding to the logical address is registered in the jth generation table 132-j. In this instance, the reference processing section 245 reads out the data in the relevant region as reference data from the jth generation physical volume (physical region) 131-j and causes the operation server 2 to refer to the reference data (step S15), whereafter the reference process is ended. It is to be noted that, at this time, the reference processing section 245 read out the data in the region designated by the physical address registered in the particular generation table 132-j as the reference data from the physical region 131-j. Consequently, the reference processing section 245 successively traces back and refers to the relevant regions in the backup volumes in the old generations and reads out the data in the relevant region at a point of time at which it is decided that the relevant region is copied already.

It is to be noted that a particular reference process for a particular generation backup volume in accordance with a reference request from the operation server 2 by such a reference processing section 245 as described above is hereinafter described, for example, with reference to FIGS. 16A, 16B, 24A to 24C and 33A to 33D.

[A7] Updating Processing Section 246

If the updating processing section 246 receives an updating request of data in a backup volume of a particular generation from among a plurality of generations from the operation server 2, then it executes an updating process for the backup volume of the particular generation in the following manner. Here, functions and operation of the updating processing section 246, or in other words, a backup volume updating process [c1] to [c5] in the present embodiment, is described with reference to a flow chart (steps S21 to S27) illustrated in FIG. 6. It is assumed also here that the particular generation is, for example, a kth generation (k is a natural number from 1 to i).

[c1] If the updating processing section 246 receives a backup volume updating request from the operation server 2, then it decides whether or not the particular generation (kth generation) designated by the updating request is the latest generation (ith generation), or in other words, whether or not k=i (step S21).

[c2] If it is decided that the particular generation is the latest generation (k=i) (YES route of step S21), then the updating processing section 246 updates the data in the relevant region of the latest generation virtual volume 131-i designated as the update target region by the updating request into the update data designated by the updating request (step S22), and then the updating process is ended. At this time, in response to the updating process by the updating processing section 246, the second monitoring section 243 sets the corresponding bit of the second bitmap table 243a to "1" to record that the data updating is carried out in the region (refer to FIGS. 17A, 17B and 18). Further, if a new region is added to the backup volume 13b-i upon the updating process by the updating processing section 246, then a new region is secured in the second bitmap table 243a, latest generation virtual volume 131-i and latest generation table 132-i and corresponding information is registered into the secured regions (refer to FIGS. 25A to 25C and 26).

[c3] If it is decided that the particular generation is any other than the latest generation (k<i) (NO route of step S21), then the updating processing section 246 carries out the following process. In particular, the updating processing section 246 refers to a relevant region designated as the updating target region by the updating request in regard to the backup volume 13b-(k+1) of a next generation to the particular generation. Then, the updating processing section 246 decides whether or not data copy by the first production section 241 or the second production section 244 is carried out in the relevant region of the backup volume 13b-(k+1) of the next generation, or in other words, whether or not the relevant region is copied already (step S23). At this time, the updating processing section 246 searches the table 132-(k+1) based on the logical address which designates the updating target region and decides, if a physical address corresponding to the logical address is registered in the table 132-(k+1), that the relevant region is copied already.

[c4] If it is decided that the relevant region in the backup volume of the next generation is copied already (YES route of step S23), then the updating processing section 246 carries out the following process. In particular, the updating processing section 246 updates the data in the relevant region of the backup volume of the particular generation (updating target generation) into the update data designated by the updating request (step S24), and then the updating process is ended. In this instance, since the data before updating in the relevant region is stored in the backup volume of the next generation, data updating for the backup volume of the particular generation is carried out without carrying out a special storage process or the like.

[c5] If it is decided that the relevant region of the backup volume of the next generation is not copied (NO route of step S23), then the updating processing section 246 carries out the following process. In particular, the updating processing section 246 issues a reference request, which designates the relevant region of the backup volume 13b-k of the particular generation as a reference target region, to the reference processing section 245 (step S25). Then, if the updating processing section 246 receives data read out by processing (refer to FIG. 5) of the reference processing section 245 in accordance with the reference request, then it copies the read out data into the relevant region of the backup volume 13b-(k+1) of the next generation (step S26). Thereafter, the updating processing section 246 updates the data in the relevant region in the backup volume 13b-k of the particular generation into the update data indicated by the updating request (step S27), and then the updating process is ended. At this time, if a new region is added to the backup volume 13b-k of the particular generation or the backup volume 13b-(k+1) of the next generation in response to the updating process by the updating processing section 246, then a new region is secured in the second bitmap table 243a, physical regions 131-k and 131-(k+1) and tables 132-k and 132-(k+1), and corresponding information is registered into the newly secured regions (refer to FIGS. 27A to 29 and 34A to 36). By such an updating process as described above, it becomes possible to refer to the update data only in the relevant region of the backup volume 13b-k of the particular generation while, in the relevant region of a backup volume 13b-m (m is a natural number which satisfies k<m≤i) of a generation later than the particular generation, it becomes possible to refer to the pre-update data.

It is to be noted that a particular updating process for a particular generation backup volume in accordance with an updating request from the operation server 2 by such an updating processing section 246 as described above is hereinafter described, for example, with reference to FIGS. 17A, 17B, 18, 25A to 29 and 34A to 36.

[A8] Deletion Processing Section 247

If the deletion processing section 247 receives a deletion request of a backup volume of a particular generation from among a plurality of generations from the operation server 2, then it executes a deletion process of the backup volume of the particular generation in the following manner. Here, functions and operation of the deletion processing section 247, or in other words, a backup volume deletion process [d1] to [d6] in the present embodiment, is described with reference to a flow chart (steps S31 to S35) illustrated in FIG. 7. It is assumed also here that the particular generation is, for example, a kth generation (k is a natural number from 1 to i).

[d1] If the deletion processing section 247 receives a backup volume deletion request, then it decides whether or not there exists a backup volume of a generation later than the particular generation (kth generation) designated by the deletion request (step S31).

[d2] If it is decided that there exists no backup volume of a generation later than the particular generation (k=i; NO route of step S31), then the deletion processing section 247 carries out the following process. In particular, the deletion processing section 247 deletes the relationship between the virtual volume 131-k of the backup volume of the particular generation and the operation volume 13a thereby to delete the backup volume 13b-k of the particular generation (step S32), and then the deletion process is ended. The relationship deleted here is, for example, the mapping table 132-k for the particular generation or the like. By carrying out such deletion of the relationship, the operation server 2 is disabled from accessing the backup volume 13b-k of the particular generation, and substantially a state in which the backup volume 13b-k of the particular generation is detected is established.

[d3] If it is decided that there exists a backup volume of a generation later than the particular generation (k<i; YES route of step S31), then the deletion processing section 247 carries out the following process. In particular, the deletion processing section 247 searches for a copied region of the backup volume 13b-k of the particular generation and a non-copied region of the backup volume 13b-(k+1) of a generation next to the particular generation (step S33). Here, the copied region is a region into which data copy by the first production section 241 or the second production section 244 has been carried out in the physical region 131-k of the backup volume of the particular generation. Meanwhile, the non-copied region is a region into which data copy by the first production section 241 or the second production section 244 has not been carried out in the physical region 131-(k+1) of the next generation. The copied region of the physical region 131-k can be searched out by referring to the particular generation table 132-k, and similarly, the non-copied region of the physical region 131-(k+1) can be searched out by referring to the k−1th generation table 132-(k+1)

[d4] The deletion processing section 247 compares the copied region and the non-copied region searched out in this manner with each other to decide whether or not there exists a region with regard to which data copy is carried out in the backup volume 13b-k of the particular generation but is not carried out in the backup volume 13b-(k+1) of the next generation (step S34).

[d5] If it is decided at step S34 that such a region as described above does not exist (NO route), then the deletion processing section 247 advances the processing to step S32 described in [d2] above and deletes the backup volume 13b-k of the particular generation (step S32). Thereafter, the deletion process is ended.

[d6] If it is decided at step S34 that such a region as described above exists (YES route), then the deletion processing section 247 executes the following process. In particular, the deletion processing section 247 copies the data in the relevant region (copied region) of the physical region 131-k of the backup volume of the particular generation into the relevant region (non-copied region) of the physical region 131-(k+1) of the backup volume of the next generation (step S35). At this time, if a new region is added to the backup volume 13b-(k+1) of the next generation in response to the copying process at step S35, then the following process is described further. In particular, a new region is secured in the virtual volume 131-(k+1) and table 132-(k+1), and if the next generation is the latest generation, then a new region is secured also in the second bitmap table 243a. Then, corresponding information is registered into the newly secured regions (refer to FIGS. 37A to 38). Thereafter, the deletion processing section 247 advances the processing to step S32 described in [d2] given hereinabove and deletes the backup volume 13b-k of the particular generation (step S32), and then the deletion process is ended.

By carrying out deletion after the copy process at step S35 as described above, data which was stored in the particular generation (deletion object generation) but was not stored in the next generation is stored into the backup volume of the next generation. Consequently, even if the backup volume of the particular generation is deleted, the data can be prevented from disappearing from the backup volume region 13b by the deletion, and all data are maintained in the backup volume region 13b in such a state that they can be referred to and restored.

It is to be noted that such a deletion process of a particular generation backup volume in accordance with a deletion request from the operation server 2 by the deletion processing section 247 as described above is hereinafter described, for example, with reference to FIGS. 37A to 38.

[A9] Others

It is to be noted that, in FIGS. 1 and 2, the copying source side one of the two backup controlling sections 24, 24 is denoted by reference character 24a while the copying destination side one is referred to by reference character 24b. The copy source backup controlling section 24a and the copy destination backup controlling section 24b may be configured similarly to the backup controlling section 24 described hereinabove with reference to FIG. 2. Or, one of the copy source backup controlling section 24a and the copy destination backup controlling section 24b may have same functions as those of the backup controlling section 24 illustrated in FIG. 2. Further, the configuration same as that of the backup controlling section 24 illustrated in FIG. 2 may be provided across the copy source backup controlling section 24a and the copy destination backup controlling section 24b.

[2] Particular Operation of the Embodiment

Now, particular operation of the backup apparatus 100 (backup controlling section 24) of the present embodiment configured in such a manner as described above is described hereinabove with reference to FIGS. 8 to 38. It is to be noted that, in the following description, the "backup volume" is sometimes referred to simply as "backup", and similarly, the "bitmap table" is sometimes referred to simply as "bitmap".

Figure 8:
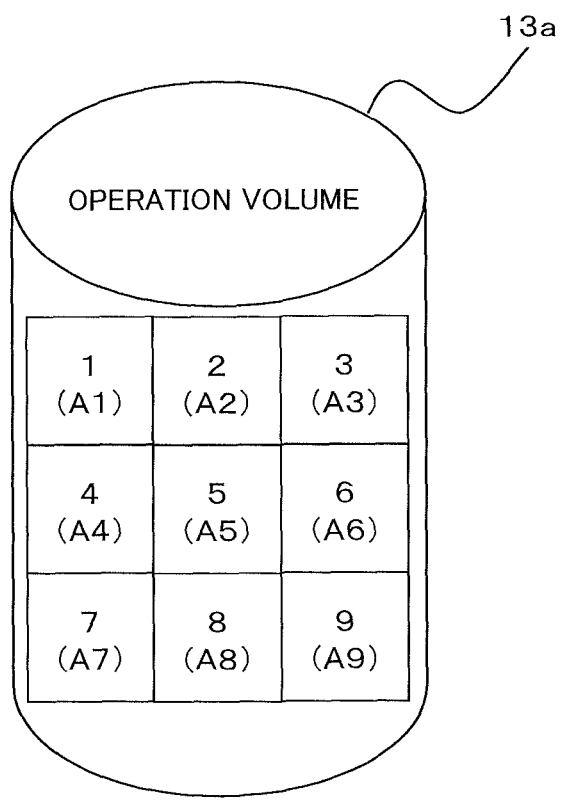
FIG. 8 is a view illustrating an example of an initial state of an operation volume in the present embodiment.

Here, operation in the case where backups 13b-1 to 13b-3 of the operation volume 13a having such an initial state as illustrated in FIG. 8 are produced at time 00:00, 01:00 and 02:00, respectively, and updating of the operation volume 13a and reference/updating/deletion for the backups 13b-1 to 13b-3 of different generations are carried out is described.

[2-1] Initial State of the Operation Volume 13a

As seen in FIG. 8, the operation volume 13a in the initial state has 9 regions individually designated by physical addresses A1 to A9, and data 1 to 9 are stored in the nine regions. In FIG. 8, the physical addresses A1 to A9 for designating the regions are indicated in parentheses. It is to be noted that, when the operation server 2 accesses each of the data 1 to 9 of the operation volume 13a, it designates the data 1 to 9, for example, with a logical address a1 to a9. Therefore, the logical addresses a1 to a9 and the physical addresses A1 to A9 are associated with each other by an address conversion table.

[2-2] Operation after backup production of the generation 1 (first generation) till time immediately prior to backup production of a generation 2 (second generation) (operation within a period from time 00:00 to time 01:00)

(11) At time 00:00, a backup volume 13b-1 of the generation 1 regarding the operation volume 13a illustrated in FIG. 9A is acquired and produced as seen in FIG. 9B by the first production section 241 in accordance with a production instruction of a backup volume of the generation 1 from the operation server 2.

In short, all data 1 to 9 of the operation volume 13a at the point of time at which the production instruction of a backup volume of the first generation is received from the operation server 2 are copied into the virtual volume 131-1 by the first production section 241 (refer to a shaded portion of FIG. 9B; refer to the YES route of step S1 of FIG. 4 to step S2).

At this time, a physical region (virtual volume) 131-1 of a capacity same as that of the operation volume 13a is secured. Then, as seen in FIG. 9B or 11, the data 1 to 9 at the physical addresses A1 to A9 of the operation volume 13a are copied into the regions designated by physical addresses A11 to A19 of the secured physical region 131-1 in their downward direction.

Further, as seen in FIG. 11, a first generation table 132-1 which associates the logical addresses a1 to a9 and the physical addresses A11 to A19 of the data in the physical region 131-1 is produced. Since the address conversion is carried out using the first generation table 132-1, when the operation server 2 refers to the backup volume 13b-1 using the logical addresses a1 to a9, it can refer to the backup volume 13b-1 as such a logical volume as illustrated in FIG. 9B.

Further, in order to monitor the update situation of the operation volume 13a illustrated in FIG. 9A by means of the first monitoring section 242, such a first bitmap table 242a as illustrated in FIG. 10 is produced. This first bitmap table 242a is configured from 9 bits individually corresponding to the nine regions of the operation volume 13a and has "0" set to all bits thereof in the initial state thereof. In FIG. 10, the first bitmap table 242a is illustrated in association with the logical addresses a1 to a9, physical addresses A1 to A9 and data 1 to 9.

Further, in order to monitor the update situation of the virtual volume 131-1 illustrated in FIG. 9B by means of the second monitoring section 243, such a second bitmap table 243a as illustrated in FIG. 11 is produced. This second bitmap table 243a is configured from 9 bits individually corresponding to the nine regions of the virtual volume 131-1 and has "0" set to all bits thereof in the initial state thereof. It is to be noted that, in FIG. 11, the second bitmap table 243a is illustrated in association with the mapping table 132-1 (logical addresses a1 to a9/physical addresses A11 to A19) and the data 1 to 9 of the virtual volume 131-1.

It is to be noted that logical volumes illustrated in FIG. 9B and some succeeding figures illustrate states of backup volumes which look logically from the operation server 2 and are not actually provided in the individual backup volumes. Further, in the regions of the virtual volumes 131-1 to 131-3 illustrated in FIG. 9B and some other succeeding figures, data placed in the regions are illustrated and corresponding physical addresses are indicated with parentheses. Further, in each region of the logical volumes illustrated in FIG. 9B and some other succeeding figures, actual data which looks in the region from the operation server 2 is indicated, and a corresponding logical address a1 to a9 is indicated with parentheses.

Figure 12B:
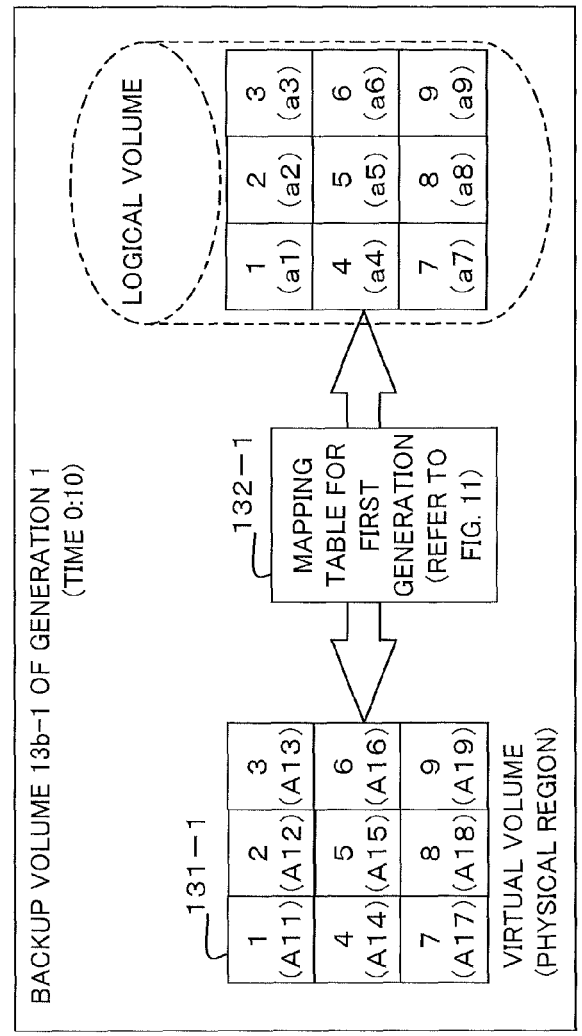
Figure 12A:
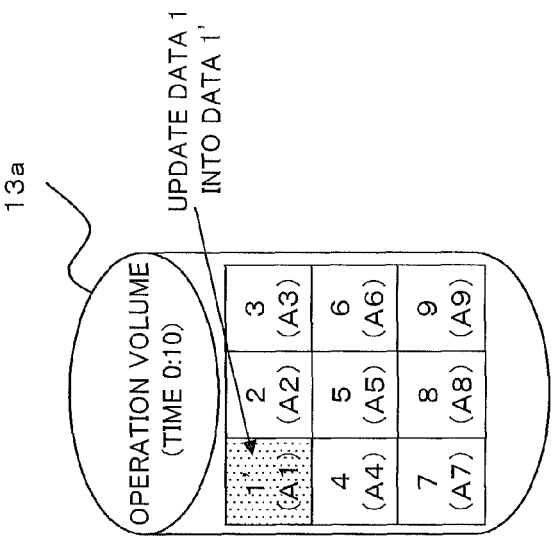
Figure 13:
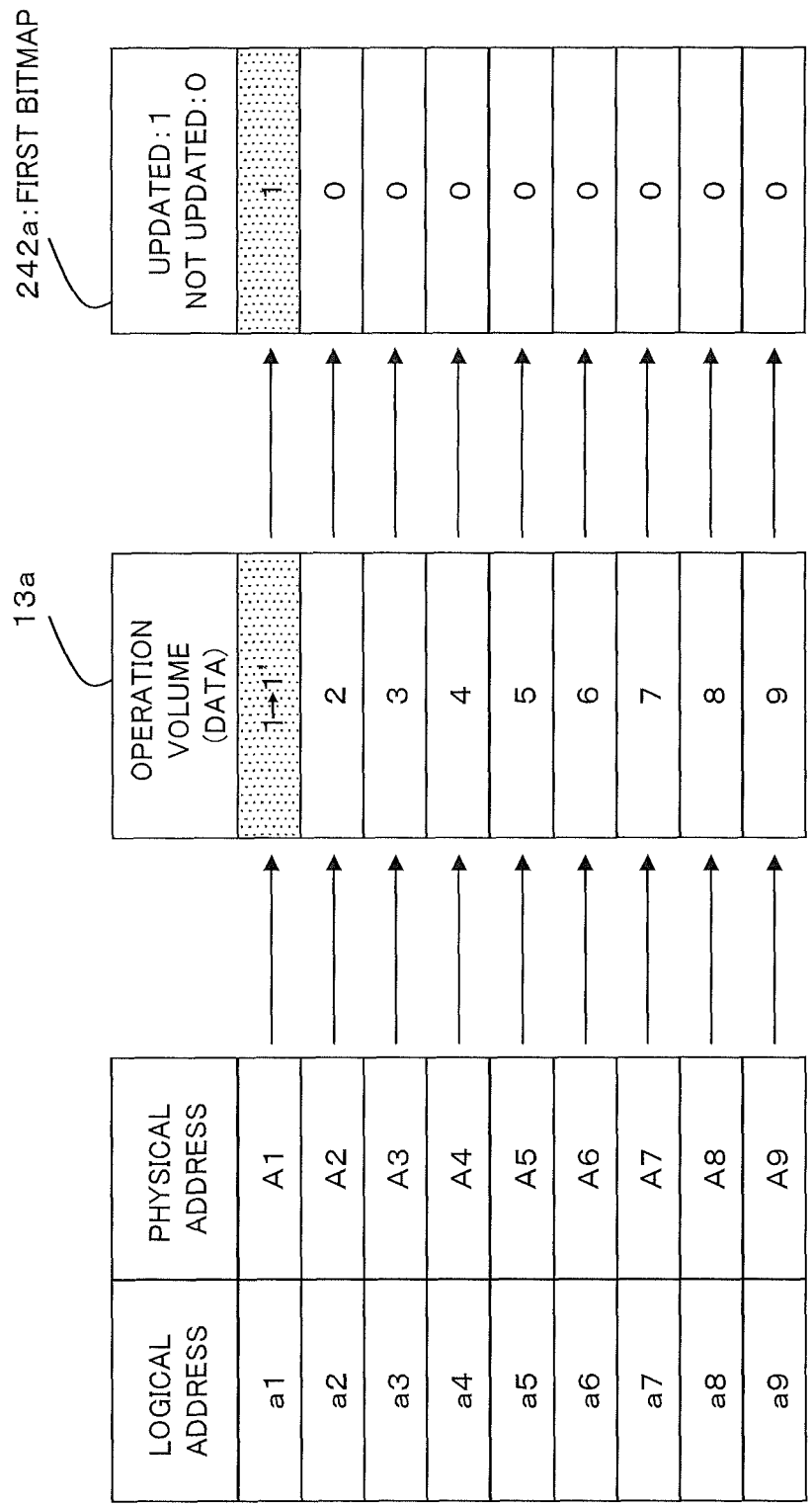
FIG. 13 is a view illustrating contents of a first bitmap table corresponding to the operation volume illustrated in FIG. 12A.

(12) At time 00:10, the data 1 of the operation volume 13a is updated to data 1' as seen in FIG. 12A in accordance with the updating request for the operation volume 13a. When updating of the operation volume 13a is carried out, the update situation is monitored by the first monitoring section 242, and the first bitmap table 242a is updated by the first monitoring section 242. In particular, in FIG. 12A, the data 1 at the physical address A1 is updated to the data 1' in the operation volume 13a, and therefore, a bit of the first bitmap table 242a corresponding to the physical address A1 is rewritten from "0" into "1" as seen in FIG. 13 (refer to a shaded portion). At this time, a copying process and so forth are not carried out. Further, as seen in FIG. 12B, no change occurs with the backup volume 13b-1. It is to be noted that the updating process for the operation volume 13a is executed, for example, by the CPU 21 (refer to FIG. 1).

Figure 15:
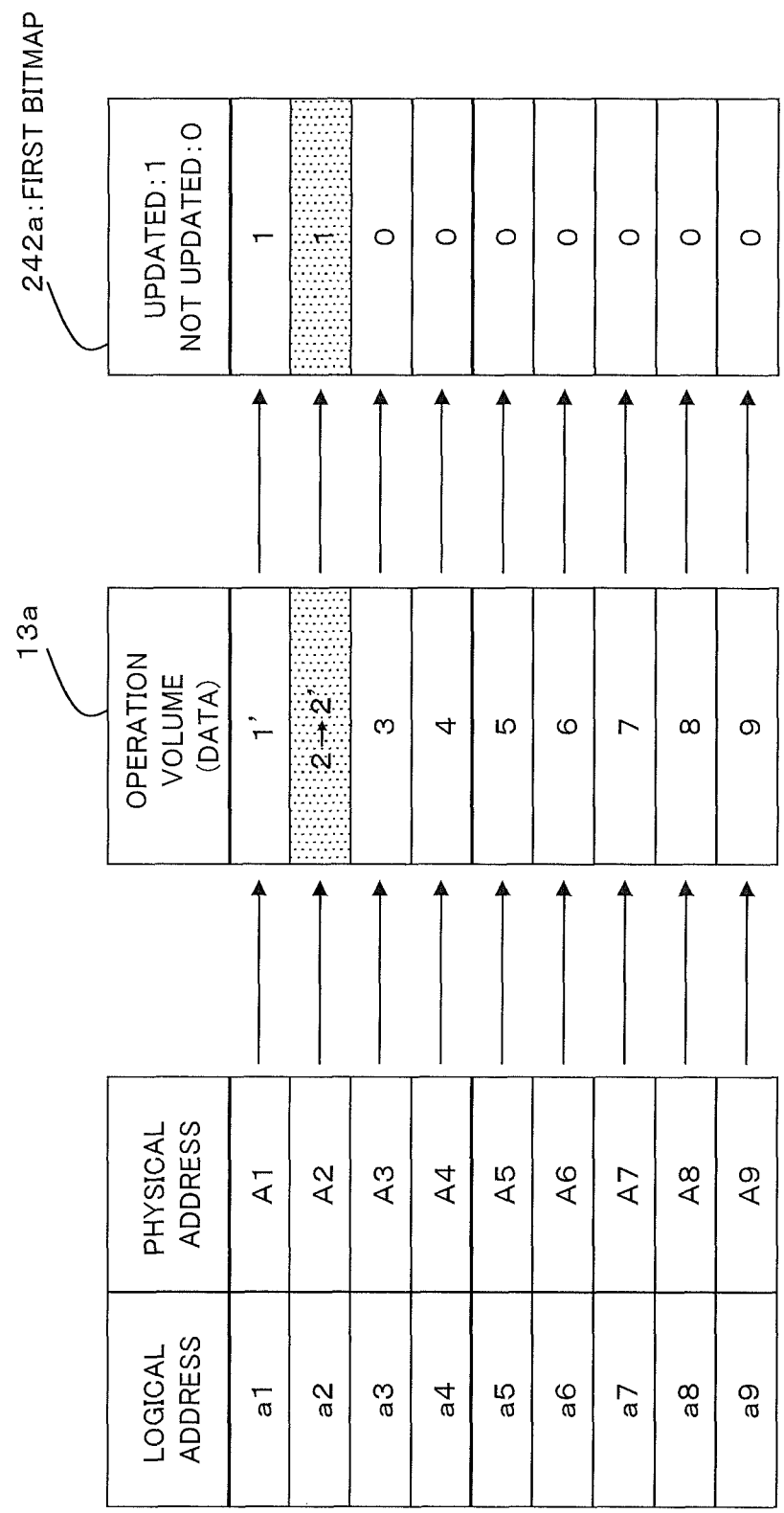
FIG. 15 is a view illustrating contents of a first bitmap table corresponding to the operation volume illustrated in FIG. 14A.

(13) At time 00:20, the data 2 of the operation volume 13a is updated to data 2' as seen in FIG. 14A in accordance with an updating request for the operation volume 13a from the operation server 2. Also in this instance, the update situation is monitored by the first monitoring section 242 similarly as in (12) described hereinabove, and the first bitmap table 242a is updated by the first monitoring section 242. In particular, in FIG. 14A, the data 2 at the physical address A2 is updated to the data 2' in the operation volume 13a, and therefore, a bit of the first bitmap table 242a corresponding to the physical address A2 is rewritten from "0" to "1" as seen in FIG. 15 (refer to a shaded portion). At this time, a copying process and so forth are not carried out. Further, as seen in FIG. 14B, no change occurs with the backup volume 13b-1.

Figure 16B:
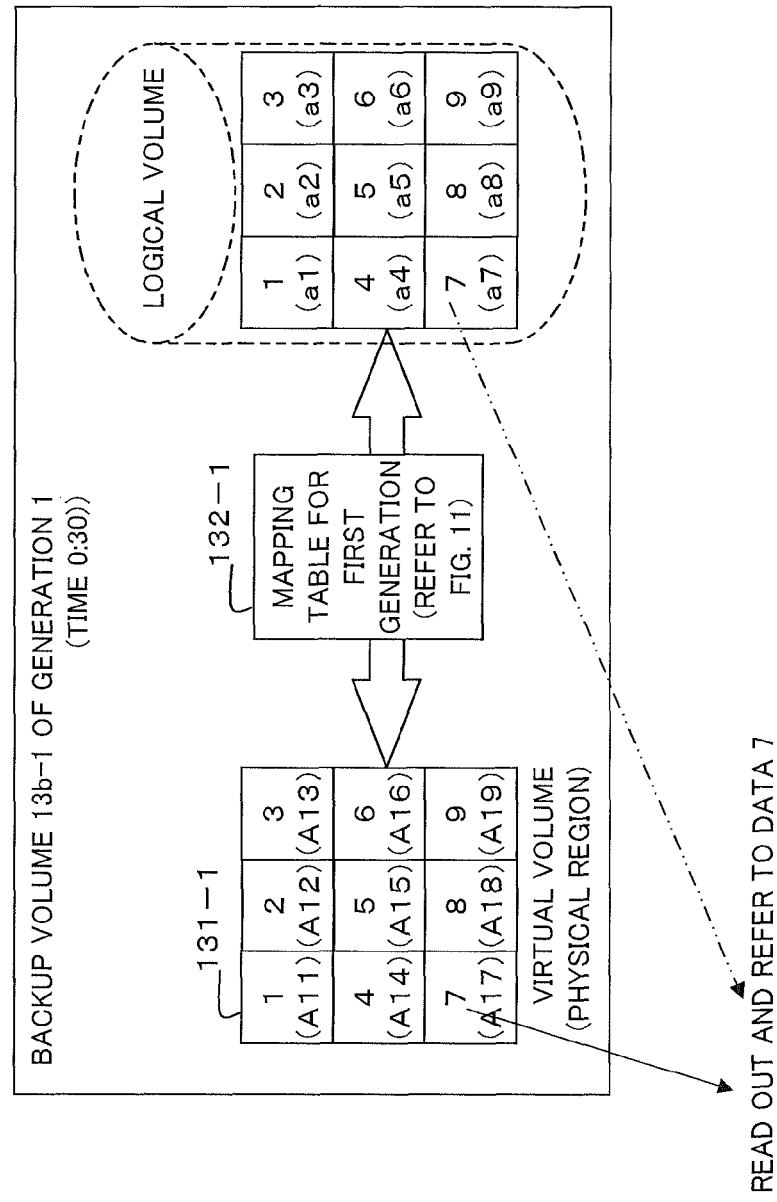
Figure 16A:
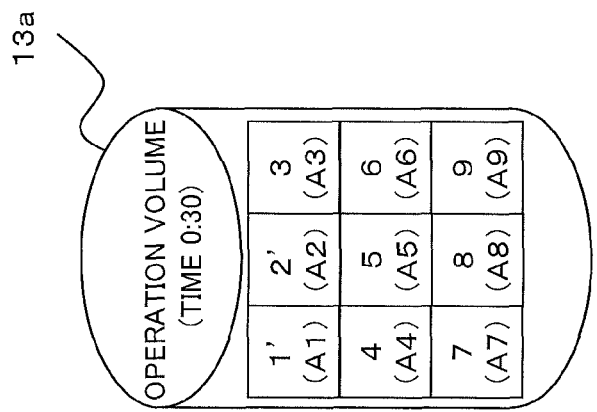

(14) At time 00:30, a reference request to data at the logical address a7 of the backup volume 13b-1 is received from the operation server 2, and a reference process is executed. In this instance, the logical address a7 is converted into the physical address A17 using the mapping table 132-1 (refer to FIG. 11) in accordance with the reference request. In other words, the region of the backup 13b-1 corresponding to the logical address a7 is in a copied state. Therefore, as seen in FIG. 16B, the data 7 at the physical address A17 of the backup 13b-1 is read out and referred to by the operation server 2. Such a reference process as just described is executed by the reference processing section 245 described above (refer to step S12 from the YES route of step S11 of FIG. 5). At this time, a copying process and so forth are not carried out. Further, as seen in FIGS. 16A and 16B, no change occurs with the operation volume 13a and the backup 13b-1.

Figure 17B:
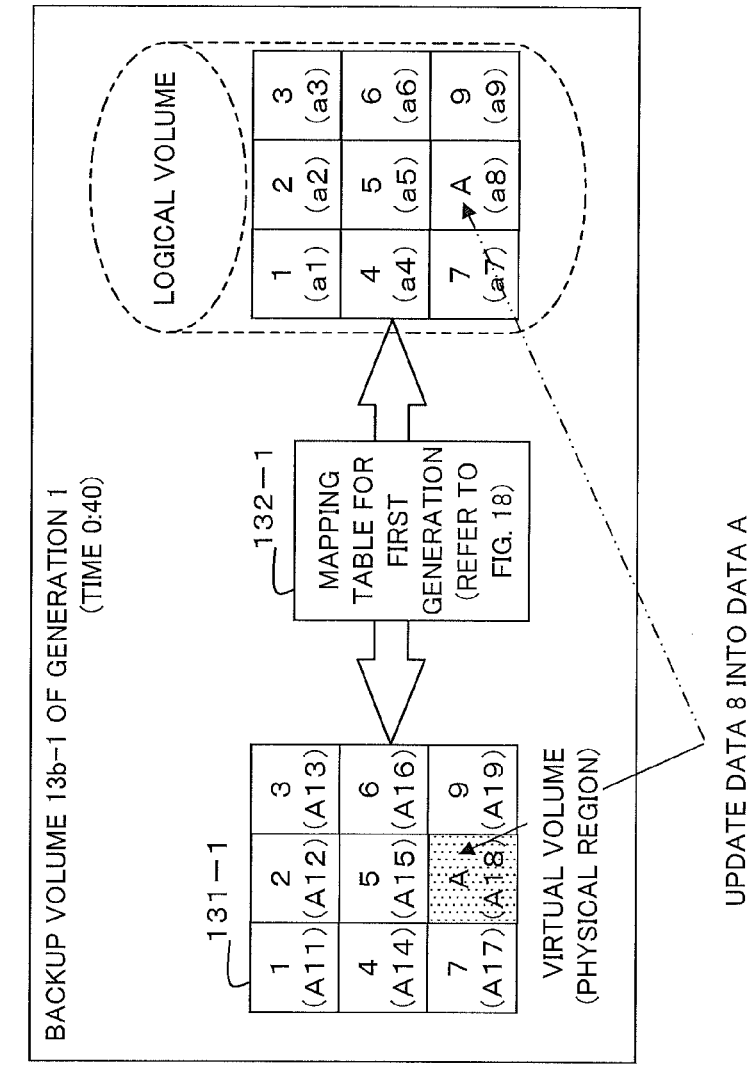

(15) At time 00:40, an updating request for updating the data 8 at the logical address a8 of the backup 13b-1 to the data A is received from the operation server 2, and an updating process is executed. In this instance, the logical address a8 is converted into the physical address A18 using the mapping table 132-1 (refer to FIG. 11) in accordance with the updating request. Further, since the backup 13b-1 at this point of time is of the latest generation, the data 8 at the physical address A18 of the backup 13b-1 is updated to data A as seen in FIG. 17B (refer to a shaded portion). Such an updating process as described above is executed by the updating processing section 246 described hereinabove (refer to step S22 from the YES route of step S21 of FIG. 6).

Figure 18:
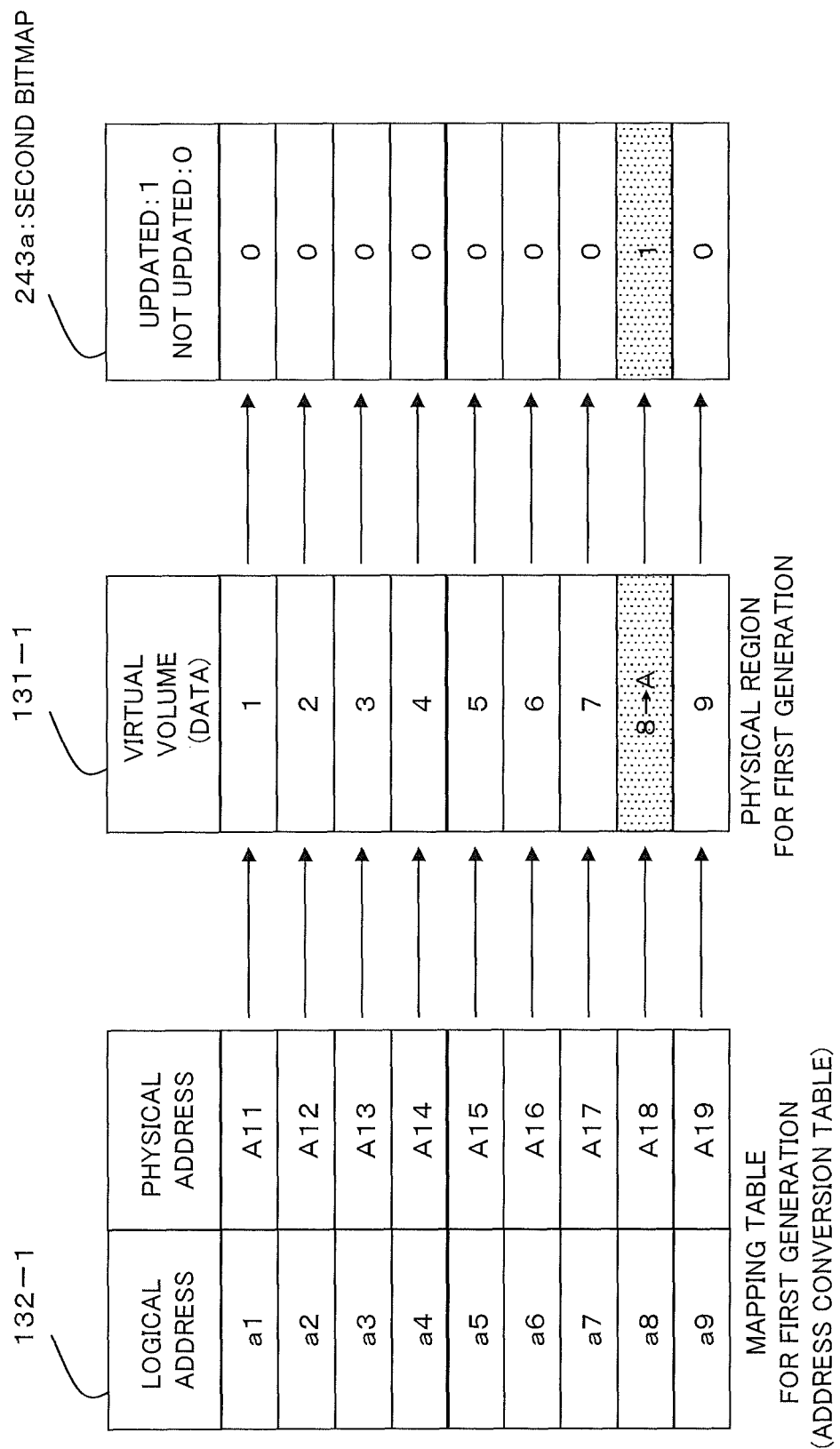
FIG. 18 is a view illustrating contents of a mapping table for the first generation, a virtual volume of the first generation and a second bitmap table corresponding to the backup volume of the first generation illustrated in FIG. 17B.

In the case where updating of the backup 13b-1 is carried out in this manner, the update situation is monitored by the second monitoring section 243, and the second bitmap table 243a is updated by the second monitoring section 243. In other words, in FIG. 17B, the data 8 at the physical address A18 is updated to the data A in the backup 13b-1, and therefore, a bit of the second bitmap table 243a corresponding to the physical address A18 is rewritten from "0" to "1" as seen in FIG. 18 (refer to a shaded portion).

Figure 17A:
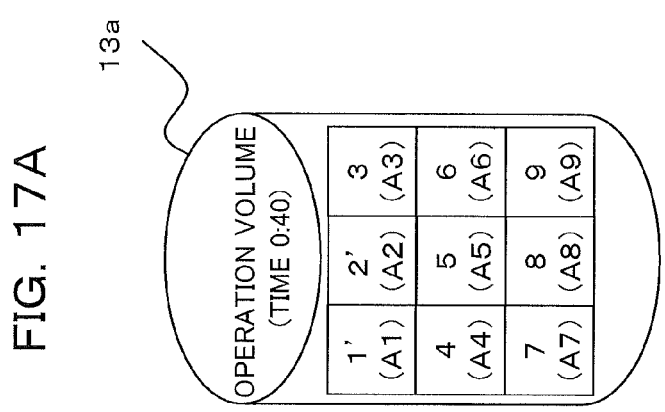

At this time, since the updating is carried out for the backup 13b-1 of the latest generation, a copying process and so forth are not carried out. Further, as seen in FIG. 17A, no change occurs with the operation volume 13a.

[2-3] Operation after backup production for the generation 2 till a point of time immediately preceding to backup production for the generation 3 (third generation) (operation within a period from time 01:00 to time 02:00)

Figure 19A:
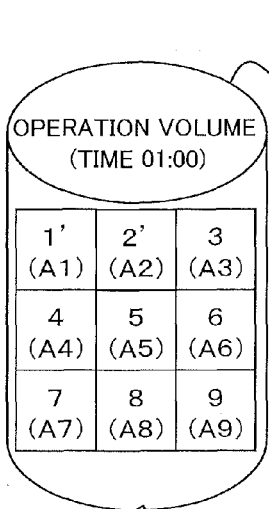
Figure 19B:
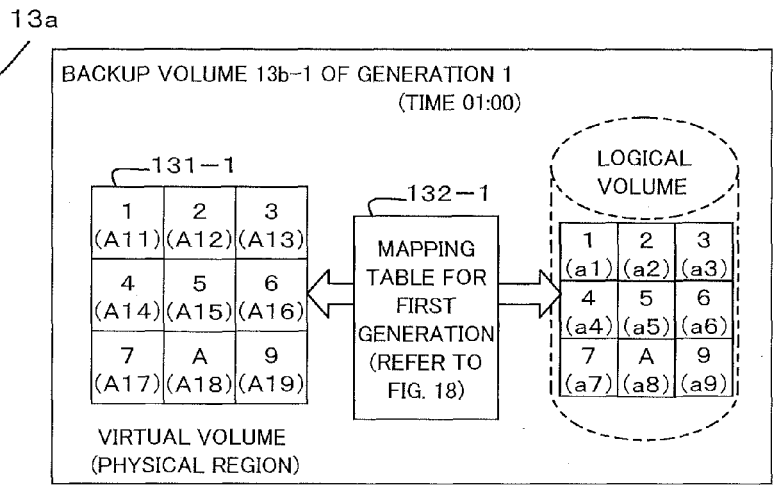
Figure 19C:
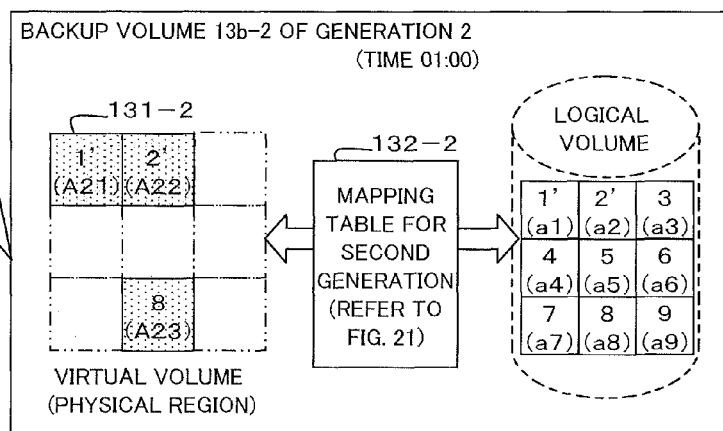

(21) At time 01:00, the backup 13b-2 of the generation 2 of the operation volume 13a illustrated in FIG. 19A is acquired and produced as seen in FIG. 19C by the second production section 244 in accordance with a production instruction of a backup volume of the generation 2 from the operation server 2 (refer to steps S3 to S6 from the NO route of step S1 of FIG. 4).

In particular, here the first bitmap table 242a illustrated in FIG. 15 and the second bitmap table 243a illustrated in FIG. 18 are referred to by the second production section 244, and the first update regions A1 and A2 of the operation volume 13a and the second update region A18 of the backup 13b-1 are recognized. Then, a physical volume (virtual volume) 131-2 of a capacity corresponding to the capacity of the update regions (here the capacity corresponding to three regions) is secured. This physical region 131-2 is formed from three successive regions designated, for example, by physical addresses A21 to A23, respectively.

Into the regions of the physical region 131-2 secured in this manner, the data 1' and 2' in the first update regions A1 and A2 of the operation volume 13a and the data 8 in the region A8 of the operation volume 13a corresponding to the second update region A18 are copied in the downward direction in the order of the physical address as seen in FIG. 19C or 21. At this time, the region A8 of the operation volume 13a which corresponds to the second update region A18 of the backup 13b-1 is specified based on the second bitmap table 243a and the mapping table 132-1 both illustrated in FIG. 18 and the address conversion table (refer to [2-1] hereinabove) of the operation volume 13a.

Further, as seen in FIG. 21, a mapping table 132-2 is produced which associates the logical addresses a1, a2 and a8 corresponding to update regions A1, A2 and A18 and the physical addresses A21, A22 and A23 of the data 1', 2' and 8 in the physical region 131-2 with each other, respectively. At this time, a region of a size corresponding to the capacity of the physical region 131-2 (here the capacity corresponding to three regions) is secured in the backup volume region 13b, and a mapping table 132-2 is produced in the region.

The mapping table 132-2 produced in this manner and the mapping table 132-1 illustrated in FIG. 18 or 19B are used to link the virtual volumes 131-1 and 131-2 with each other. Consequently, when the operation server 2 uses the logical addresses a1 to a9 to refer to the backup 13b-2, the backup 13b-2 can be referred to as such a logical volume as illustrated in FIG. 19C.

Then, in order to monitor the update situation of the operation volume 13a illustrated in FIG. 19A after the backup production instruction of the generation 2 by means of the first monitoring section 242, all bits of the first bitmap table 242a are cleared to "0" as seen in FIG. 20.

Further, in order to monitor the update situation of the virtual volume 131-2 illustrated in FIG. 19C by means of the second monitoring section 243, such a second bitmap 243a as illustrated in FIG. 21 is produced newly in place of the second bitmap 243a illustrated in FIG. 18. The newly produced second bitmap 243a is configured from 3 bits individually corresponding to the three regions of the virtual volume 131-2, and "0" is set to all bits of the virtual volume 131-2 in its initial state. It is to be noted that, in FIG. 21, the second bitmap table 243a is illustrated in an associated relationship with the mapping table 132-2 (logical addresses a1, a2, a8/physical addresses A21 to A23) and the data 1', 2' and 8 of the virtual volume 131-2.

It is to be noted here that no change occurs with the operation volume 13a and the backup 13b-1 of the generation 1 as illustrated in FIGS. 19A and 19B.

Figure 23:
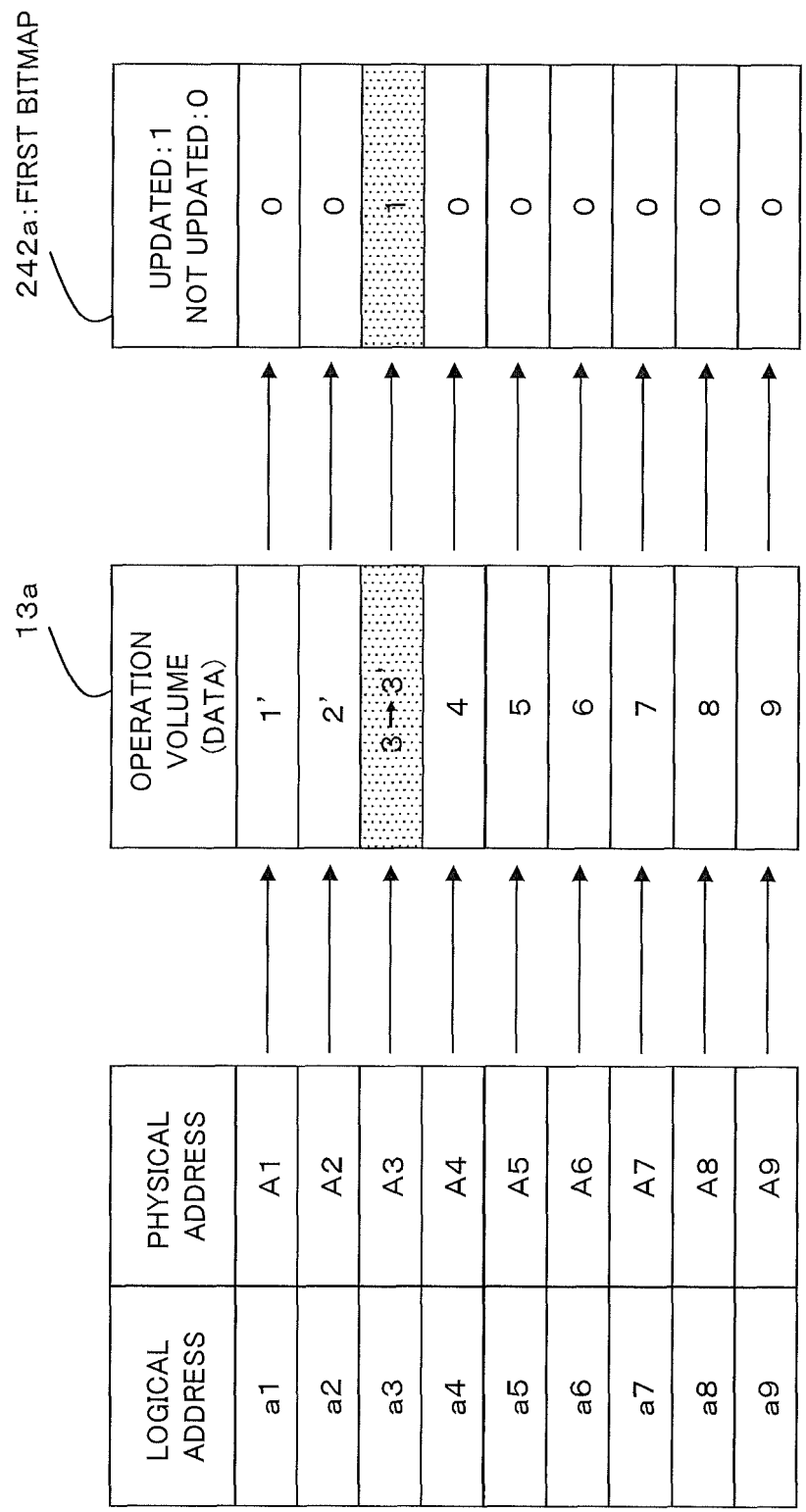
FIG. 23 is a view illustrating contents of a first bitmap table corresponding to the operation volume illustrated in FIG. 22A.

(22) At time 01:10, the data 3 of the operation volume 13a is updated to data 3' as seen in FIG. 22A in accordance with an updating request to the operation volume 13a from the operation server 2. Also in this instance, similarly as in (12) described hereinabove, the update situation is monitored by the first monitoring section 242, and the first bitmap 242a is updated by the first monitoring section 242. In other words, the data 3 at the physical address A3 of the operation volume 13a is updated to the data 3', and consequently, a bit of the first bitmap table 242a corresponding to the physical address A3 is rewritten from "0" to "1" as seen in FIG. 23 (refer to a shaded portion). At this time, a copying process and so forth are not carried out. Further, as seen in FIGS. 22B and 22C, no change occurs with the backups 13b-1 and 13b-2.

(23) At time 01:20, a reference request to data at the logical address a7 of the backup 13b-2 of the generation 2 is received from the operation server 2, and a reference process is executed. In this instance, the backup 13b-2 is referred to in accordance with the reference request, and the mapping table 132-2 (refer to FIG. 21) of the backup 13b-2 is searched based on the logical address a7. However, the logical address a7 is not registered in the mapping table 132-2 illustrated in FIG. 21. In short, the region of the backup 13b-2 which corresponds to the logical address a7 is in a non-copied state.

Figure 24A:
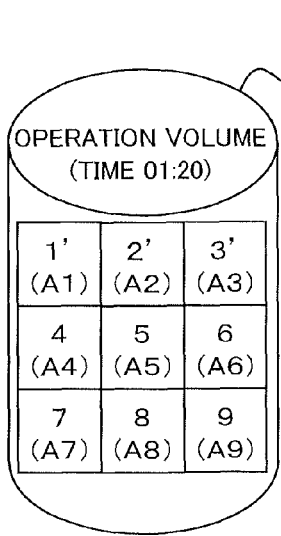
Figure 24B:
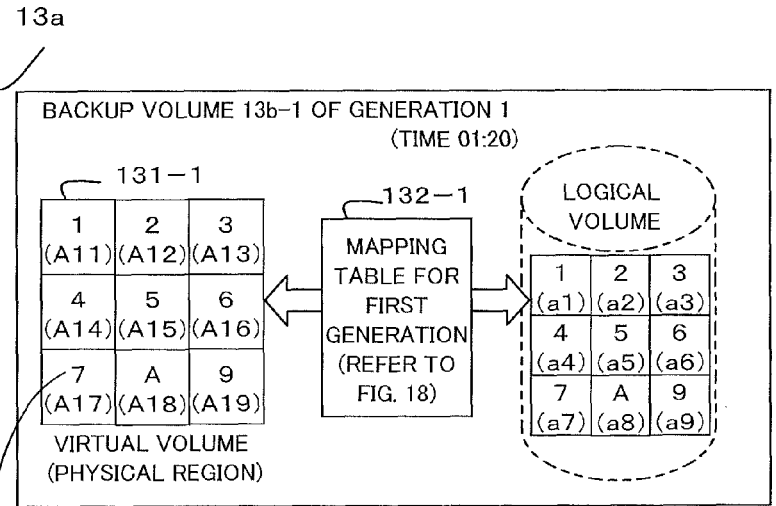
Figure 24C:
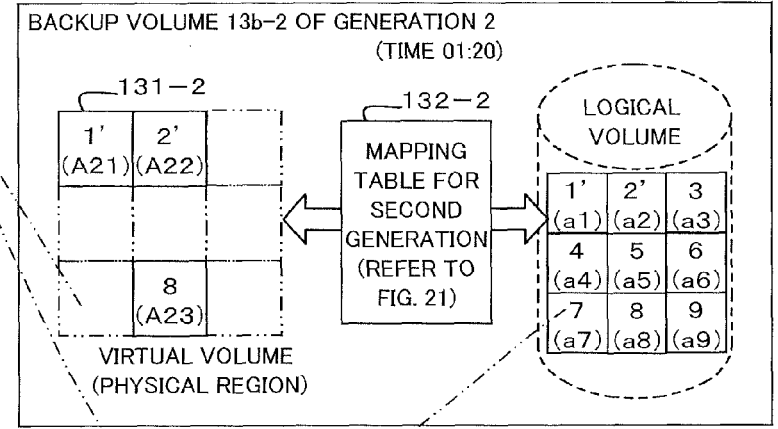

Therefore, the backup 13b-1 is referred to tracing back from the generation 2 to the generation 1, and the logical address a7 is converted into the physical address A17 using the mapping table 132-1 (refer to FIG. 18). Then, as seen in FIGS. 24B and 24C, the data 7 at the physical address A17 of the backup 13b-1 is read out and referred to by the operation server 2.

Figure 5:
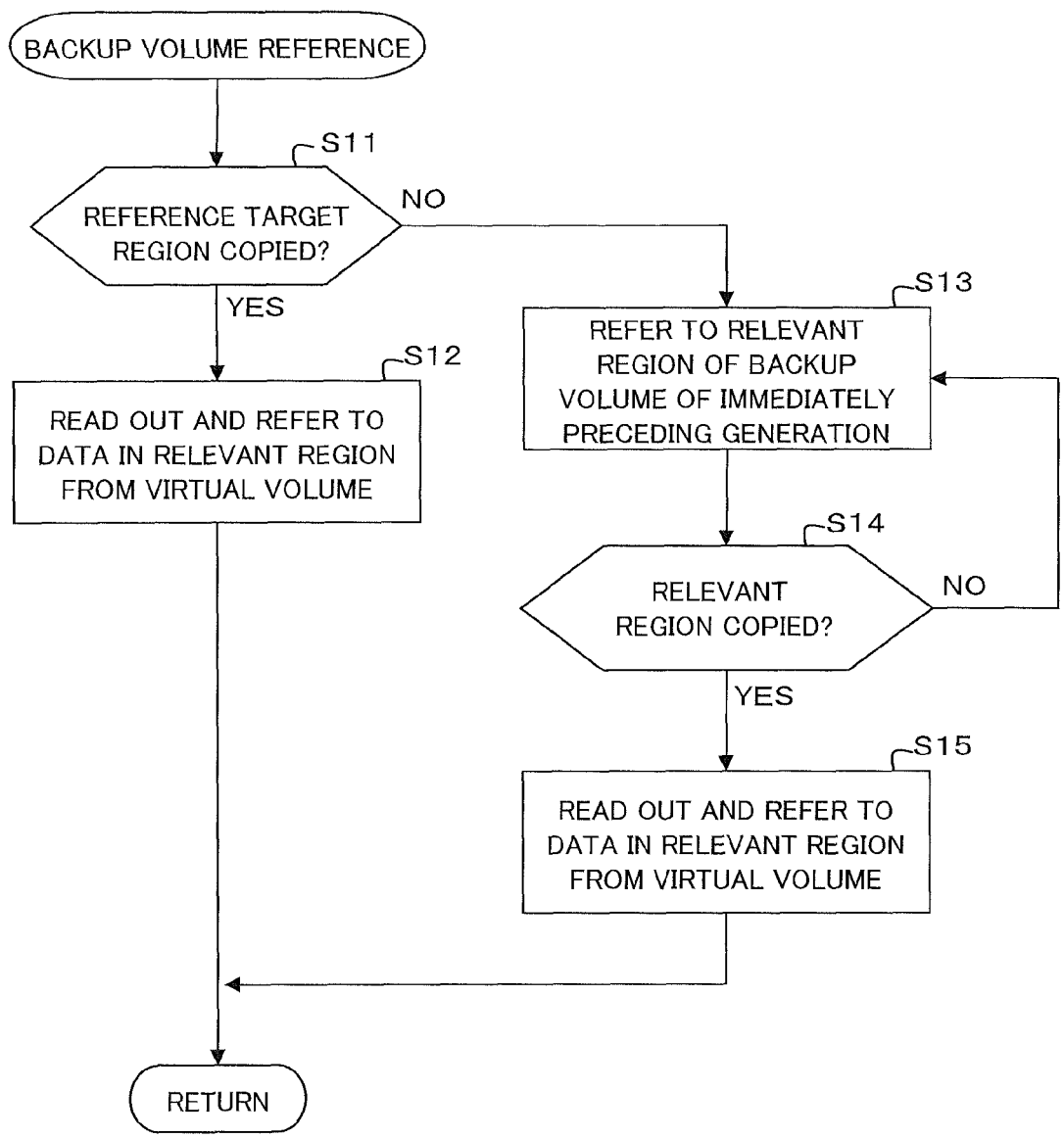
FIG. 5 is a flow chart illustrating a backup volume reference process of the present embodiment.

Such a reference process as described above is executed by the reference processing section 245 described hereinabove (refer to steps S13 to S15 from the NO route of step S11 of FIG. 5).

At this time, a copying process and so forth can be carried out. Further, as seen in FIGS. 24A to 24C, no change occurs with the operation volume 13a and the backups 13b-1 and 13b-2.

(24) At time 01:30, an updating request for updating the data 9 at the logical address a9 of the backup 13b-2 of the generation 2 to the data B is received from the operation server 2, and an updating process is executed. At this point of time, since the backup 13b-2 is the latest generation, updating of the backup 13b-2 is carried out. However, at the point of time at which the updating request is received, the logical address a9 and a physical address corresponding to the logical address a9 are not registered in the mapping table 132-2 of the backup 13b-2 illustrated in FIG. 21. In other words, the region of the backup 13b-2 corresponding to the logical address a9 is in a non-copied state.

Figure 25A:
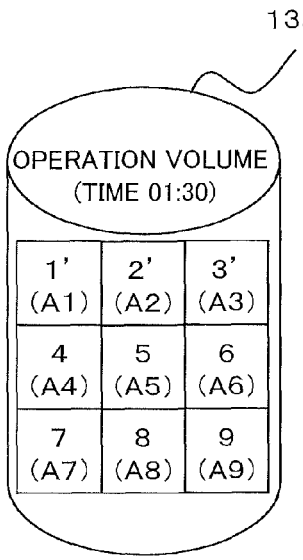
Figure 25B:
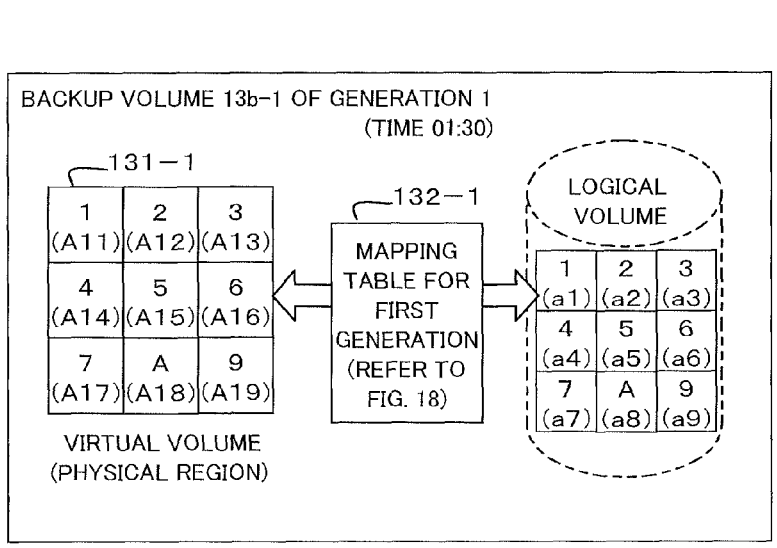
Figure 25C:
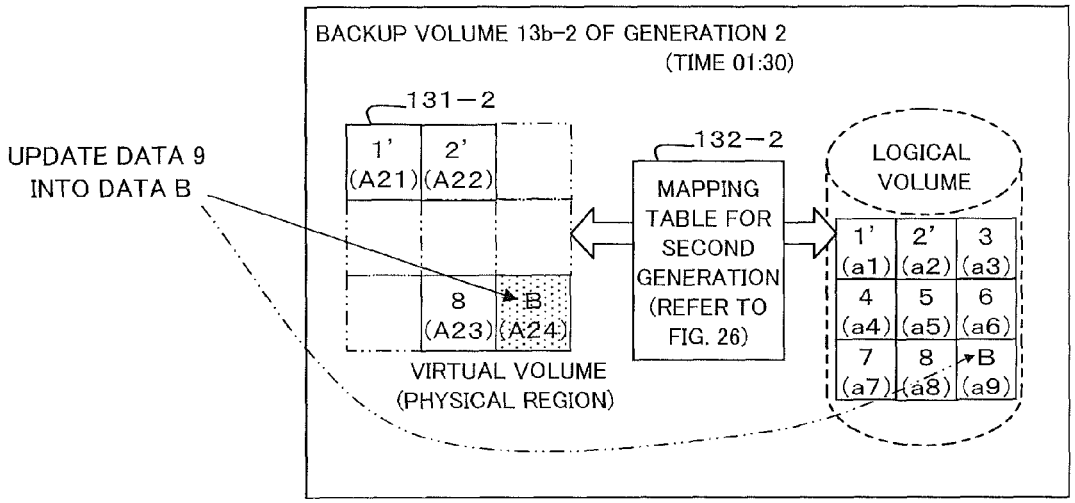
Figure 26:
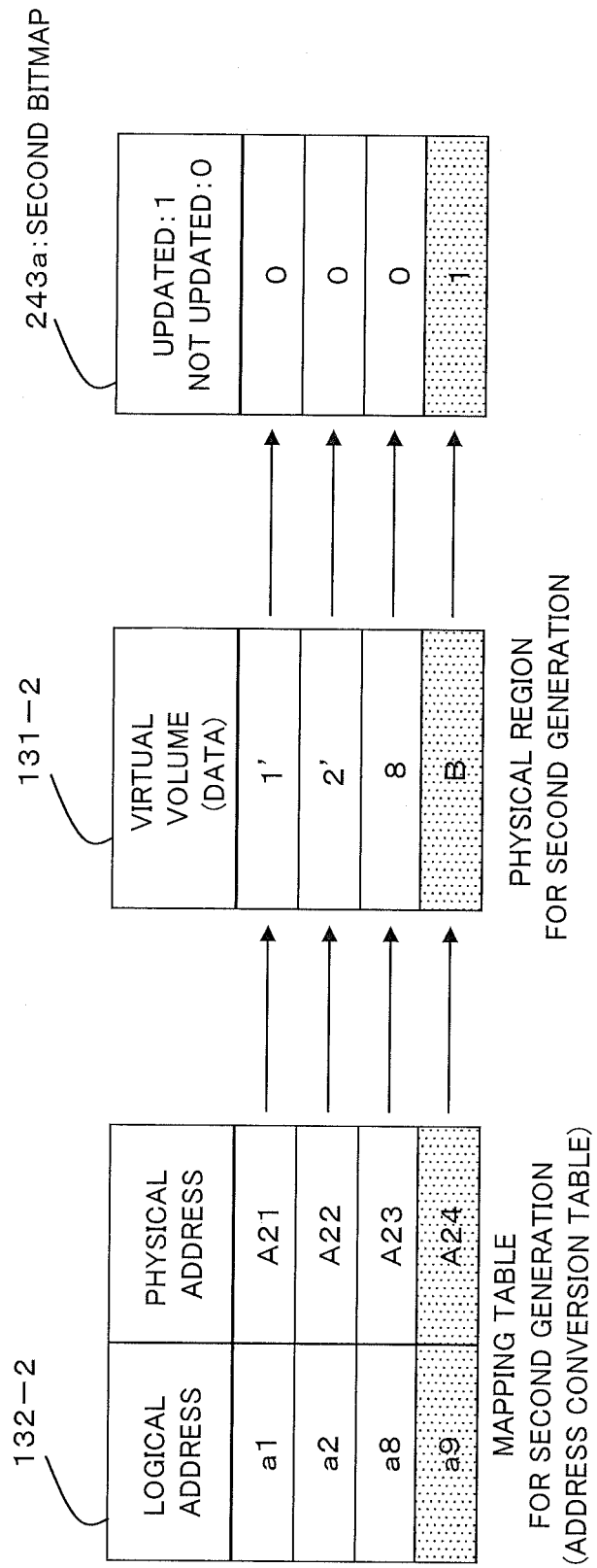
FIG. 26 is a view illustrating contents of a mapping table for the second generation, a virtual volume of the second generation and a second bitmap table corresponding to the backup volume in the second generation illustrated in FIG. 25C.

Therefore, a physical region of a capacity corresponding to the capacity of the data B (data 9) is additionally secured newly and continuously in the virtual volume 131-2, and the updated data B is copied into the physical region (refer to shaded portions in FIGS. 25C and 26). Here, it is assumed that the physical address of the physical region added to the virtual volume 131-2 is A24.

Figure 6:
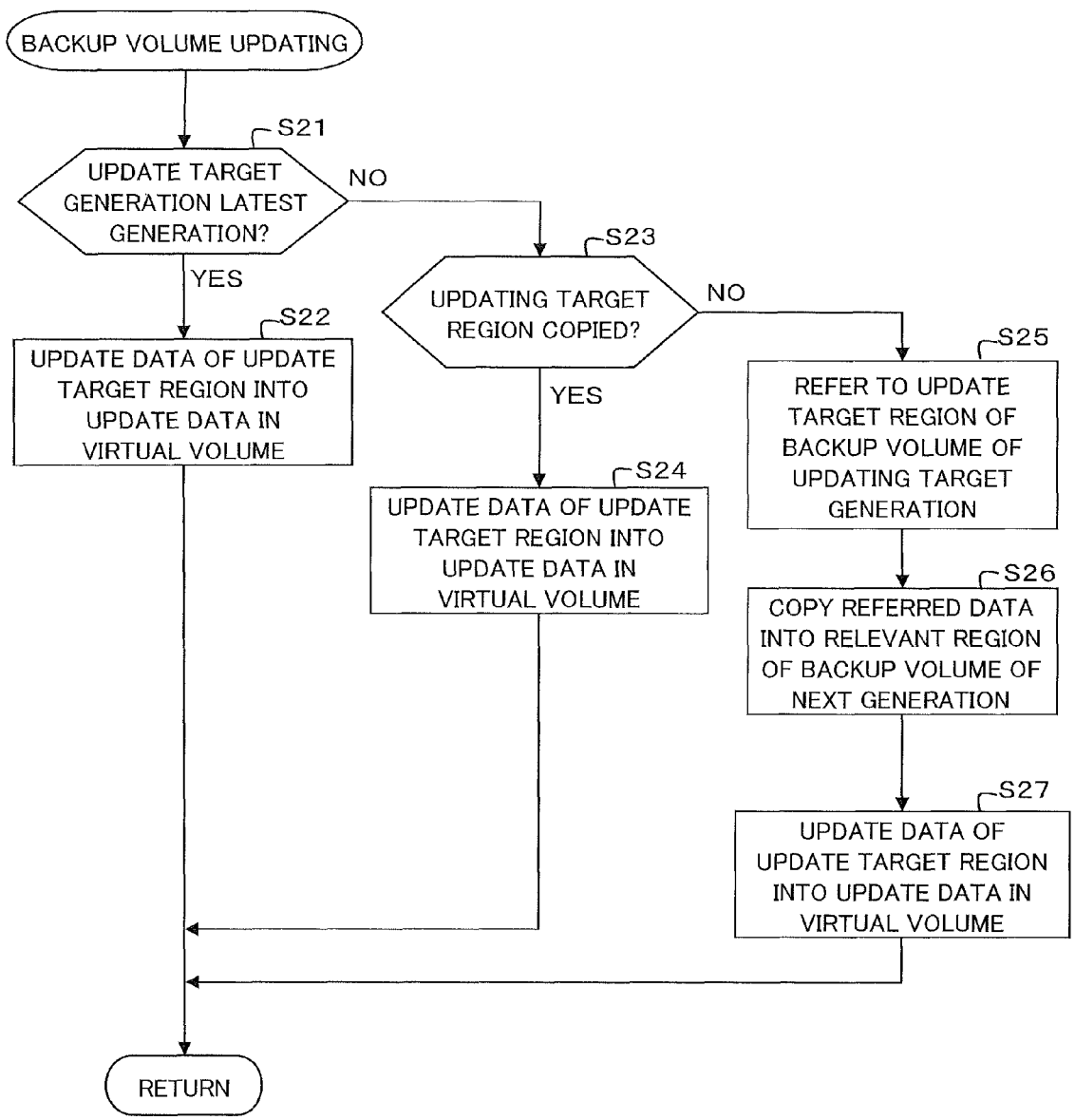
FIG. 6 is a flow chart illustrating a backup volume updating process of the present embodiment.

Such an updating process as described above is executed by the updating processing section 246 described hereinabove (refer to step S22 from the YES route of step S21 of FIG. 6).

At this time, together with the addition of the new physical region, a new region corresponding to the additional physical region is additionally secured in the mapping table 132-2 and the second bitmap table 243a as seen in FIG. 26. In particular, in the mapping table 132-2, a storage region for information for associating the physical address A24 of the region in which the data B is copied and the logical address a9 with each other is additionally secured (refer to a shaded portion). Meanwhile, in the second bitmap table 243a, one bit for monitoring the update situation in the added region of the physical address A24 is additionally secured (refer to a shaded portion).

In the case where updating of the backup 13b-2 of the latest generation is carried out in this manner, the update situation is monitored by the second monitoring section 243, and the second bitmap table 243a is updated by the second monitoring section 243. In particular, since, in FIG. 25C, the data in the region at the physical address A24 of the backup 13b-2 is updated to the data B, a bit in the second bitmap table 243a corresponding to the physical address A24 is rewritten from "0" to "1" as seen in FIG. 26 (refer to a shaded portion).

At this time, since the updating process has been carried out into the backup 13b-2 of the latest generation at this point of time, a copying process and so forth are not carried out. Further, as seen in FIGS. 25A and 25B, no change occurs with the operation volume 13a and the backup volume 13b-1.

(25) At time 01:40, an updating request for updating the data 4 at the logical address a4 of the backup 13b-1 of the generation 1 to the data C is received from the operation server 2, and an updating process is executed. Here, since the backup 13b-1 of the update target is not of the latest generation, it is confirmed whether or not the region corresponding to the logical address a4 in the backup 13b-2 of the generation 2 which is a next generation is copied already. In particular, the backup 13b-2 is referred to, and the mapping table 132-2 (refer to FIG. 26) of the backup 13b-2 is searched based on the logical address a4. However, since the logical address a4 is not registered in the mapping table 132-2 illustrated in FIG. 26, it is decided that the region of the backup 13b-2 corresponding to the logical address is in a non-copied state.

In this instance, the data at the logical address a4 of the backup 13b-1 is referred to. In other words, the logical address a4 is converted into the physical address A14 using the mapping table 132-1 (refer to FIG. 23). Then, the data 4 at the physical address A14 of the backup 13b-1 is read out, and this data 4 is copied into the backup 13b-2 of the generation 2. At this time, a physical region of a capacity corresponding to the capacity of the data 4 is additionally secured newly and continuously in the virtual volume 131-2, and the original data 4 at the logical address a4 is copied into the physical region secured in this manner (refer to a shaded portion of FIG. 27C or 29). Here, it is assumed that the physical address of the physical region added to the virtual volume 131-2 is A25.

Figure 29:
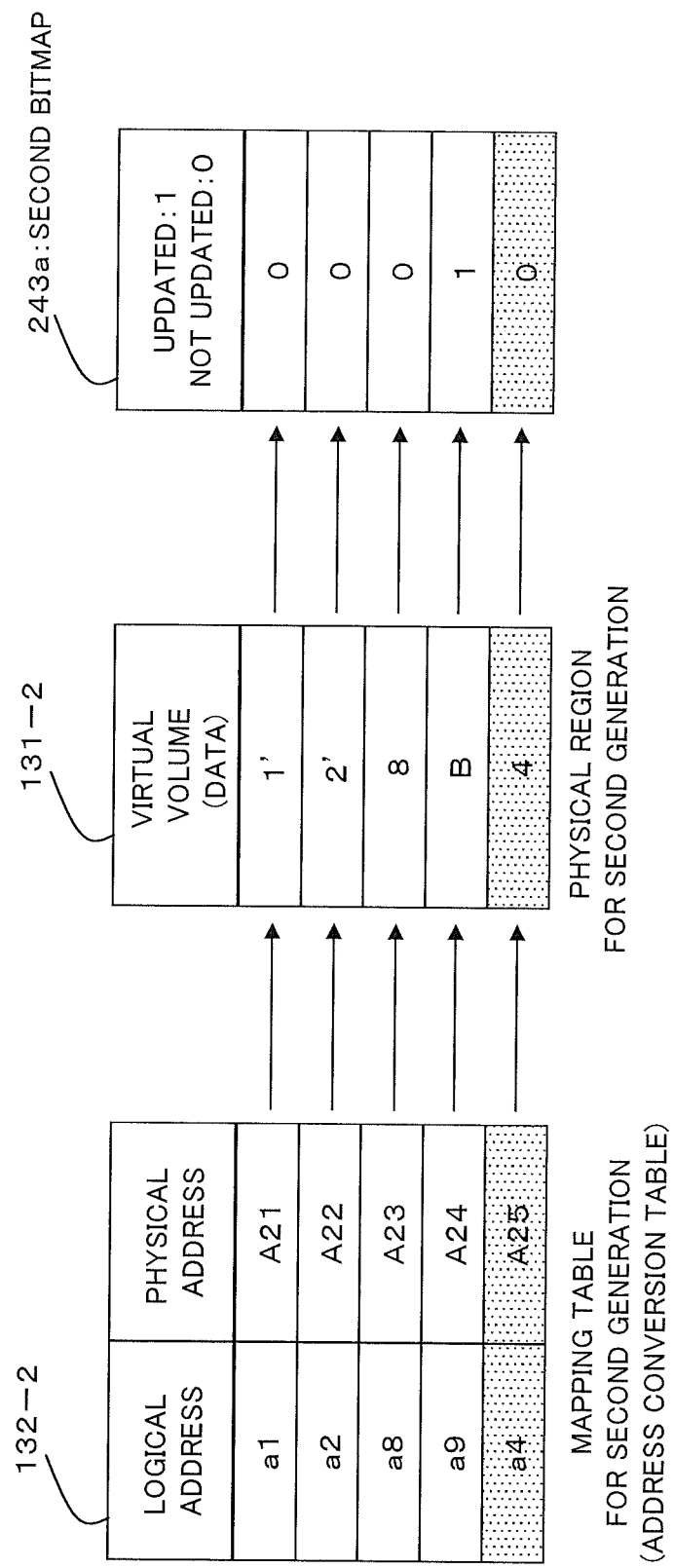
FIG. 29 is a view illustrating contents of a mapping table for the second generation, a virtual volume of the second generation and a second bitmap table corresponding to the backup volume of the second generation illustrated in FIG. 27C.

At this time, together with the addition of the new physical region, a new region corresponding to the added physical region is additionally secured in the mapping table 132-2 and the second bitmap table 243a as seen in FIG. 29, and corresponding information is registered into the additionally secured regions. In particular, in the mapping table 132-2, a storage region for information which associates the physical address A25 and the logical address a4 of the region whose data 4 is copied with each other is additionally secured (refer to a shaded portion). Meanwhile, in the second bitmap table 243*a*, one bit for monitoring the update situation in, the added region of the physical address A25 is additionally secured (refer to a shaded portion).

It is to be noted that the updating process in the present cycle is carried out for the backup 13*b*-1, and together with the updating process, a copying process of the original data 4 into the backup 13*b*-2 of the latest generation is carried out. Therefore, the current copying process into the physical address A25 of the backup 13*b*-2 of the latest generation is not regarded as an updating process, and the bit in the second bitmap table 243*a* corresponding to the physical address A25 is maintained to be "0" as seen in FIG. 29 (refer to a shaded portion).

Figure 27A:
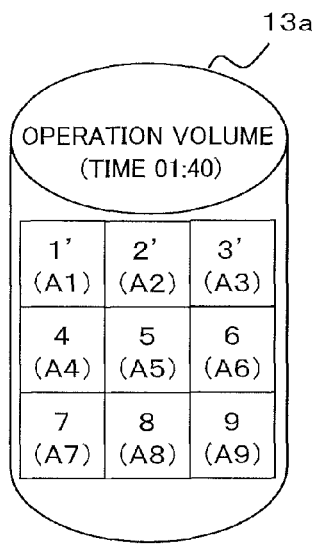
Figure 27B:
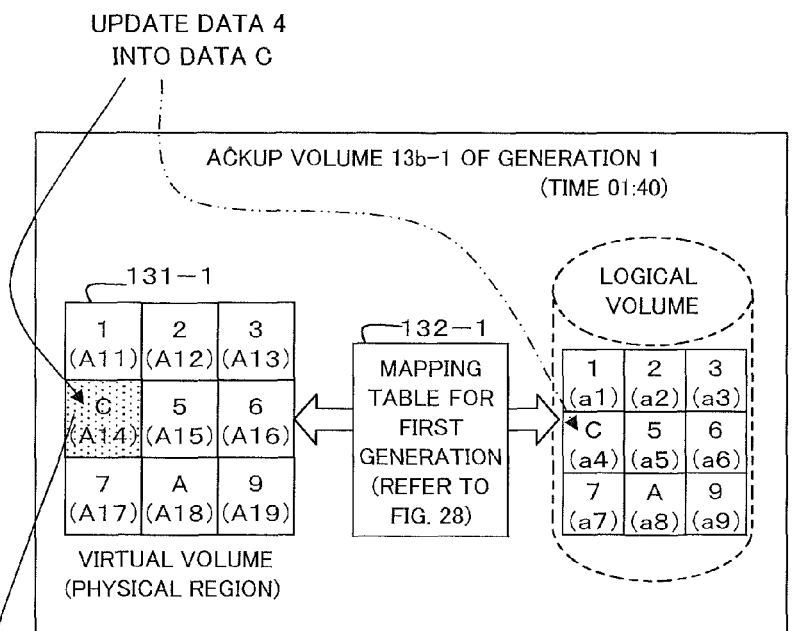
Figure 27C:
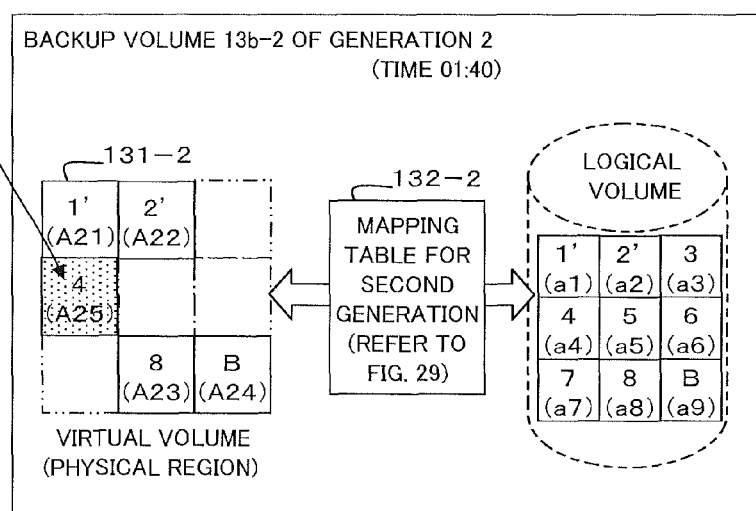
Figure 28:
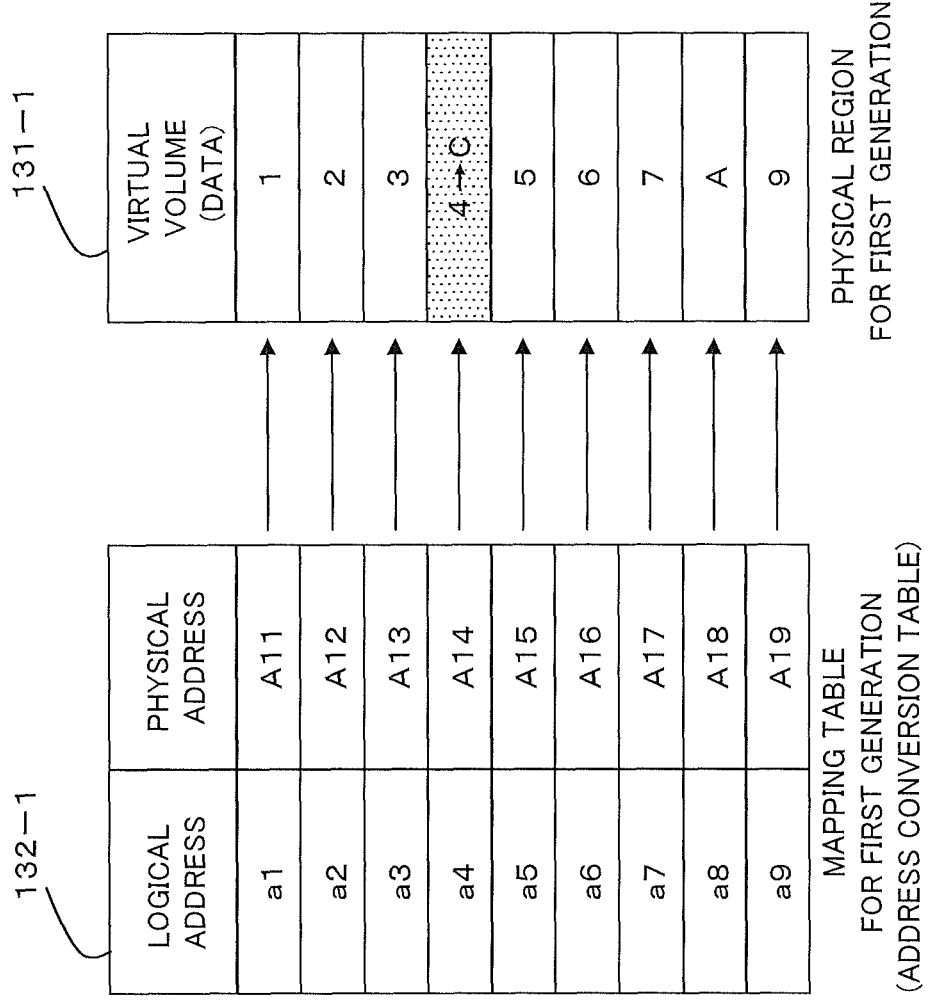
FIG. 28 is a view illustrating contents of a mapping table for the first generation and a virtual volume of the first generation corresponding to the backup volume of the first generation illustrated in FIG. 27B.

Thereafter, the data 4 at the physical address A14 of the backup 13*b*-1 of the generation 1 is updated to the data C as seen in FIGS. 27B and 28 (refer to shaded portions).

By such an updating process as described above, it becomes possible to refer to the updated data C only with the logical address a4 of the backup volume 13*b*-1 of the generation 1 of the updating target while it becomes possible to refer to the data 4 before the updating at the logical address a4 of the backup of a generation later than the generation 1.

Further, such an updating process as described above is executed by the updating processing section 246 described hereinabove (refer to steps S25 to S27 from the NO route of step S21 and the NO route of step S23 of FIG. 6).

It is to be noted here that, as seen in FIG. 27A, no change occurs with the operation volume 13*a*.

[2-4] Operation after backup production for the generation 3 till a point of time immediately before backup deletion of the generation 1 (operation within a period from time 02:00 to time 03:00)

Figure 30A:
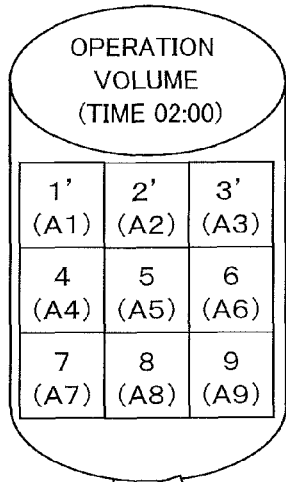
Figure 30B:
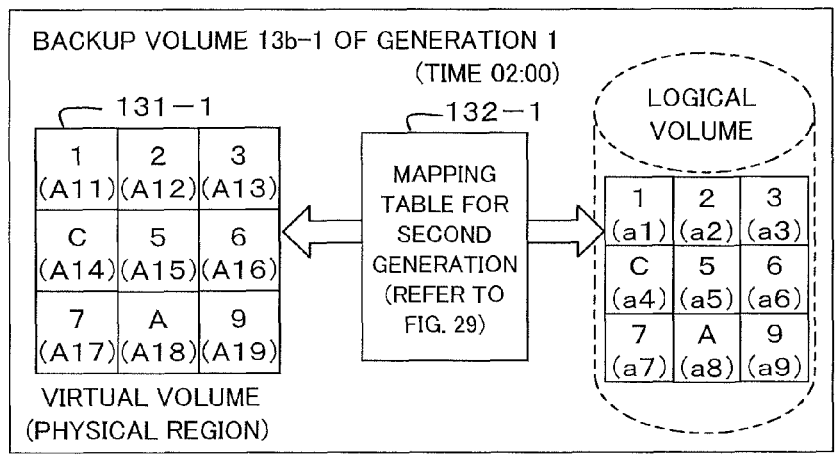
Figure 30C:
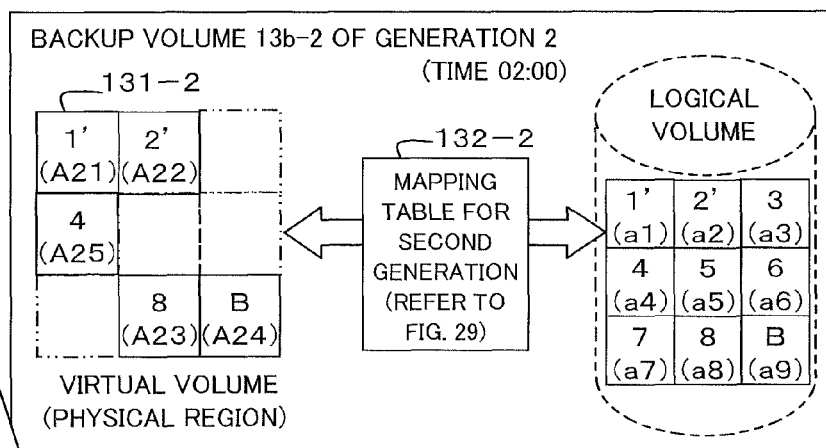
Figure 30D:
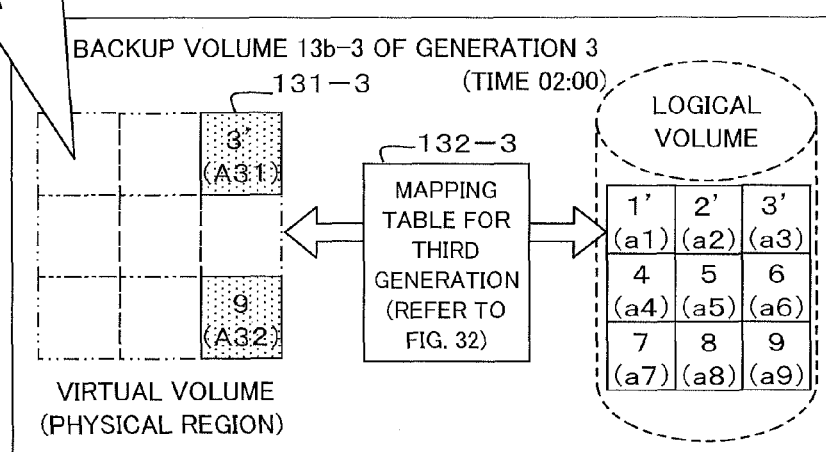

(31) At time 02:00, a backup 13*b*-3 of the generation 3 regarding the operation volume 13*a* illustrated in FIG. 30A is acquired and produced as seen in FIG. 30D by the second production section 244 in accordance with a production instruction of a backup volume of the generation 3 from the operation server 2 (refer to steps S3 to S6 from the NO route of step S1 of FIG. 4).

In particular, the first bitmap table 242*a* illustrated in FIG. 23 and the second bitmap table 243*a* illustrated in FIG. 29 are referred to by the second production section 244, and the first update region A3 of the operation volume 13*a* and the second update region A24 of the backup 13*b*-2 are recognized. Then, a physical region (virtual volume) 131-3 of a capacity corresponding to the capacity of the update regions (here, a capacity corresponding to two regions) is secured. The physical region 131-3 is formed from two continuous regions, for example, designated by physical addresses A31 and A32 (refer to FIG. 32).

Into the regions of the physical region 131-3 secured in this manner, the data 3' at the physical address A3 of the operation volume 13*a* and the data 9 in the region A9 of the operation volume 13*a* corresponding to the second update region A24 are copied in the downward direction in the order of the physical address as seen in FIG. 30D or 32. At this time, the region A9 of the operation volume 13*a* corresponding to the second update region A24 of the backup 13*b*-2 is specified based on the second bitmap table 243*a* and the mapping table 132-2 illustrated in FIG. 29 and the address conversion table of the operation volume 13*a* (refer to [2-1] described hereinabove).

Further, a mapping table 132-3 which associates the logical addresses a3 and a9 corresponding to the update regions A3 and A24 and the physical addresses A31 and A32 of the data 3' and 9 in the physical region 131-2 with each other, respectively, is produced as seen in FIG. 32. At this time, a region of a size corresponding to the capacity of the physical region 131-3 (here the capacity corresponding to two regions) is secured in the backup volume region 13*b*, and the mapping table 132-3 is produced in the secured region.

The mapping table 132-3 produced in this manner, the mapping table 132-2 illustrated in FIG. 29 or 30C and the mapping table 132-1 illustrated in FIG. 28 or 30B are used to link the virtual volumes 131-1 to 131-3 to each other. Consequently, when the operation server 2 refers to the backup 13*b*-3 using the logical addresses a1 to a9, it can refer to the backup 13*b*-3 as such a logical volume as illustrated in FIG. 30D.

Then, in order to monitor the update situation of the operation volume 13*a* illustrated in FIG. 30A after the backup production instruction of the generation 3 by means of the first monitoring section 242, all of the bits of the first bitmap table 242*a* are cleared to "0" as seen in FIG. 31.

Further, in order to monitor the update situation of the physical region 131-3 illustrated in FIG. 30D by means of the second monitoring section 243, such a second bitmap table 243*a* as illustrated in FIG. 32 is newly produced in place of the second bitmap table 243*a* illustrated in FIG. 29. This second bitmap table 243*a* is configured from 2 bits individually corresponding to the two regions of the virtual volume 131-3, and "0" is set to all bits of the second bitmap table 243*a* in its initial state. It is to be noted that, in FIG. 32, the second bitmap 243 is illustrated in association with the mapping table 132-3 (logical addresses a3 and a9/physical addresses A31 and A32) and the data 3' and 9 of the virtual volume 131-2.

It is to be noted here that, as seen in FIGS. 30A to 30C, no change occurs with the operation volume 13*a* and the backups 13*b*-1 and 13*b*-2.

(32) At time 02:10, a reference request to data at the logical address a7 of the backup 13*b*-3 of the generation 3 is received from the operation server 2, and a reference process is executed. In this instance, the backup 13*b*-3 is referred to in accordance with the reference request, and the mapping table 132-3 (refer to FIG. 32) of the backup 13*b*-3 is searched with the logical address a7. However, the logical address a7 is not registered in the mapping table 132-3 illustrated in FIG. 32. In other words, in the backup 13*b*-3, the region corresponding to the logical address a7 remains in a non-copied state.

Therefore, the backup 13*b*-2 is referred to tracing back from the generation 3 to the generation 2, and the mapping table 132-2 (refer to FIG. 28) of the backup 13*b*-2 is searched with the logical address a7. However, the logical address a7 is not registered in the mapping table 132-2 illustrated in FIG. 28. In other words, in the backup 13*b*-2, the region corresponding to the logical address a7 is in a non-copied state.

Figure 33A:
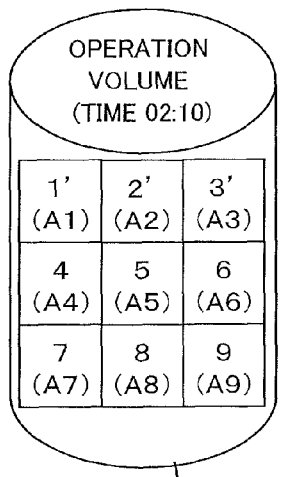
Figure 33B:
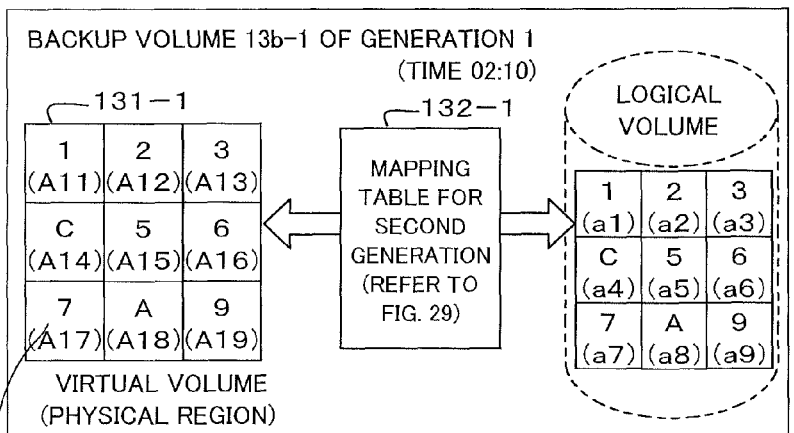
Figure 33C:
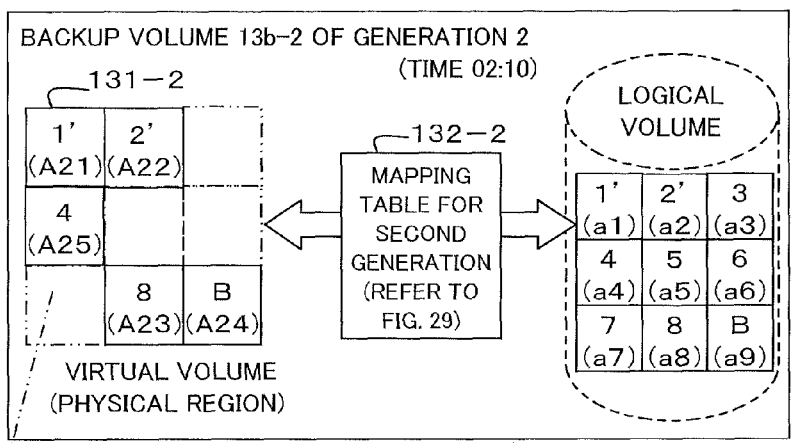
Figure 33D:
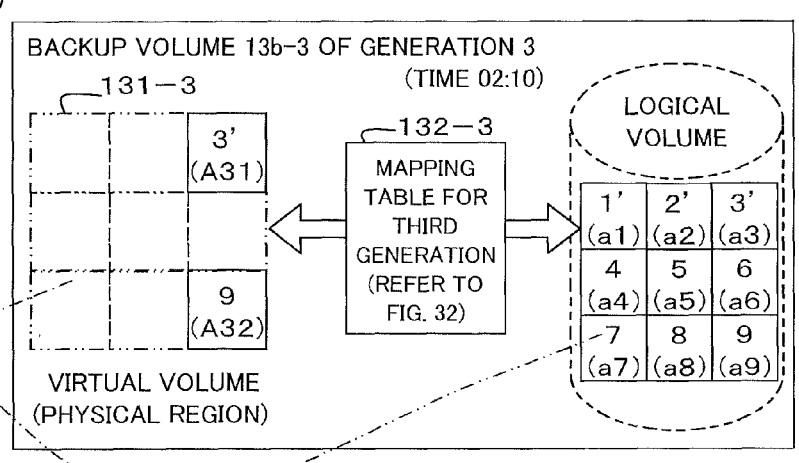

Therefore, the backup 13*b*-1 is referred to tracing back from the generation 2 to the generation 1, and the logical address a7 is converted into the physical address A17 using the first generation table 132-1 (refer to FIG. 28). Then, the data 7 at the physical address A17 of the backup 13*b*-1 is read out and referred to by the operation server 2 as seen in FIGS. 33B to 33D. Such a reference process as just described is executed by the reference processing section 245 described hereinabove (refer to steps S13 to S15 from the NO route of step S11 of FIG. 5).

At this time, a copying process and so forth are not carried out. Further, as seen in FIGS. 33A to 33D, no change occurs with the operation volume 13*a* and the backups 13*b*-1 to 13*b*-3.

(33) At time 02:30, an updating request for updating the data 5 at the physical address a5 of the backup 13*b*-2 of the generation 2 to the data D is received from the operation server 2 and an updating process is executed. Here, since the backup 13*b*-2 of the updating target is not of the latest generation, it is decided whether or not the region corresponding to the logical address in the backup 13*b*-3 of the generation 3 which is a next generation is copied already. In particular, the backup 13*b*-3 is referred to, and the mapping table 132-3 (refer to FIG. 32) of the backup 13*b*-3 is searched with the logical address a5. However, since the logical address a4 is not registered in the mapping table 132-3 illustrated in FIG. 32, it is decides that the region of the backup 13*b*-3 corresponding to the logical address a5 is in a non-copied state.

In this instance, the data at the logical address a5 of the backup 13*b*-2 is referred to. In particular, the backup 13*b*-2 is referred to, and the mapping table 132-2 (refer to FIG. 29) of the backup 13*b*-2 is searched with the logical address a5. However, the logical address a5 is not registered in the mapping table 132-2 illustrated in FIG. 29. In other words, the region of the backup 13*b*-2 corresponding to the logical region a5 is in a non-copied state. Therefore, the backup 13*b*-1 is referred to tracing back from the generation 2 to the generation 1, and the logical address a5 is converted into the physical address A15 using the mapping table 132-1 (refer to FIG. 28). Then, the data 5 at the physical address A15 of the backup 13*b*-1 is read out and referred to. It is to be noted that the reference process executed here is executed by the reference processing section 245 described hereinabove (refer to steps S13 to S15 from the NO route of step S11 of FIG. 5).

The data 5 readout in such a manner as described above is copied into the backup 13*b*-3 of the generation 3. At this time, a physical region of a capacity corresponding to the capacity of the data 5 is additionally secured newly and continuously, and the original data 5 at the logical address a5 is copied into the secured physical region (refer to a shaded portion in FIG. 34D or 36). Here, it is assumed that the physical address of the physical region added to the virtual volume 131-3 is A33.

Figure 36:
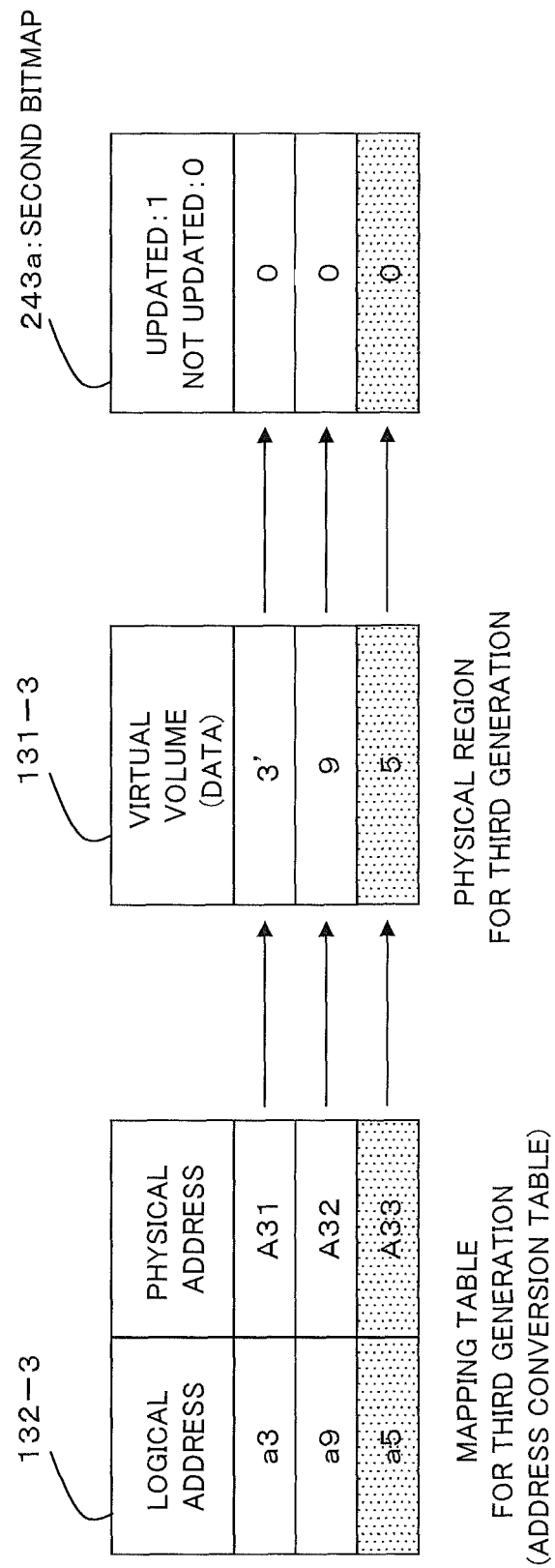
FIG. 36 is a view illustrating contents of a mapping table for the third generation, a virtual volume of the third generation and a second bitmap table corresponding to the backup volume of the third generation illustrated in FIG. 34D.

At this time, together with the addition of the new physical region, a new region corresponding to the added physical region is additionally secured in the mapping table 132-3 and the second bitmap 243*a* as seen in FIG. 36, and corresponding information is registered into the additionally secured regions. In particular, in the mapping table 132-3, a storage region for information for associating the physical address A33 of the region into which the data 5 is copied and the logical address a5 is additionally secured (refer to a shaded portion). Meanwhile, in the second bitmap table 243*a*, one bit for monitoring the update situation in the added region of the physical address A33 is additionally secured (refer to a shaded portion).

It is to be noted that the current updating process is carried out for the backup 13*b*-2, and together with this updating process, a copying process of the original data 5 into the backup 13*b*-3 of the latest generation is carried out. Therefore, the current copying process into the physical address A33 of the backup 13*b*-3 of the latest generation is not regarded as an updating process, and the bit of the second bitmap 243*a* corresponding to the physical address A33 maintains "0" as seen in FIG. 36.

Thereafter, the data 5 at the logical address a5 of the backup 13*b*-2 of the generation 2 is updated to the data D. However, at the point of time at which the updating request is received, the logical address a5 and a physical address corresponding to the logical address a5 are not registered in the mapping table 132-2 of the backup 13*b*-2 illustrated in FIG. 29. In other words, the region of the backup 13*b*-2 corresponding to the logical address a5 is in a non-copied state.

Figure 34A:
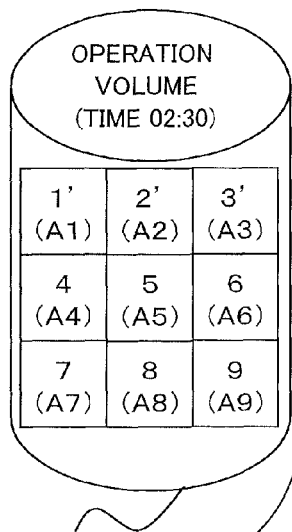
Figure 34B:
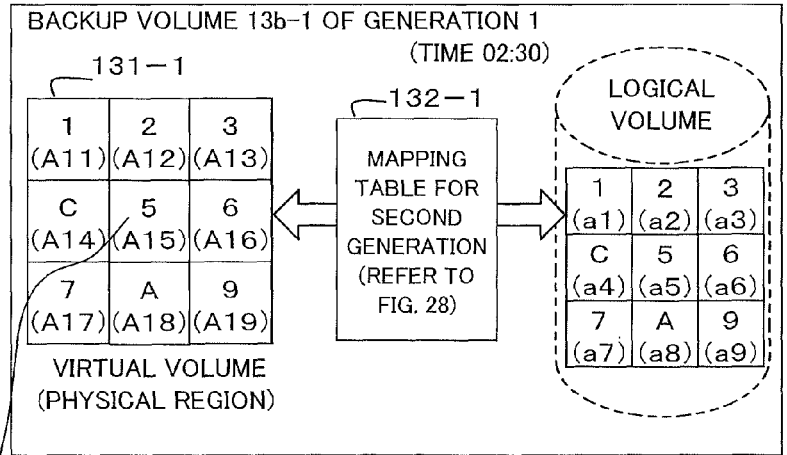
Figure 34C:
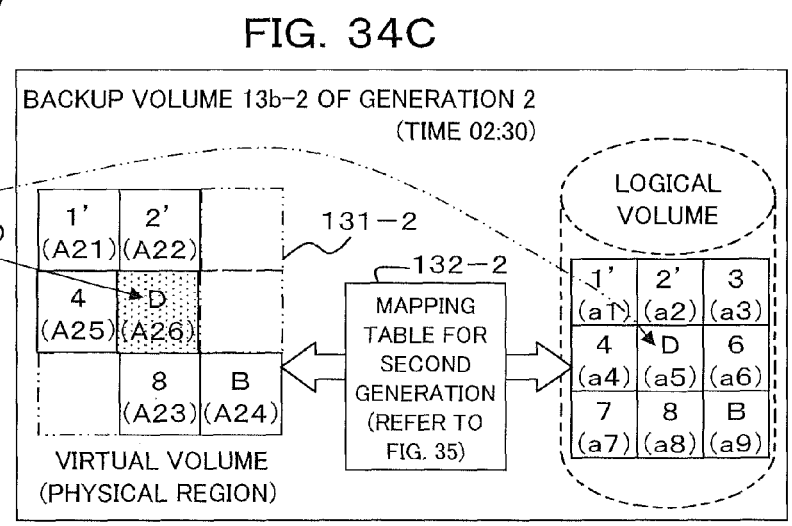
Figure 34D:
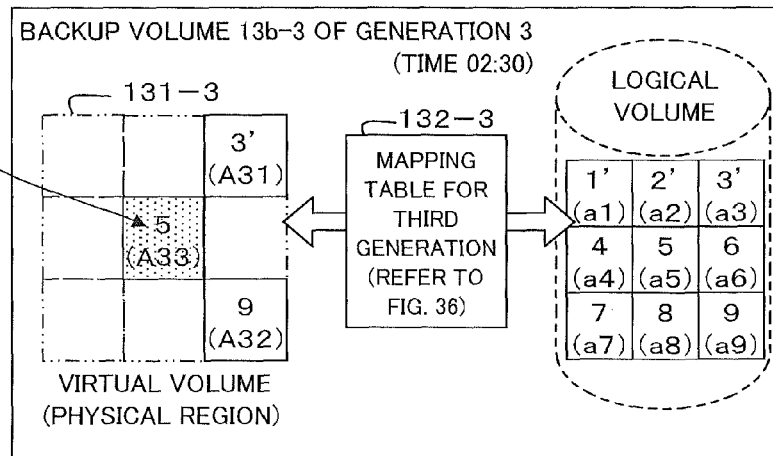
Figure 35:
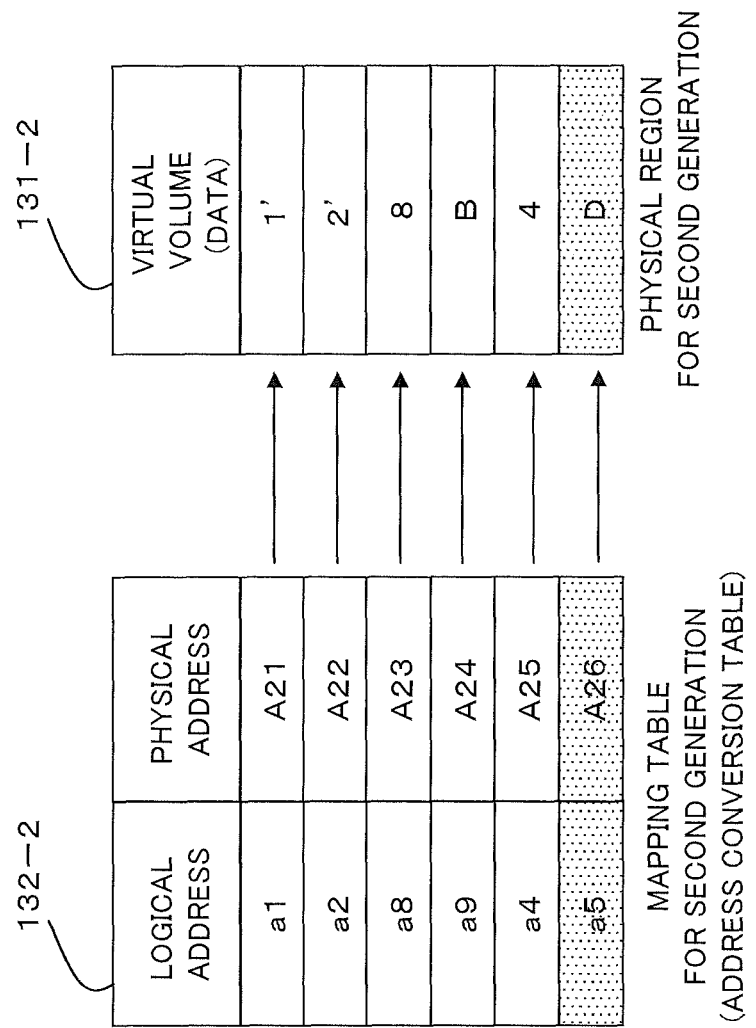
FIG. 35 is a view illustrating contents of a mapping table for the second generation and a virtual volume of the second generation corresponding to the backup volume of the second generation illustrated in FIG. 34C.

Therefore, a physical region of a capacity corresponding to the capacity of the data D (data 5) is additionally secured newly and continuously in the virtual volume 131-2, and the updated data D is copied into the additionally secured physical region (refer to a shaded portion in FIG. 34C or 35). Then, the updating process of the present cycle is completed.

It is to be noted that the physical address of the physical region added to the virtual volume 131-2 is assumed to be A26. Further, together with the addition of the new physical region, a new region corresponding to the added physical region is additionally secured in the mapping table 132-2 as seen in FIG. 35, and corresponding information is registered into the newly added region. In other words, a storage region for information for associating the physical address A26 and the logical address a5 of the region whose data D is copied with each other is additionally secured in the mapping table 132-2 (refer to a shaded portion).

By such an updating process as described above, it becomes possible to refer to the update data D only at the logical address a5 of the backup 13*b*-2 of the generation 2 of the updating target while it becomes possible to refer to the data 5 before the updating at the physical address of a backup of a generation later than the generation 2.

Further, such an updating process as described above is executed by the updating processing section 246 described hereinabove (refer to steps S25 to S27 from the NO route of step S21 and the NO route of step S23 of FIG. 6).

At this time, as seen in FIGS. 34A and 34B, no change occurs with the operation volume 13*a* and the backup 13*b*-1.

[2-5] Backup Deletion Operation of the Generation (Operation at Time 03:00)

(41) At time 03:00, a deletion request of the backup 13*b*-1 of the generation 1 is received from the operation server 2, and a deletion process is executed. At this time, since the backup 13*b*-1 of the deletion target is of the generation 1, there exist backups 13*b*-2 and 13*b*-3 of the generations 2 and 3 later than the generation 1. Therefore, a copied region of the backup 13*b*-1 of the generation 1 and a non-copied region of the backup 13*b*-2 of the generation 2 are searched out first.

Here, by referring to the mapping table 132-1 of the generation 1 illustrated in FIG. 28, all regions of the backup 13*b*-1 of the generation 1 (logical addresses a1 to a9/physical addresses A11 to A19) are searched out as copied regions. Further, by referring to the mapping table 132-2 of the generation 2 illustrated in FIG. 35, the three regions (logical addresses a3, a6 and a7) of the backup 13*b*-2 of the generation 2 are searched out as non-copied regions.

Then, by comparing the copied regions and the non-copied regions searched out in this manner with each other, non-copied regions (logical addresses a3, a6 and a7) which are copied in the backup 13*b*-1 of the generation 1 but are not copied in the backup 13*b*-2 of the generation 2 are found out.

Thereafter, the logical addresses a3, a6 and a7 are converted into the physical addresses A13, A16 and A17 using the first generation table 132-1 of the generation 1 illustrated in FIG. 28, respectively. Then, the data 3, 6 and 7 at the physical addresses A13, A16 and A17 of the backup 13*b*-1 are read out.

The data 3, 6 and 7 are copied into the backup 13*b*-2 of the generation 2. At this time, physical regions of a capacity corresponding to the capacity of the data 3, 6 and 7 are additionally secured newly and continuously in the physical region 131-2, and the original data 3, 6 and 7 at the logical addresses a3, a6 and a7 are copied into the secured physical regions (refer to a shaded portion of FIG. 37C or 38). Here, it is assumed that the physical addresses of the physical regions added to the physical region 131-2 are A27 to A29.

Figure 38:
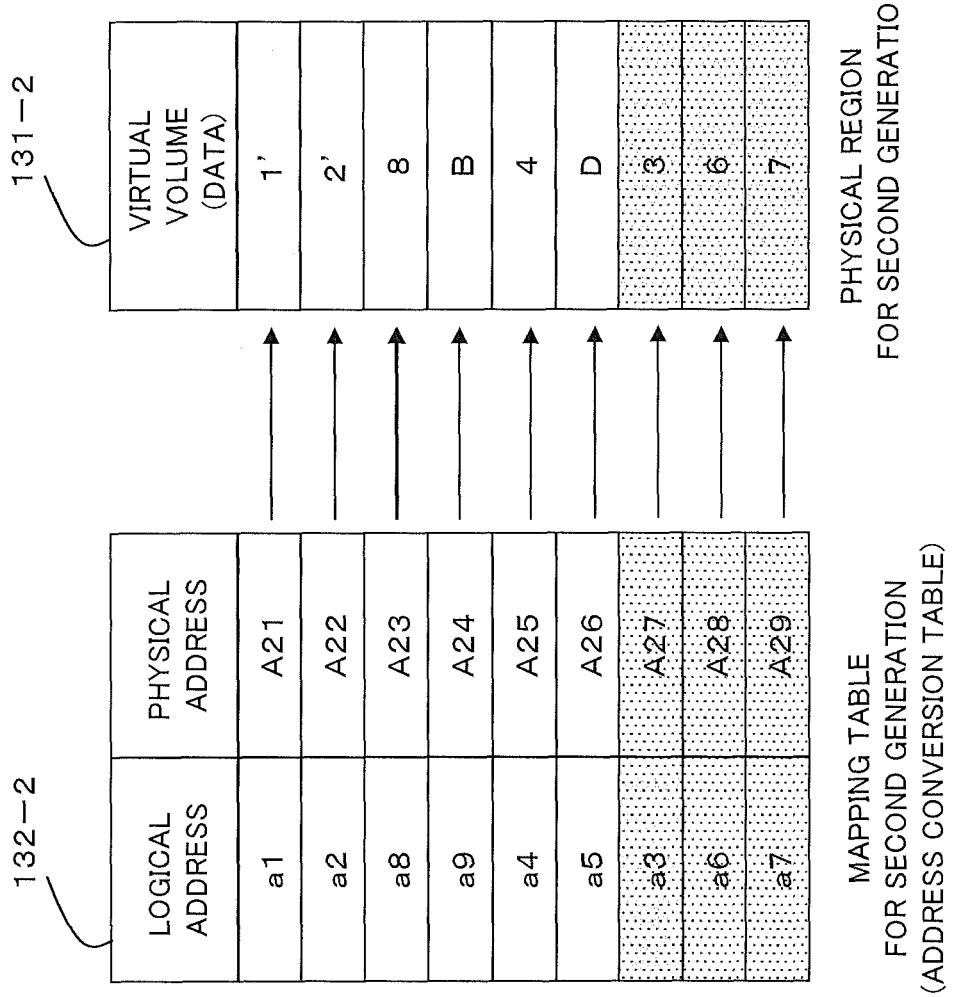
FIG. 38 is a view illustrating contents of a mapping table for the second generation and a virtual volume of the second generation corresponding to the backup volume of the second generation illustrated in FIG. 37C.

At this time, together with the addition of the new physical regions, new regions corresponding to the added physical regions are additionally secured in the mapping table 132-2 as seen in FIG. 38, and corresponding information is registered into the additionally secured regions. In other words, storage regions for information for associating the physical addresses A27 to A29 and the physical addresses a3, a6 and a7 of the regions whose data 3, 6 and 7 are copied with each other are additionally secured (refer to a shaded portion).

After the copying process into a non-copied region of the backup 13b-2 of the generation 2 is completed in such a manner as described above, the relationship between the operation volume 13a and the virtual volume 131-1 in the backup 13b-1 of the generation 1 of the deletion target is deleted. Consequently, the backup 13b-1 of the generation 1 is deleted from the backup 13b as seen in FIG. 38B. The relationship deleted here includes, for example, the mapping table 132-1 (refer to FIG. 28) of the generation 1 and so forth. By carrying out such deletion of the relationship as described above, the operation server 2 is disabled from accessing to the backup 13b-1 of the generation 1, and a state in which the backup 13b-1 of the generation 1 is substantially deleted is established.

In such a deletion process as described above, data which has been stored in the backup 13b-1 of the generation 1 of the deletion target but has not been stored in the backup 13b-2 of the next generation is stored into the backup 13b-2 before it is deleted. Consequently, even if the backup 13b-1 of the generation 1 is deleted, disappearance of the data from the backup volume region 13b by deletion can be prevented, and all data are maintained in the backup volume region 13b in such a state that they can be referred to and restored.

Figure 7:
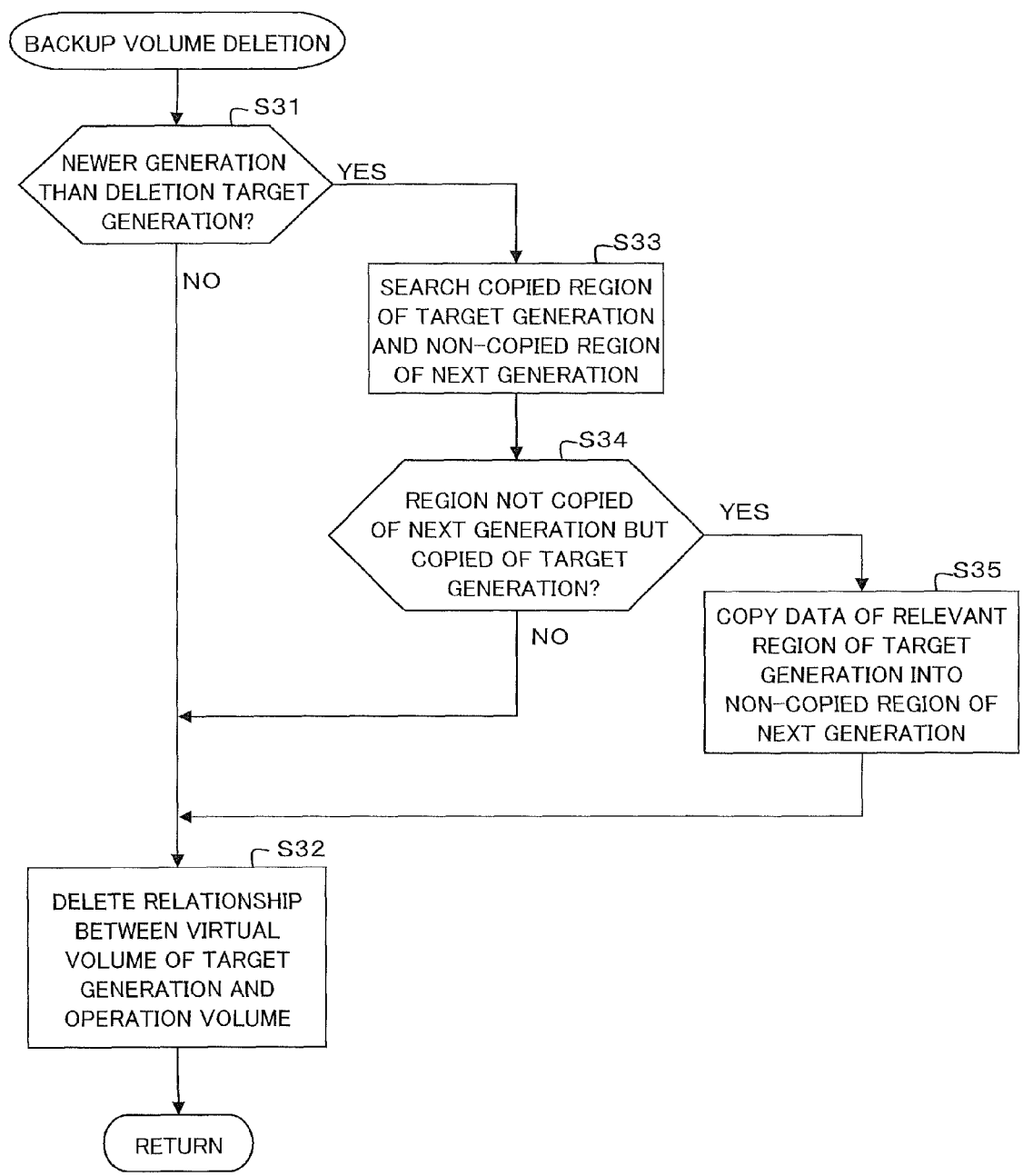
FIG. 7 is a flow chart illustrating a backup volume deletion process of the present embodiment.

It is to be noted that such a deletion process as described above is executed by the deletion processing section 247 described hereinabove (refer to steps S33 to S35 and S32 from the YES route of step S31 of FIG. 7).

Figure 37A:
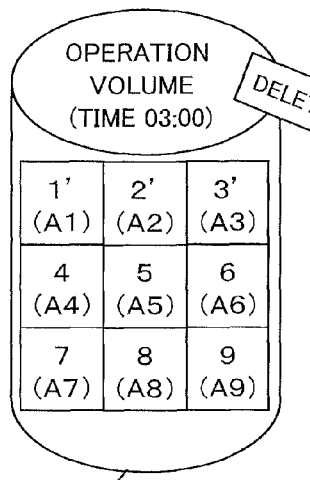
Figure 37B:
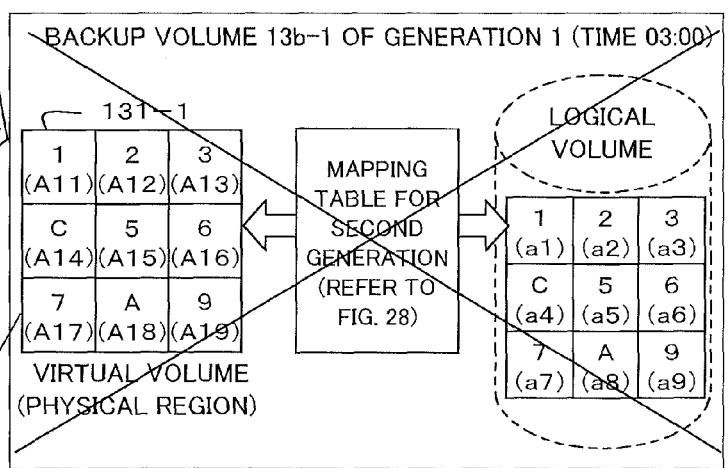
Figure 37C:
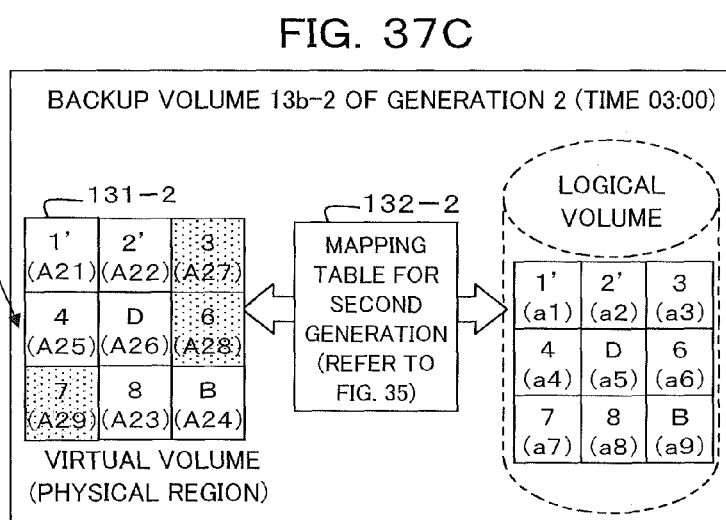
Figure 37D:
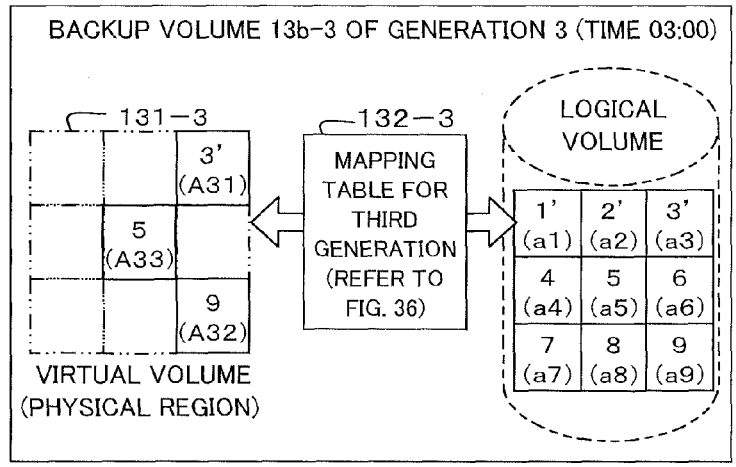

Further, at this time, as seen in FIGS. 37A and 37D, no change occurs with the operation volume 13a and the backup 13b-3.

[3] Effect of the Embodiment

According to the present embodiment, upon production of a backup 13b-1 of the generation 1, all data of the operation volume 13a are stored. On the other hand, upon production of a backup 13b-k of the generation 2 or a succeeding generation, an update situation of the operation volume 13a and the backup volume 13b-(k−1) of the immediately preceding generation is confirmed and copy of difference data between them is carried out. In other words, into the backup volume 13b-k of the generation 2 or a later generation, the data of an update region of the operation volume 13a and original data of the operation volume 13a corresponding to an update region of the backup volume 13b-(k−1) of a generation immediately preceding to the production target generation are copied.

At this time, in the backups 13b-2 to 13b-i of the second-and-later generations, a capacity equal to that of an update region of each generation is secured and only data of the update region is stored. Also for the mapping tables 132-2 to 132-i, a region of a size corresponding to the capacity of the update region of each generation is secured, and only address conversion information (logical address/physical address) of a portion corresponding to the update region is stored into the secured regions.

Consequently, the capacity of the physical regions used in the backups 13b-2 to 13b-i of the second-and-later generations becomes a minimum necessary capacity, and also it is possible to suppress the size of the mapping tables 132-2 to 132-i for the generations and the second bitmap table 243a to a minimum necessary size.

Further, as described above, in the backup 13b-1 of the generation 1, not only all data of the operation volume 13a are stored but also non-updated original data when the backup volume is updated are stored. Therefore, even if the operation volume 13a is damaged and disabled from reference thereto, the data of the operation volume 13a of the generations 1 to i are restored as far as possible based on the backups 13b-1 to 13b-i and the backup data acquired for a plurality of generations are not lost in the backups 13b-1 to 13b-i.

Accordingly, backups of the operation volume 13a for a plurality of generations are implemented with certainty.

Further, according to the updating processes for a backup volume 13b-k of a particular generation described hereinabove, for example, with reference to FIGS. 6, 17A, 17B, 18, 25A to 29 and 34A to 36, it is permitted to refer to update data only in a relevant region of the backup volume 13b-k of the particular generation. On the other hand, in a relevant region of a backup volume 13b-m (m is a natural number which satisfies k<m≤i) of a generation later than the particular generation, it is possible to refer to original data before updating.

Further, according to the deletion process of a backup volume of a particular generation described hereinabove, for example, with reference to FIGS. 7 and 37A to 38, data which has been stored in a backup volume 13b-k of the deletion target generation but not been stored in the next generation is stored into the backup volume 13b-(k+1) of the next generation. Consequently, even if the backup volume 13b-k is deleted, disappearance of the data from the backup volume region 13b by the deletion can be prevented, and all data are maintained in the backup volume region 13b in such a state that they can be referred to and restored.

[4] Others

While preferred embodiments of the present invention have been described above, the present invention is not limited to the embodiments specifically described above, and various variations and modifications can be made without departing from the scope of the present invention.

Further, the components 241 to 247 (all or some functions) of the backup controlling section 24 described hereinabove are implemented by a computer (including a CPU, an information processing apparatus and various terminals) executing a predetermined application program (backup program).

The program is provided in a form in which it is recorded on or in a computer-readable recording medium such as, for example, a flexible disk, a CD (such as a CD-ROM, a CD-R and a CD-RW), a DVD (such as a DVD-ROM, a DVD-RAM, a DVD-R, a DVD-RW, a DIV+R and a DVD+RW) and a blue ray disk. In this instance, a computer reads the program from the recording medium and transfers and stores the program to and into an internal storage device or an external storage device.

Here, the term computer is used to signify a concept including hardware and an OS (operating system) and signifies the hardware which operates under the control of the OS. On the other hand, in such a case that no OS is required and an application program by itself can operate hardware, the hardware itself corresponds to the computer. The hardware includes at least a microprocessor such as a CPU and means for reading a computer program recorded on a recording medium. The backup program described above includes program codes for causing such a computer as described above to implement the functions of the components 241 to 247 described hereinabove. Further, part of the functions may be implemented not by an application program but by an OS.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A backup apparatus for producing backup volumes of a plurality of generations regarding a backup target volume, comprising:
a storage section adapted to store the backup volumes of the plural generations;
a first production section adapted to copy data in the backup target volume at a point of time at which a production instruction of a backup volume of a first generation is received into a region for the first generation of said storage section to produce the backup volume of the first generation;
a first monitoring section adapted to monitor, as a first update region, a region to which the data updated in the backup target volume after a production instruction of a backup volume of an i–1th generation is issued belongs, i being a natural number equal to or greater than two;
a second monitoring section adapted to monitor, as a second update region, a region to which the data updated in the backup volume of the i–1th generation belongs after a production instruction of the backup volume of the i–1th generation is issued; and
a second production section adapted to refer, if a production instruction of a backup volume of an ith generation is received, to the first update region monitored by said first monitoring section and the second update region monitored by said second monitoring section to secure, in said storage section, a region for the ith generation having a capacity corresponding to capacities of the first update region and the second update region, and then copy the data in the first update region and the data in the region corresponding to the second update region in the backup target volume at a point of time at which the production instruction of the backup volume of the ith generation is received into the region for the ith generation to produce the backup volume of the ith generation.

2. The backup apparatus as claimed in claim 1, wherein said first monitoring section monitors the first update region using a first bitmap table having a size corresponding to a capacity of the backup target volume.

3. The backup apparatus as claimed in claim 1, wherein said second monitoring section monitors the second update region using a second bitmap table having a size corresponding to a capacity of the backup volume of the i–1th generation.

4. The backup apparatus as claimed in claim 1, wherein said first production section produces, upon production of the backup volume of the first generation, a table for the first generation for associating a logical address and a physical address of the data in the region for the first generation with each other.

5. The backup apparatus as claimed in claim 1, wherein said second production section produces, upon production of the backup volume of the ith generation, a table for the ith generation for associating a logical address and a physical address of the data in the region for the ith generation with each other.

6. The backup apparatus as claimed in claim 1, further comprising a reference processing section adapted to decide, if a reference request of data in a backup volume of a specific generation from among the plural generations is received, whether or not data copy by said first production section or said second production section has been carried out into a relevant region, which is designated as a reference target region by the reference request, in the backup volume of the specific generation and then read out, if it is decided that the data copy into the relevant region has been carried out, the data in the relevant region as reference data.

7. The backup apparatus as claimed in claim 6, wherein, if it is decided that the copy into the relevant region has not been carried out, then said reference processing section successively refers to the relevant region, which is designated as the reference target region by the reference request, in the backup volumes of older generations than the specific generation to decide whether or not the data copy by said first production section or said second production section has been carried out into the relevant region, and then reads out, as the reference data, the data in the relevant region at a point of time at which it is decided that the data copy into the relevant region has been carried out.

8. The backup apparatus as claimed in claim 1, further comprising an updating processing section adapted to decide, if an updating request of data in a backup volume of a specific generation from among the plural generations is received, whether or not the specific generation is the newest generation and then update, if it is decided that the specific generation is the newest generation, the data in a relevant region, which is designated as an updating target region by the updating request, in the backup volume of the specific generation to the data designated by the updating request.

9. The backup apparatus as claimed in claim 8, wherein, if it is decided that the specific generation is any other generation than the newest generation, then said updating processing section refers to the relevant region, which is designated as the updating target region by the updating request, in a backup volume of a next generation to the specific generation and decides whether or not the data copy by said first production section or said second production section has been carried out into the relevant region in the backup volume of the next generation, and then updates, if it is decided that the data copy into the relevant region in the backup volume of the next generation has been carried out, the data in the relevant region in the backup volume of the specific generation to the data designated by the updating request.

10. The backup apparatus as claimed in claim 9, wherein, if it is decided that the data copy into the relevant region in the backup volume of the next generation has not been carried out, then said updating processing section carries out a reference request for designating the relevant region of the backup volume of the specific generation as a reference target region and copies the data read out in accordance with the reference request into the relevant region in the backup volume of the next generation and then updates the data in the relevant region in the backup volume of the specific generation to the data designated by the updating request.

11. The backup apparatus as claimed in claim 1, further comprising a deletion processing section adapted to decide, if a deletion request of a backup volume of a specific generation from among the plural generations is received, whether or not there is a backup volume of a newer generation than the specific generation, and delete, if it is decided that there is no backup volume of a newer generation than the specific generation, the backup volume of the specific generation; and wherein, if it is decided that there is a backup volume in a newer generation than the specific generation, then said deletion processing section searches for a region into which the data copy by said first production section or said second production section has been carried out in the backup volume of the specific generation and a region into which the data copy by said first production section or said second production section has not been carried out in the backup volume of the next generation to the specific generation to decide whether or not there is a region into which the data copy has been carried out in the backup volume of the specific generation whereas the data copy has not been carried out in the backup volume of the next generation, and then deletes, if it is decided that there is no such region, the backup volume in the specific generation, but copies, if it is decided that there is such region, the data in the region, into which the data copy has been carried out in the backup volume of the specific generation, into the relevant region in the backup volume of the next generation and then deletes the backup volume of the specific generation.

12. A backup method for producing backup volumes of a plurality of generations regarding a backup target volume in a storage section, comprising:
   a first production step of copying data in the backup target volume at a point of time at which a production instruction of a backup volume of a first generation is received into a region for the first generation of the storage section to produce the backup volume of the first generation;
   a first monitoring step of monitoring, as a first update region, a region to which the data updated in the backup target volume after a production instruction of a backup volume in an i–1th generation is issued belongs, i being a natural number equal to or greater than two;
   a second monitoring step of monitoring, as a second update region, a region to which the data updated in the backup volume of the i–1th generation belongs after a production instruction of the backup volume of the i–1th generation is issued; and
   a second production step of referring, if a production instruction of a backup volume in an ith generation is received, to the first update region monitored at the first monitoring step and the second update region monitored by said second monitoring step to secure, in the storage section, a region for the ith generation having a capacity corresponding to capacities of the first update region and the second update region, and then copying the data in the first update region and the data in a region corresponding to the second update region in the backup target volume at a point of time at which the production instruction of the backup volume of the ith generation is received into the region for the ith generation to produce the backup volume of the ith generation.

13. The backup method as claimed in claim 12, wherein, at the first monitoring step, the first update region is monitored using a first bitmap table having a size corresponding to a capacity of the backup target volume.

14. The backup method as claimed in claim 12, wherein, at the second monitoring step, the second update region is monitored using a second bitmap table having a size corresponding to a capacity of the backup volume in the i–1th generation.

15. A non-transitory computer-readable recording medium in or on which a backup program for causing a computer to function as a backup apparatus for producing backup volumes of a plurality of generations regarding a backup target volume in a storage section is recorded, the backup program causing the computer to function as:
   a first production section adapted to copy data in the backup target volume at a point of time at which a production instruction of a backup volume of a first generation is received into a region for the first generation of the storage section to produce the backup volume of the first generation;
   a first monitoring section adapted to monitor, as a first update region, a region to which the data updated in the backup target volume after a production instruction of a backup volume of an i–1th generation is issued belongs, i being a natural number equal to or greater than two;
   a second monitoring section adapted to monitor, as a second update region, a region to which the data updated in the backup volume of the i–1th generation after a production instruction of the backup volume of the i–1th generation is issued belongs; and
   a second production section adapted to refer, if a production instruction of a backup volume of an ith generation is received, to the first update region monitored by the first monitoring section and the second update region monitored by said second monitoring section to secure, in the storage section, a region for the ith generation having a capacity corresponding to capacities of the first update region and the second update region, and then copy the data in the first update region and the data in a region corresponding to the second update region in the backup target volume at a point of time at which the production instruction of the backup volume of the ith generation is received into the region for the ith generation to produce the backup volume of the ith generation.

16. The non-transitory computer-readable recording medium as claimed in claim 15, wherein, when the backup program causes the computer to function as the first monitoring section, the first update region is monitored using a first bitmap table having a size corresponding to a capacity of the backup target volume.

17. The non-transitory computer-readable recording medium as claimed in claim 15, wherein, when the backup program causes the computer to function as the second monitoring section, the second update region is monitored using a second bitmap table having a size corresponding to a capacity of the backup volume in the i–1th generation.

* * * * *